US011501256B2

(12) United States Patent
Egozi et al.

(10) Patent No.: US 11,501,256 B2
(45) Date of Patent: Nov. 15, 2022

(54) DIGITAL PROCESSING SYSTEMS AND METHODS FOR DATA VISUALIZATION EXTRAPOLATION ENGINE FOR ITEM EXTRACTION AND MAPPING IN COLLABORATIVE WORK SYSTEMS

(71) Applicant: MONDAY.COM LTD., Tel Aviv (IL)

(72) Inventors: Dotan Egozi, Tel Aviv (IL); Guy Asinovsky, Tel Aviv (IL); Oron Morad, Or Yehuda (IL); Dor Yehuda, Ramat Gan (IL)

(73) Assignee: MONDAY.COM LTD., Tel Aviv (IL)

( * ) Notice: Subject to any disclaimer, the term of this patent is extended or adjusted under 35 U.S.C. 154(b) by 0 days.

(21) Appl. No.: 17/243,775

(22) Filed: Apr. 29, 2021

(65) Prior Publication Data
US 2021/0357089 A1  Nov. 18, 2021

Related U.S. Application Data

(63) Continuation of application No. PCT/IB2021/000297, filed on Apr. 28, 2021, which is
(Continued)

(51) Int. Cl.
*G06Q 10/10* (2012.01)
*G06Q 10/06* (2012.01)
(Continued)

(52) U.S. Cl.
CPC ....... *G06Q 10/103* (2013.01); *G05B 13/0265* (2013.01); *G06F 3/0482* (2013.01);
(Continued)

(58) Field of Classification Search
CPC .. G06F 3/0484; G06F 16/2393; G06F 3/0482; G06F 3/04817; G06F 3/04845;
(Continued)

(56) References Cited

U.S. PATENT DOCUMENTS 4,972,314 A   11/1990   Getzinger et al.
5,479,602 A   12/1995   Baecker et al.
(Continued)

FOREIGN PATENT DOCUMENTS

CN   107422666 A   12/2017
CN   107623596 A   1/2018
(Continued)

OTHER PUBLICATIONS

D'Alessio et al., Monday.com Walkthrough 2018\All Features, Platforms& Thoughts, (https://www.youtube.com/watch?v=ajBtOzTlhC8&t=352s), Mar. 1, 2018, Screen shots and transcript pp. 1-55, (Year: 2018).
(Continued)

*Primary Examiner* — Michael Roswell
(74) *Attorney, Agent, or Firm* — Finnegan, Henderson, Farabow, Garrett & Dunner LLP

(57) ABSTRACT

Systems, methods, and computer-readable media for extrapolating information display visualizations are disclosed. The systems and methods may involve maintaining a board with a plurality of items, each item defined by a row of cells, and wherein each cell is configured to contain data and is associated with a column heading; linking at least a first column to at least a second column so that a change in data in a cell of the at least first column causes a change in data of a cell in the at least second column; receiving a first selection of a particular item from the board, wherein the particular item includes a plurality of cells with data in each cell, and wherein data in a first cell of the plurality of cells is linked to data in a second cell of the plurality of cells; upon receipt of the first selection.

19 Claims, 26 Drawing Sheets

Related U.S. Application Data a continuation-in-part of application No. PCT/IB2021/000090, filed on Feb. 11, 2021, and a continuation-in-part of application No. PCT/IB2021/000024, filed on Jan. 14, 2021, and a continuation-in-part of application No. PCT/IB2020/000974, filed on Nov. 17, 2020, and a continuation-in-part of application No. PCT/IB2020/000658, filed on Aug. 7, 2020.

(60) Provisional application No. 63/148,092, filed on Feb. 10, 2021, provisional application No. 63/122,439, filed on Dec. 7, 2020, provisional application No. 63/121,803, filed on Dec. 4, 2020, provisional application No. 63/078,301, filed on Sep. 14, 2020, provisional application No. 63/019,396, filed on May 3, 2020, provisional application No. 63/018,593, filed on May 1, 2020.

(51) Int. Cl.

| | | |
|---|---|---|
| *G06F 16/14* | (2019.01) | |
| *G06F 16/23* | (2019.01) | |
| *G06F 16/25* | (2019.01) | |
| *G06F 16/11* | (2019.01) | |
| *H04L 67/1095* | (2022.01) | |
| *G06F 3/0482* | (2013.01) | |
| *G06F 3/14* | (2006.01) | |
| *H04L 51/046* | (2022.01) | |
| *H04L 51/04* | (2022.01) | |
| *G06F 40/279* | (2020.01) | |
| *G06F 40/40* | (2020.01) | |
| *G06F 40/30* | (2020.01) | |
| *G06K 9/62* | (2022.01) | |
| *G06F 3/04817* | (2022.01) | |
| *G06F 3/16* | (2006.01) | |
| *H04L 12/18* | (2006.01) | |
| *G06F 16/22* | (2019.01) | |
| *G06F 16/2455* | (2019.01) | |
| *G06F 16/248* | (2019.01) | |
| *G06F 40/177* | (2020.01) | |
| *H04L 65/401* | (2022.01) | |
| *G06N 20/00* | (2019.01) | |
| *G06F 40/186* | (2020.01) | |
| *G06F 3/0484* | (2022.01) | |
| *G06F 11/30* | (2006.01) | |
| *G06F 11/34* | (2006.01) | |
| *G06F 40/103* | (2020.01) | |
| *G06F 3/04845* | (2022.01) | |
| *G06T 11/20* | (2006.01) | |
| *G06F 16/909* | (2019.01) | |
| *G06F 16/9038* | (2019.01) | |
| *G06F 16/9032* | (2019.01) | |
| *G06F 16/901* | (2019.01) | |
| *G06F 16/951* | (2019.01) | |
| *G06F 16/9536* | (2019.01) | |
| *G06F 16/28* | (2019.01) | |
| *G06F 16/26* | (2019.01) | |
| *G06F 40/253* | (2020.01) | |
| *H04L 51/18* | (2022.01) | |
| *G06F 16/903* | (2019.01) | |
| *G05B 13/02* | (2006.01) | |
| *G06F 16/31* | (2019.01) | |
| *G06F 40/106* | (2020.01) | |
| *G06F 9/54* | (2006.01) | |
| *H04L 51/48* | (2022.01) | |
| *B65D 83/04* | (2006.01) | |

(52) U.S. Cl.
CPC ........ *G06F 3/0484* (2013.01); *G06F 3/04817* (2013.01); *G06F 3/04845* (2013.01); *G06F 3/1454* (2013.01); *G06F 3/165* (2013.01); *G06F 9/542* (2013.01); *G06F 9/548* (2013.01); *G06F 11/302* (2013.01); *G06F 11/3409* (2013.01); *G06F 11/3438* (2013.01); *G06F 16/116* (2019.01); *G06F 16/144* (2019.01); *G06F 16/2282* (2019.01); *G06F 16/23* (2019.01); *G06F 16/2308* (2019.01); *G06F 16/2365* (2019.01); *G06F 16/2393* (2019.01); *G06F 16/248* (2019.01); *G06F 16/2456* (2019.01); *G06F 16/24564* (2019.01); *G06F 16/24565* (2019.01); *G06F 16/258* (2019.01); *G06F 16/26* (2019.01); *G06F 16/287* (2019.01); *G06F 16/328* (2019.01); *G06F 16/909* (2019.01); *G06F 16/9017* (2019.01); *G06F 16/9038* (2019.01); *G06F 16/90328* (2019.01); *G06F 16/90344* (2019.01); *G06F 16/951* (2019.01); *G06F 16/9536* (2019.01); *G06F 40/103* (2020.01); *G06F 40/106* (2020.01); *G06F 40/177* (2020.01); *G06F 40/186* (2020.01); *G06F 40/253* (2020.01); *G06F 40/279* (2020.01); *G06F 40/30* (2020.01); *G06F 40/40* (2020.01); *G06K 9/6215* (2013.01); *G06N 20/00* (2019.01); *G06Q 10/0633* (2013.01); *G06Q 10/06312* (2013.01); *G06Q 10/06313* (2013.01); *G06Q 10/06316* (2013.01); *G06Q 10/063114* (2013.01); *G06Q 10/063118* (2013.01); *G06Q 10/101* (2013.01); *G06T 11/206* (2013.01); *H04L 12/1827* (2013.01); *H04L 51/04* (2013.01); *H04L 51/046* (2013.01); *H04L 51/18* (2013.01); *H04L 51/48* (2022.05); *H04L 65/4015* (2013.01); *H04L 67/1095* (2013.01); *B65D 83/0409* (2013.01); *G06F 2201/865* (2013.01); *G06F 2201/88* (2013.01); *G06F 2203/04803* (2013.01); *G06T 2200/24* (2013.01)

(58) Field of Classification Search
CPC .. G06F 3/1454; G06Q 10/103; G05B 13/0265
See application file for complete search history.

(56) References Cited

U.S. PATENT DOCUMENTS

| | | |
|---|---|---|
| 5,517,663 A | 5/1996 | Kahn |
| 5,682,469 A | 10/1997 | Linnett |
| 5,696,702 A | 12/1997 | Skinner et al. |
| 5,726,701 A | 3/1998 | Needham |
| 5,787,411 A | 7/1998 | Groff et al. |
| 5,880,742 A | 3/1999 | Rao et al. |
| 5,933,145 A | 8/1999 | Meek |
| 6,016,553 A | 1/2000 | Schneider et al. |
| 6,023,695 A | 2/2000 | Osborn et al. |
| 6,167,405 A | 12/2000 | Rosensteel, Jr. et al. |
| 6,169,534 B1 | 1/2001 | Raffel et al. |
| 6,185,582 B1 | 2/2001 | Zellweger et al. |
| 6,195,794 B1 | 2/2001 | Buxton |
| 6,266,067 B1 | 7/2001 | Owen et al. |
| 6,275,809 B1 | 8/2001 | Tamaki et al. |
| 6,377,965 B1 | 4/2002 | Hachamovitch et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,522,347 B1 | 2/2003 | Tsuji et al. |
| 6,527,556 B1 | 3/2003 | Koskinen |
| 6,606,740 B1 | 8/2003 | Lynn et al. |

(56) References Cited

U.S. PATENT DOCUMENTS

| | | |
|---|---|---|
| 6,636,242 B2 | 10/2003 | Bowman-Amuah |
| 6,647,370 B1 | 11/2003 | Fu et al. |
| 6,661,431 B1 | 12/2003 | Stuart et al. |
| 7,027,997 B1 | 4/2006 | Robinson et al. |
| 7,043,529 B1 | 5/2006 | Simonoff |
| 7,054,891 B2 | 5/2006 | Cole |
| 7,237,188 B1 | 6/2007 | Leung |
| 7,249,042 B1 | 7/2007 | Doerr et al. |
| 7,272,637 B1 | 9/2007 | Himmelstein |
| 7,274,375 B1 | 9/2007 | David |
| 7,379,934 B1 | 5/2008 | Forman et al. |
| 7,383,320 B1 | 6/2008 | Silberstein et al. |
| 7,415,664 B2 | 8/2008 | Aureglia et al. |
| 7,461,077 B1 | 12/2008 | Greenwood |
| 7,489,976 B2 | 2/2009 | Adra |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,916,157 B1 | 3/2011 | Kelley et al. |
| 7,954,064 B2 | 5/2011 | Forstall et al. |
| 8,046,703 B2 | 10/2011 | Busch et al. |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 * | 1/2013 | Bansal .................. G06Q 10/20 715/810 |
| 8,375,327 B2 | 2/2013 | Lorch et al. |
| 8,386,960 B1 | 2/2013 | Eismann et al. |
| 8,423,909 B2 | 4/2013 | Zabielski |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B1 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,129,234 B2 | 9/2015 | Campbell et al. |
| 9,172,738 B1 | 10/2015 | daCosta |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 * | 6/2016 | Simon .................. H04L 67/42 |
| 9,390,059 B1 | 7/2016 | Gur et al. |
| 9,424,287 B2 | 8/2016 | Schroth |
| 9,424,333 B1 | 8/2016 | Bisignani et al. |
| 9,430,458 B2 | 8/2016 | Rhee et al. |
| 9,449,031 B2 | 9/2016 | Barrus et al. |
| 9,495,386 B2 * | 11/2016 | Tapley ............... G06Q 30/0623 |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,727,376 B1 | 8/2017 | Bills et al. |
| 9,760,271 B2 | 9/2017 | Persaud |
| 9,794,256 B2 | 10/2017 | Kiang et al. |
| 9,798,829 B1 | 10/2017 | Baisley |
| 9,866,561 B2 | 1/2018 | Psenka et al. |
| 9,870,136 B2 | 1/2018 | Pourshahid |
| 10,043,296 B2 | 8/2018 | Li |
| 10,067,928 B2 | 9/2018 | Krappe |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,327,712 B2 | 6/2019 | Beymer et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,423,758 B2 | 9/2019 | Kido et al. |
| 10,445,702 B1 | 10/2019 | Hunt |
| 10,452,360 B1 | 10/2019 | Burman et al. |
| 10,453,118 B2 | 10/2019 | Smith et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,564,622 B1 | 2/2020 | Dean et al. |
| 10,573,407 B2 * | 2/2020 | Ginsburg ............ G06F 3/04842 |
| 10,628,002 B1 | 4/2020 | Kang et al. |
| 10,698,594 B2 * | 6/2020 | Sanches ............... G06F 3/04817 |
| 10,706,061 B2 | 7/2020 | Sherman et al. |
| 10,719,220 B2 | 7/2020 | Ouellet et al. |
| 10,740,117 B2 | 8/2020 | Ording et al. |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,795,555 B2 | 10/2020 | Burke et al. |
| 10,817,660 B2 | 10/2020 | Rampson et al. |
| D910,077 S | 2/2021 | Naroshevitch et al. |
| 10,963,578 B2 | 3/2021 | More et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 2001/0008998 A1 | 7/2001 | Tamaki et al. |
| 2001/0032248 A1 | 10/2001 | Krafchin |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0135558 A1 | 7/2003 | Bellotti et al. |
| 2003/0187864 A1 | 10/2003 | McGoveran |
| 2003/0200215 A1 | 10/2003 | Chen et al. |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0172592 A1 | 9/2004 | Collie et al. |
| 2004/0212615 A1 | 10/2004 | Uthe |
| 2004/0215443 A1 | 10/2004 | Hatton |
| 2004/0268227 A1 | 12/2004 | Brid |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0096973 A1 | 5/2005 | Heyse et al. |
| 2005/0114305 A1 | 5/2005 | Haynes et al. |

(56) References Cited

U.S. PATENT DOCUMENTS

| | | |
|---|---|---|
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0257204 A1 | 11/2005 | Bryant et al. |
| 2005/0278297 A1 | 12/2005 | Nelson |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0015806 A1 | 1/2006 | Wallace |
| 2006/0031148 A1 | 2/2006 | O'Dell et al. |
| 2006/0047811 A1* | 3/2006 | Lau .................. H04L 67/2852 709/225 |
| 2006/0053096 A1 | 3/2006 | Subramanian et al. |
| 2006/0053194 A1 | 3/2006 | Schneider et al. |
| 2006/0069604 A1* | 3/2006 | Leukart .............. G06Q 10/1093 715/792 |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0106642 A1* | 5/2006 | Reicher ................... G06T 7/38 705/2 |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0173908 A1 | 8/2006 | Browning et al. |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0250369 A1 | 11/2006 | Keim |
| 2006/0253205 A1 | 11/2006 | Gardiner |
| 2006/0287998 A1 | 12/2006 | Folting et al. |
| 2006/0294451 A1 | 12/2006 | Kelkar et al. |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034314 A1 | 2/2008 | Louch et al. |
| 2008/0052291 A1 | 2/2008 | Bender |
| 2008/0065460 A1 | 3/2008 | Raynor |
| 2008/0077530 A1 | 3/2008 | Banas et al. |
| 2008/0104091 A1 | 5/2008 | Chin |
| 2008/0126389 A1 | 5/2008 | Mush et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0195948 A1 | 8/2008 | Bauer |
| 2008/0216022 A1 | 9/2008 | Lorch et al. |
| 2008/0222192 A1 | 9/2008 | Hughes |
| 2008/0244429 A1* | 10/2008 | Stading ................ G06F 16/248 707/E17.093 |
| 2008/0256014 A1 | 10/2008 | Gould et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0198715 A1 | 8/2009 | Barbarek |
| 2009/0248710 A1 | 10/2009 | McCormack et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319882 A1 | 12/2009 | Morrison et al. |
| 2009/0327240 A1 | 12/2009 | Meehan et al. |
| 2009/0327851 A1 | 12/2009 | Raposo |
| 2009/0327875 A1* | 12/2009 | Kinkoh ................ G06F 40/186 715/255 |
| 2010/0017699 A1 | 1/2010 | Farrell et al. |
| 2010/0070895 A1 | 3/2010 | Messer |
| 2010/0083164 A1* | 4/2010 | Martin ................... G16H 40/63 715/781 |
| 2010/0088636 A1* | 4/2010 | Yerkes .................... G06F 16/24 715/809 |
| 2010/0095298 A1* | 4/2010 | Seshadrinathan ....... G06F 40/18 718/100 |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241990 A1 | 9/2010 | Gabriel et al. |
| 2010/0251090 A1 | 9/2010 | Chamberlain et al. |
| 2010/0257015 A1* | 10/2010 | Molander .......... G06Q 10/1097 705/7.21 |
| 2010/0262625 A1 | 10/2010 | Pittenger |
| 2010/0287221 A1 | 11/2010 | Battepati et al. |
| 2010/0324964 A1 | 12/2010 | Callanan et al. |
| 2011/0010340 A1 | 1/2011 | Hung et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1* | 3/2011 | Chakra ................ G06Q 10/109 707/695 |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0219321 A1 | 9/2011 | Gonzalez et al. |
| 2011/0225525 A1 | 9/2011 | Chasman et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0072821 A1 | 3/2012 | Bowling |
| 2012/0079408 A1 | 3/2012 | Rohwer |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089914 A1* | 4/2012 | Holt ..................... G06F 3/04855 715/728 |
| 2012/0089992 A1 | 4/2012 | Reeves et al. |

(56) References Cited

U.S. PATENT DOCUMENTS

| | | |
|---|---|---|
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0192050 A1 | 7/2012 | Campbell et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233533 A1 | 9/2012 | Yücel et al. |
| 2012/0239454 A1 | 9/2012 | Taix et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2013/0018952 A1 | 1/2013 | McConnell et al. |
| 2013/0018953 A1 | 1/2013 | McConnell et al. |
| 2013/0018960 A1 | 1/2013 | Knysz et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0055113 A1 | 2/2013 | Chazin et al. |
| 2013/0086460 A1 | 4/2013 | Folting et al. |
| 2013/0090969 A1 | 4/2013 | Rivere |
| 2013/0103417 A1 | 4/2013 | Seto et al. |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0211866 A1 | 8/2013 | Gordon et al. |
| 2013/0238363 A1 | 9/2013 | Ohta et al. |
| 2013/0238968 A1 | 9/2013 | Barrus |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0318424 A1* | 11/2013 | Boyd ............... G09B 5/02 715/202 |
| 2014/0006326 A1 | 1/2014 | Bazanov |
| 2014/0019842 A1 | 1/2014 | Montagna et al. |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0068403 A1 | 3/2014 | Bhargav et al. |
| 2014/0074545 A1 | 3/2014 | Minder et al. |
| 2014/0108985 A1* | 4/2014 | Scott ............... G06F 3/0484 715/771 |
| 2014/0109012 A1 | 4/2014 | Choudhary et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137144 A1 | 5/2014 | Järvenpää et al. |
| 2014/0173401 A1* | 6/2014 | Oshlag ............... G06F 40/18 715/212 |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti et al. |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |
| 2014/0324501 A1 | 10/2014 | Davidow et al. |
| 2014/0365938 A1 | 12/2014 | Black et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0033149 A1 | 1/2015 | Kuchoor |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142829 A1 | 5/2015 | Lee et al. |
| 2015/0153943 A1 | 6/2015 | Wang |
| 2015/0169531 A1 | 6/2015 | Campbell et al. |
| 2015/0212717 A1* | 7/2015 | Nair ............... G06F 9/451 715/769 |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0278699 A1 | 10/2015 | Danielsson |
| 2015/0281292 A1 | 10/2015 | Murayama et al. |
| 2015/0295877 A1 | 10/2015 | Roman |
| 2015/0317590 A1* | 11/2015 | Karlson ............... G06Q 10/06316 705/7.21 |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0170586 A1 | 6/2016 | Gallo |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0246490 A1* | 8/2016 | Cabral ............... G06F 3/0481 |
| 2016/0253982 A1 | 9/2016 | Cheung et al. |
| 2016/0275150 A1 | 9/2016 | Bournonnais et al. |
| 2016/0299655 A1 | 10/2016 | Migos et al. |
| 2016/0321235 A1 | 11/2016 | He et al. |
| 2016/0335302 A1 | 11/2016 | Teodorescu et al. |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0350950 A1 | 12/2016 | Ritchie et al. |
| 2017/0031967 A1 | 2/2017 | Chavan et al. |
| 2017/0041296 A1 | 2/2017 | Ford et al. |
| 2017/0052937 A1* | 2/2017 | Sirven ............... G06F 40/106 |
| 2017/0061342 A1 | 3/2017 | Lore et al. |
| 2017/0061360 A1 | 3/2017 | Rucker et al. |
| 2017/0063722 A1 | 3/2017 | Cropper et al. |
| 2017/0075557 A1 | 3/2017 | Noble et al. |
| 2017/0091337 A1 | 3/2017 | Patterson |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1* | 5/2017 | Campbell ............... G06F 3/165 |
| 2017/0124048 A1 | 5/2017 | Campbell et al. |
| 2017/0124055 A1 | 5/2017 | Radakovitz et al. |
| 2017/0126772 A1 | 5/2017 | Campbell et al. |
| 2017/0132296 A1 | 5/2017 | Ding |
| 2017/0139874 A1 | 5/2017 | Chin |
| 2017/0139884 A1 | 5/2017 | Bendig et al. |

(56) References Cited

U.S. PATENT DOCUMENTS

| | | |
|---|---|---|
| 2017/0140047 A1 | 5/2017 | Bendig et al. |
| 2017/0153771 A1 | 6/2017 | Chu |
| 2017/0177888 A1 | 6/2017 | Arora et al. |
| 2017/0185668 A1 | 6/2017 | Convertino et al. |
| 2017/0221072 A1 | 8/2017 | AthuluruTlrumala et al. |
| 2017/0228445 A1 | 8/2017 | Chiu et al. |
| 2017/0228460 A1 | 8/2017 | Amel et al. |
| 2017/0236081 A1 | 8/2017 | Grady Smith et al. |
| 2017/0242921 A1 | 8/2017 | Rota |
| 2017/0270970 A1* | 9/2017 | Ho .................. G06F 16/5854 |
| 2017/0272316 A1 | 9/2017 | Johnson et al. |
| 2017/0272331 A1 | 9/2017 | Lissack |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0324692 A1 | 11/2017 | Zhou |
| 2017/0351252 A1 | 12/2017 | Kleifges et al. |
| 2017/0372442 A1 | 12/2017 | Mejias |
| 2018/0025084 A1 | 1/2018 | Conlan et al. |
| 2018/0032570 A1 | 2/2018 | Miller et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088989 A1 | 3/2018 | Nield et al. |
| 2018/0089299 A1 | 3/2018 | Collins et al. |
| 2018/0095938 A1* | 4/2018 | Monte .................. G06F 3/0488 |
| 2018/0096417 A1 | 4/2018 | Cook et al. |
| 2018/0109760 A1 | 4/2018 | Metter et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1 | 8/2018 | Bhide et al. |
| 2018/0276417 A1 | 9/2018 | Cerezo |
| 2018/0293217 A1 | 10/2018 | Callaghan |
| 2018/0293669 A1 | 10/2018 | Jackson et al. |
| 2018/0329930 A1 | 11/2018 | Eberlein et al. |
| 2018/0357305 A1 | 12/2018 | Kinast et al. |
| 2018/0367484 A1 | 12/2018 | Rodriguez et al. |
| 2018/0373434 A1 | 12/2018 | Switzer et al. |
| 2018/0373757 A1 | 12/2018 | Schukovets et al. |
| 2019/0005094 A1 | 1/2019 | Yi et al. |
| 2019/0036989 A1 | 1/2019 | Eirinberg et al. |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0073350 A1 | 3/2019 | Shiotani |
| 2019/0095413 A1 | 3/2019 | Davis et al. |
| 2019/0108046 A1* | 4/2019 | Spencer-Harper ...... G06F 9/451 |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0236188 A1 | 8/2019 | McKenna |
| 2019/0251884 A1 | 8/2019 | Burns et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0026397 A1 | 1/2020 | Wohlstadter et al. |
| 2020/0042648 A1 | 2/2020 | Rao |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0247661 A1 | 8/2020 | Rao et al. |
| 2020/0279315 A1 | 9/2020 | Manggala |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0348809 A1 | 11/2020 | Drescher |
| 2020/0349320 A1 | 11/2020 | Owens |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0019287 A1 | 1/2021 | Prasad et al. |
| 2021/0021603 A1 | 1/2021 | Gibbons |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0084120 A1 | 3/2021 | Fisher et al. |
| 2021/0124749 A1 | 4/2021 | Suzuki et al. |
| 2021/0124872 A1 | 4/2021 | Lereya |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0264220 A1 | 8/2021 | Wei et al. |

FOREIGN PATENT DOCUMENTS

| | | |
|---|---|---|
| CN | 107885656 A | 4/2018 |
| CN | 112929172 A | 6/2021 |
| WO | WO 2004/100015 A2 | 11/2004 |
| WO | WO 2006/116580 A2 | 11/2006 |
| WO | WO 2017202159 A1 | 11/2017 |
| WO | WO 2020/187408 A1 | 9/2020 |

OTHER PUBLICATIONS

Rodrigo et al., Project Management with Monday.com: a 101 Introduction; Jul. 22, 2019, pp. 1-21, 2019.

International Search Report and Written Opinion of the International Searching Authority in PCT/IB2020/000658, dated Nov. 11, 2020 (12 pages).

International Search Report in PCT/IB2020/000974, dated May 3, 2021 (19 pages).

International Search Report in PCT/IB2021/000090 dated Jul. 27, 2021.

ShowMyPC, "Switch Presenter While Using ShowMyPC"; web archive.org; Aug. 20, 2016.

International Search Report and Written Opinion of the International Search Authority in PCT/IB2021/000024, dated May 3, 2021 (13 pages).

"Pivottable—Wikipedia"; URL: https://en.wikipedia.org/w/index.php?title=Pivot_table&oldid=857163289, originally retrieve on Oct. 23, 2019; retrieved on Jul. 16, 2021.

Vishal Singh, "A Theoretical Framework of a BIM-based Multi-Disciplinary Collaboration Platform", Nov. 5, 2010, Automation in Construction, 20 (2011), pp. 134-144 (Year: 2011).

Edward A. Stohr, Workflow Automation: Overview and Research Issues, 2001, Information Systems Frontiers 3:3, pp. 281-296 (Year: 2001).

International Search Report and Written Opinion of the International Search Authority in PCT/IB2021/000297, dated Oct. 12, 2021 (20 pages).

Dapulse.com "features".extracted from web.archive.or/web/2014091818421/https://dapulse.com/features; Sep. 2014 (Year: 2014).

Stephen Larson et al., Introducing Data Mining Concepts Using Microsoft Excel's Table Analysis Tools, Oct. 2015, [Retrieved on

(56) References Cited

OTHER PUBLICATIONS

Nov. 19, 2021], Retrieved from the internet: <URL: https://dl.acm.org/doi/pdf/10.5555/2831373.2831394> 3 Pages (127-129) (Year: 2015).

Isaiah Pinchas et al., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).

Sajjad Bahrebar et al., "A Novel Type-2 Fuzzy Logic for Improved Risk Analysis of Proton Exchange Membrane Fuel Cells in Marine Power Systems Application", *Energies*, 11, 721, pp. 1-16, Mar. 22, 2018.

\* cited by examiner

Sales Pipeline ☆

Last seen (ML)  &Invite / 1  ∿Activity  |+ Add to board|  ⋯

🗂 Main Table  ⊕ Deals status  📋 Form  | + Add View  ⊗ Integrate / 2  ⬡⬡⬡ Automate / 5

🔍Search @Person ▽Filter  ↓Sort  ✏️ ≡↔

| New Deal ⌄ |

● Deals ~602

| | Tasks | Owner | Contacts ⓘ | Stage | Priority | ↓Company | Deal age |
|---|---|---|---|---|---|---|---|
| Deal name 1 | 💬 | ⊗ | Madison Doyle | Lead | High | Google | 1 days |
| Deal name 2 | 💬 | ⊗ | Phoenix Levy | Lead | High | Apple | 1 days |
| Deal name 3 | 💬 | ⊗ | Leilani Krause | Negotiation | High | Spotify | 1 days |
| + Add ~604 | | | | | | | 1 day avg |

● Closed Won ~606

| | Tasks | Owner | Contacts ⓘ | Stage | Priority | ↓Company | Deal age |
|---|---|---|---|---|---|---|---|
| Deal 4 | 💬 | ⊗ | Phoenix Levy | Won | Low | Apple | 1 days |
| + Add ~608 | | | | | | | 1 day avg |

---

M Main workspace
Add
Filters
Search

▼ CRM
Sales Pipeline ~302
Contact
Lead Capturing
CRM Learning Center
Sales Dashboard

DIGITAL PROCESSING SYSTEMS AND METHODS FOR DATA VISUALIZATION EXTRAPOLATION ENGINE FOR ITEM EXTRACTION AND MAPPING IN COLLABORATIVE WORK SYSTEMS

CROSS-REFERENCE TO RELATED APPLICATIONS

This application is based on and claims benefit of priority of U.S. Nonprovisional patent application Ser. No. 17/242,452 filed on Apr. 28, 2021, which claims priority to U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed on Dec. 4, 2020, U.S. Provisional Patent Application No. 63/122,439, filed on Dec. 7, 2020, and U.S. Provisional Patent Application No. 63/148,092, filed on Feb. 10, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

A dynamically changeable operating system for a workflow environment, the operating system comprising: at least one processor configured to: associate a user-ID with a workflow management account; maintain a plurality of workflow management boards associated with the workflow management account; receive a first plurality of touch points associated with the user-ID; based on the first plurality of touch points, customize the workflow management account by initially altering at least one of a column option picker, an automation option picker, a third-party application integration picker, a display interface picker, or a solution picker; monitor activity associated with the workflow management account; receive, based on the monitoring, a second plurality of touch points associated with the user-ID; and adjust the customized workflow management account by subsequently altering, based on the second plurality of touch points at least one of the column option picker, the automation option picker, the third-party application integration picker, the display interface picker, or the solution picker.

A data extraction and mapping system, comprising: at least one processor configured to: maintain a main data source containing a plurality of data objects; maintain a plurality of boards for presenting the plurality of data objects; maintain a plurality of linkages between at least some of the plurality of data objects associated with differing boards of the plurality of boards; receive a selection of a particular data object associated with a particular board; identify via a particular linkage of the plurality of linkages at least one additional data object on another board linked to the particular data object on the particular board; define a sub-data source, the sub-data source aggregating the at least one additional data object and the particular data object; receive a visualization template selection; map the sub-data source to the visualization template selection to generate a sub-data visualization; and cause a co-presentation of a representation of the particular board and the sub-data visualization.

A system for extrapolating information display visualizations, the system comprising: at least one processor configured to: maintain a board with a plurality of items, each item defined by a row of cells, and wherein each cell is configured to contain data and is associated with a column heading; link at least a first column to at least a second column so that a change in data in a cell of the at least first column causes a change in data of a cell in the at least second column; receive a first selection of a particular item from the board, wherein the particular item includes a plurality of cells with data in each cell, and wherein data in a first cell of the plurality of cells is linked to data in a second cell of the plurality of cells; upon receipt of the first selection, cause a display of an item interface extrapolator, wherein the item interface extrapolator includes a plurality of activatable elements, each of the activatable elements being associated with a differing visualization of at least some of the data contained in cells associated with the particular item; receive a second selection of one of the activatable elements; upon receipt of the second selection, cause a first extrapolated display of data associated with the particular item to appear in a first manner; receive a third selection of another of the activatable elements; and upon receipt of the third selection, cause a second extrapolated display of data associated with the particular item to appear in a second manner.

BRIEF DESCRIPTION OF THE DRAWINGS

FIG. 6 illustrates an example of an interface with a customized workflow management account, consistent with some embodiments of the present disclosure.

FIGS. 9A & 9B illustrate an exemplary view of a plurality of linkages between at least some of the plurality of data objects associated with differing boards, consistent with some embodiments of the present disclosure.

DETAILED DESCRIPTION

Figure 1:
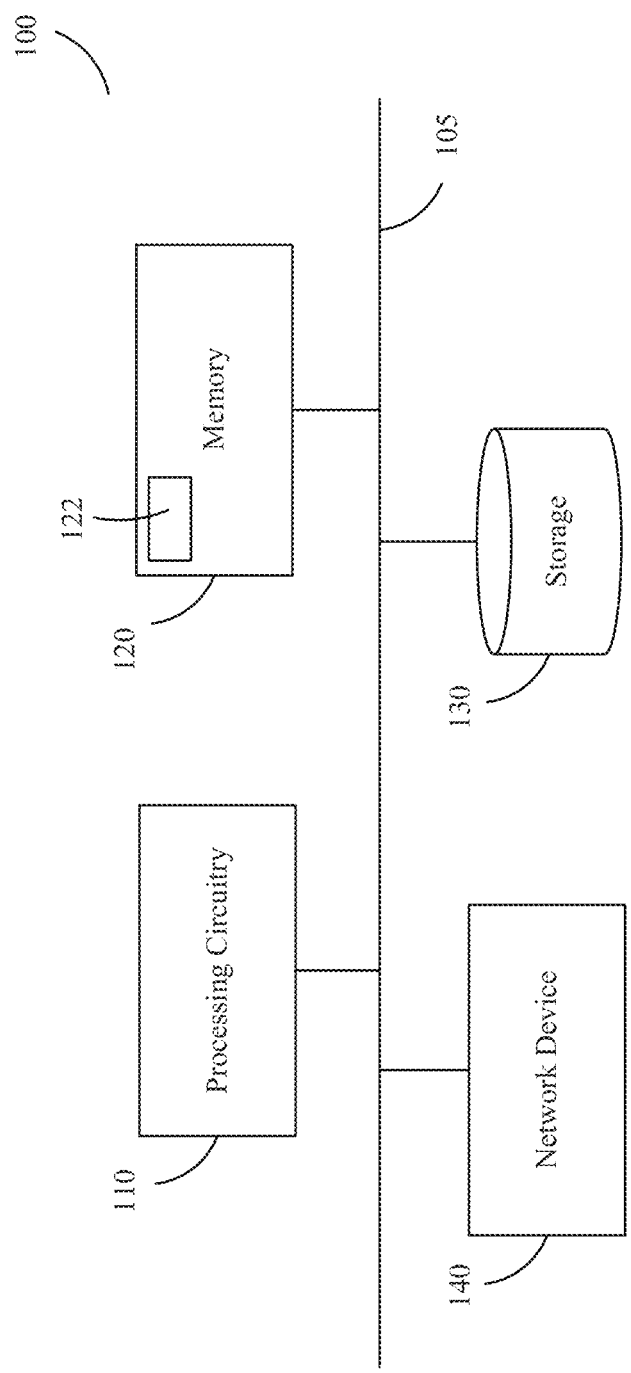
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, a tablature may include any suitable information. When used in conjunction with a workflow management application, the tablature may include any information associated with one or more tasks, such as one or more status values, projects, countries, persons, teams, progresses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
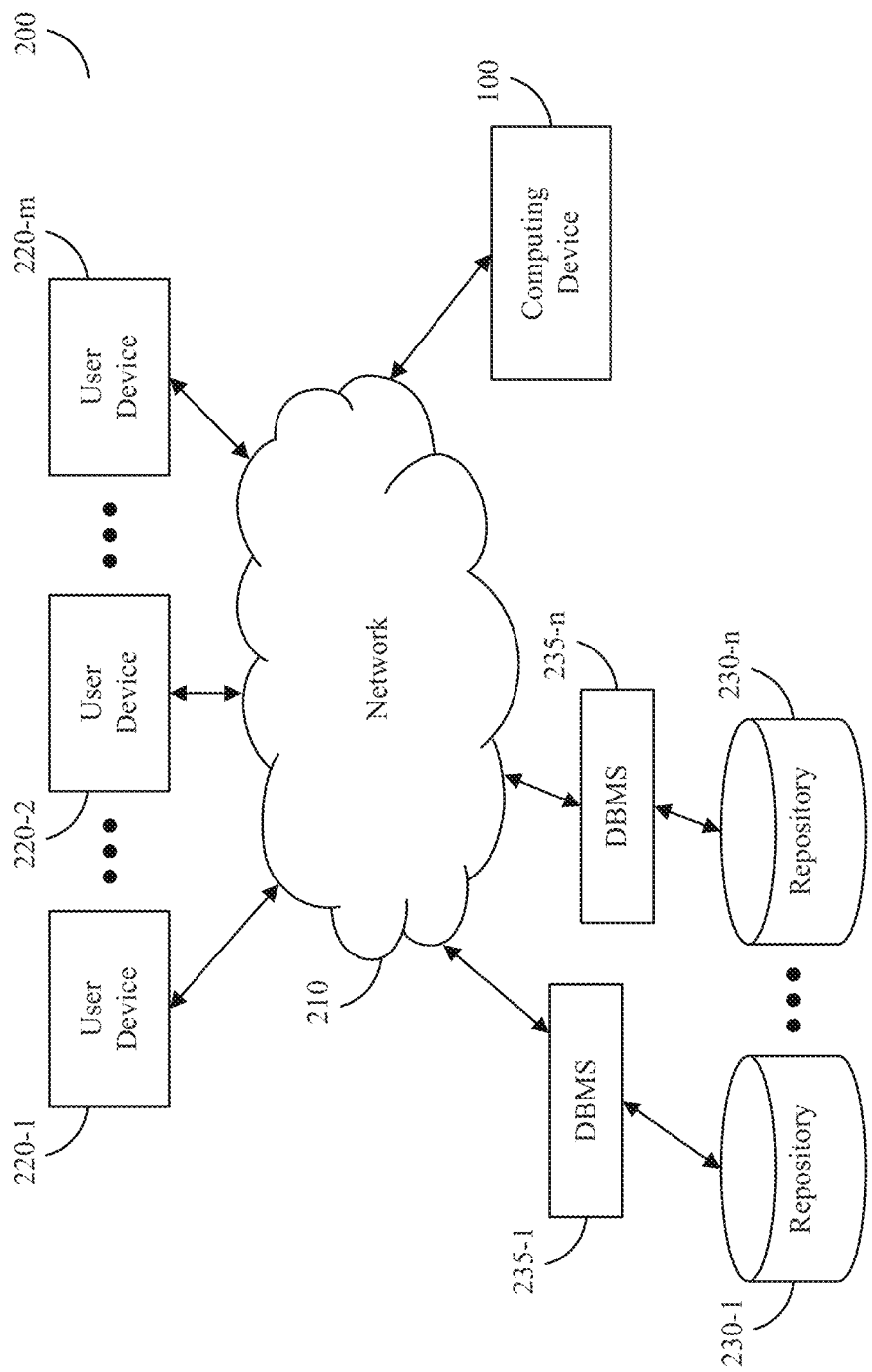
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Aspects of this disclosure may relate a dynamically changeable operating (or platform) system for a workflow environment (e.g., the platform system dynamically changing the user's experience by customizing the presentation of options specific to the user's needs), including methods, systems, devices, and computer readable media. For ease of discussion, a system is described below, with the understanding that aspects of the system apply equally to non-transitory computer readable media, methods, and devices. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. For example, some aspects of such a system may include at least one processor configured to perform a method via tablature. The term "tablature" may refer to a tabular space, surface, or structure. Such spaces, surfaces, or structures may include a systematic arrangement of rows, columns, and/or other logical arrangement of regions or locations for presenting, holding, or displaying information.

In a data management platform, it is important for users to customize the user experience or operating system. For example, a workflow management account may have various tables. However, these tables need to comply with user needs and customization of data management. Further, it is important for users to generate tables unique to their specifications. Given the numerous tools and workflows a user may be presented with, a user may experience inefficiencies in deciding between which tools to use without knowing whether those are tools that are best situated for their use case. If a user begins using tools and realizes that they picked the wrong one for their needs after spending time working with them, this makes processing data inefficient if the user continues using the incorrect tools or inefficiencies in time if the user then has to browse and try other tools that might be better situated for their needs. By customizing the user experience or operating system, the user may experience various efficiencies to their business or personal requirements. Identification of user touch points and adjusting accounts for customization of user experience across multiple boards can be a difficult task. Merely using a pen and paper to track changes to hundreds of boards and changes to an account or new touch points would result in mistakes and multiple touch points being ignored. Although mental organizational tasks may be used, systems and methods for dynamically changing an operating system in a workflow environment are lacking.

Therefore, there is a need for unconventional approaches to enable a user to have an adjusted customized workflow management account based on a plurality of touch points to be presented with relevant tools and solutions based on the information gained in each of the touch points. Accordingly, by identifying touch points and monitoring activity, some disclosed embodiments provide efficiencies in adjusting the customized workflow management account to present the most relevant tools and workflows to a user and adapting to the user's activities. Additionally, the system described below may provide suggestions that can spare the user time in building the table or workspace.

Aspects of some of the embodiments of this disclosure may include a dynamically changeable operating system for a workflow environment. A dynamically changeable operating system may include a system that carries out operations in an adaptive manner, such as by automatically adapting to new inputs to carry out different operations. The dynamically changeable operating system may be configured to carry out operations for maintaining a virtual workflow environment that may process information and data contained in a data structure, which the operating system may act upon.

Some embodiments may involve associating a user-ID with a workflow management account. A user-ID may include any identifying information associated with a user, any other entity (e.g., a team or a company), and/or of a device of any of the foregoing. For example, a user-ID may include a string of characters, a string of numbers, a name, a phone number, an ID associated with an account, a client device identifier, a client account identifier, or any other identifier. A workflow management account may include any website or application where a user may manage information, data, projects, tasks, or work. Associating a user-ID with a workflow management account may include linking a user-ID with a workflow management account. By way of one example, a user may utilize a workflow management system and open an account with a user-ID related to their name (e.g., user-ID=JaneSmith). In such an embodiment, the workflow management system may associate user-ID JaneSmith with a workflow management account and also customize the user's workflow management experience in response to any information provided by the user, specific to the user-ID JaneSmith.

Some embodiments may include maintaining a plurality of workflow management boards associated with the workflow management account. A plurality of workflow management boards may include one or more tables made up of rows and columns containing cells for data management. In a broader sense, a board may include any of the board examples described herein. Maintaining a plurality of workflow management boards may include storing the plurality of workflow management boards and their associated information in a repository for storage and access. By way of one example, the workflow management system may store multiple boards associated with a user-ID (e.g., JaneSmith). In some embodiments, a user may generate the one or more boards associated with their user-ID from scratch or the user may select various prompts to generate each board from part of a template. In some embodiments, the workflow management system may include multiple boards, networks of boards working together, columns, column stores, dashboard stores, and data objects accessible by and associated with multiple workflow management accounts (not necessarily just for one workflow management account or user-ID).

Some embodiments may include receiving a first plurality of touch points associated with the user-ID. A touch point may include any information provided to the system or identified by the system. By way of one example, the workflow management system may receive a plurality of touch points when users set up their accounts and provide information about themselves or their projects. For example, each input from a user is considered a touch point, e.g., which field the user would like to manage (law firm, hospital management, corporate business, or other field), which team the user would like to manage (marketing, R&D, sales), how large the team is, and solutions (particular workflows with columns, automations, integrations, or any combination thereof). Each of the inputs from a user may be a touch point.

Figure 3:
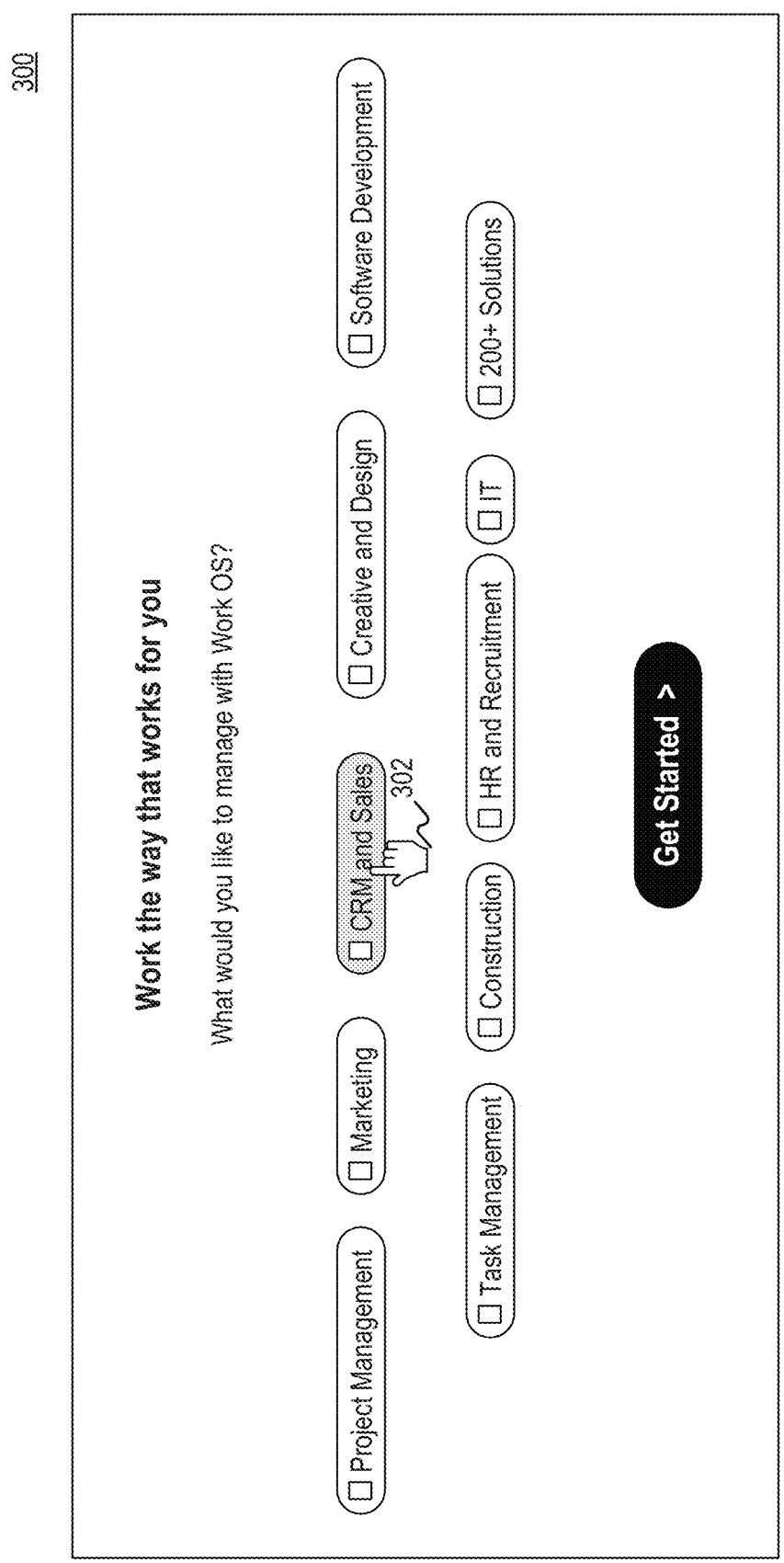
FIG. 3 illustrates a first example of an interface for enabling a user to select various prompts which may be sent to a system as a plurality of touch points associated with a user-ID, consistent with some embodiments of the present disclosure.

FIG. 3 illustrates a first example of an interface enabling a user to select various prompts which may be sent to a system as one or more touch points associated with a user-ID. By way of one example, interface 300 of FIG. 3 illustrates that the user may use pointer 302 to select one of multiple answers to a question. Interface 300 provides the user with a question—"What would you like to manage with Work OS?" Interface 300 also provides ten options for the user to select from, including for example, Project Management, Marketing, C R M and Sales, Creative and Design, Software Development, Task Management, Construction, H R and Recruitment, IT, and 200+ Solutions (e.g., other options to select from). Selecting any of these options may act as a touch point, specifically a primary touch point identifying a field. In response to selecting "CRM and Sales," for example, the workflow management system may receive a plurality of touch points associated with the user's user-ID.

In some embodiments, the first plurality of touch points may include a primary touch point identifying a field, a secondary touch point identifying an endeavor, and a tertiary touch point identifying a tool. A field may include any category or vocational area. In some embodiments, the field the user would like to manage may include a field regarding any vocation, industry, or specialty such as a legal industry, hospital management, corporate business, or any other field. An endeavor may include any goal that the user would like to achieve for the workflow management account, such as a financial profit and loss management tool, a human resource employee management tool, a team management tool, or any other task a user would like to pursue. In some embodiments, the endeavor may be selected by the user to indicate whether the workflow management account is for personal or work projects, the role the user may have on the project (e.g., team leader), which team the user would like to manage (marketing, R&D, sales), or size of the team. A tool may include any system tool that can vary from simple data objects (e.g., a column, a table structure, and so on) or complex solutions that include any number or combination of different tools such as data object structures and automations. The tools may be provided as recommendations by the workflow management system in response to receiving information about the user's field and endeavors. In some embodiments, the tool the user selects may include solutions such as particular workflows with columns, automations, integrations, templates, or any combination thereof.

By way of one example, a system may receive a plurality of touch points associated with a user-ID that may include the following: a selection of "Real Estate" by a user after the system prompts the user to choose which industry the user's board may relate to (e.g., a first touch point identifying a field), a selection of "100+" by a user after the system prompts the user to indicate the number of people on her team (e.g., a second touch point identifying an endeavor), and a selection of "Real Estate CRM template" by a user after the system prompts the user to select a template for building a board (e.g., a third touch point identifying a tool).

Figure 4:
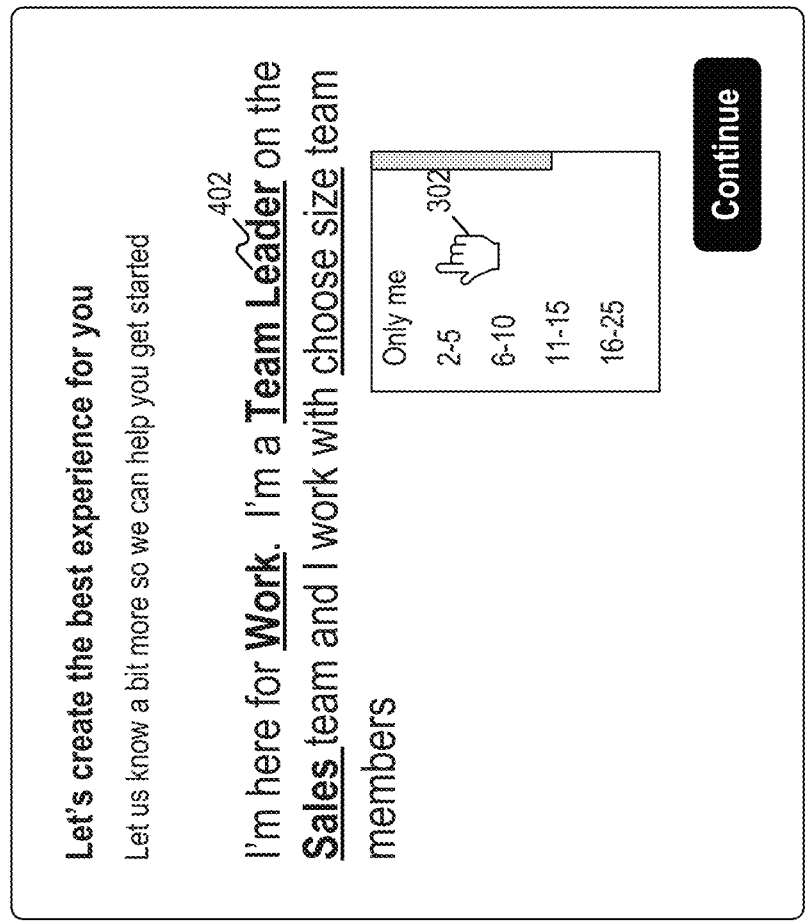
FIG. 4 illustrates a second example of an interface for enabling a user to select various prompts which may be sent to a system as a plurality of touch points associated with a user-ID, consistent with some embodiments of the present disclosure.

FIG. 4 illustrates a second example of an interface enabling a user to select various prompts which may be sent to a system as a plurality of touch points associated with a user-ID. By way of one example, interface 400 of FIG. 4 illustrates that the user may use pointer 302 to select one of multiple answers to a series of questions in order for the system to provide a customized workspace experience for the user that adapts to inputs provided by the user. In a non-limiting example, interface 300 may be provided to the user with a presentation of a sentence having multiple blanks that may be filled in by the user. For example, the sentence may provide: "I'm here for (Work/Personal/School). I'm a (Business Owner/Team Leader/Team Member/Freelancer/Director) on the (Sales/HR/Creative/Marketing/Legal/Finance/IT/Multiple) team and I work with (Only Me, 2-5, 6-10, 11-15, 16-25, 25-100, 101+) team members." For example, by clicking on sentence 402 of FIG. 4, the user may fill in each of the blanks and provide various touch points to the system. In response to filling in the blanks with various answers (e.g., Work, Team Leader, Sales, and 2-5), the workflow management system may receive a plurality of touch points associated with the user's user-ID.

Some embodiments may include, based on the first plurality of touch points, customizing the workflow management account by initially altering at least one of a column option picker, an automation option picker, a third-party application integration picker, a display interface picker, or a solution picker. Customizing a workflow management account may include the system adapting the original workflow management account and interface in response to one or more touch points, such that the interface may present particular tools and options that may be more relevant to the information received from the one or more touch points. A column option picker may include a presentation of a list of options for one or more column types (e.g., columns containing data types for statuses, dates, timelines, contact information, and so on) for a workspace. An automation option picker may include a presentation of a list of options for automations (e.g., logical sentence structures with conditional triggers that may act on data and otherwise trigger actions) in a system. A third-party application integration picker may include a presentation of a list of options for third-party application integrations for a workspace (e.g., integrating a third-party application with the workspace). A display interface picker may include a presentation of a list of options for one or more presentations of information (e.g., bar chart, dynamic object displays, graphical batteries, summary statistics) for a workspace. A solution picker may include a presentation of a list of options for workflows or a package of pre-made features (e.g., simple to complex packages data objects such as columns, tables, dashboards, widgets, or a combination thereof) in a system. A bundle of pre-made features may also be described as a "solution." A solution may include a combination of all features (e.g., integration, automation, column picker, display interface, and so on) packaged together. A solution may be built from a combination of different building blocks in the system. Solutions may be any workflow functionality configured by any building blocks of the system and may be based on board templates that solve a specific use case in one of the categories. A solution may include one or more boards that may be pre-interconnected, and may include pre-set dashboards with built-in widgets that may be partially configured with the boards in the solution.

By way of one example, if a first user selects "marketing" and "CRM" (customer relationship management) in interface 300 of FIG. 3, the user may receive a platform with solutions fitted for these verticals. The user may be offered relevant templates, applications (e.g., an email application that may be already installed for CRM or other verticals) shown in interface 500 of FIG. 5, relevant data types in the form of columns, columns with pre-made titles and labels, suggested integrations and more features that may be defined by the system as relevant to that vertical (or cluster).

By way of another example, a user may set up a workflow management account to track help desk ticket tracking projects on a single board or multiple boards. The user may be tracking requests for technical support in one board and customer services responses in another board, for example. The user may indicate by a variety of touch points that the user is working in the food industry, specifically in restaurant reservation systems. In response, the system may customize the workflow management account by adapting a column option picker, adapting an automation option picker, or third-party application integration picker that may be tailored towards resolving technical issues relating to restaurant reservation platforms. Specifically, the adapted column option picker may provide a suggestion to add a column to the help desk ticket tracking board for "Status of Help Request." Additionally, an adapted automation option picker may provide a suggestion to add an automation to "Email technical support staff when a new row for a new customer support ticket has been added to the board." Further, an adapted third-party application integration picker may provide a suggestion to add an integration to "integrate a communication via WebEx to communicate with the customer." Additionally, the system may provide a suggestion to add a solution such as a template of a board for the restaurant industry or a suggestion to add a display interface that is useful for those in the restaurant industry.

In some embodiments, a solution may be a template including a combination of three boards. For example, the system may provide an adapted solution picker as a customized experience that includes a solution with parts from multiple templates (e.g., Legal board templates, project management board templates, and HR board templates), based on the provided touch points.

Figure 5:
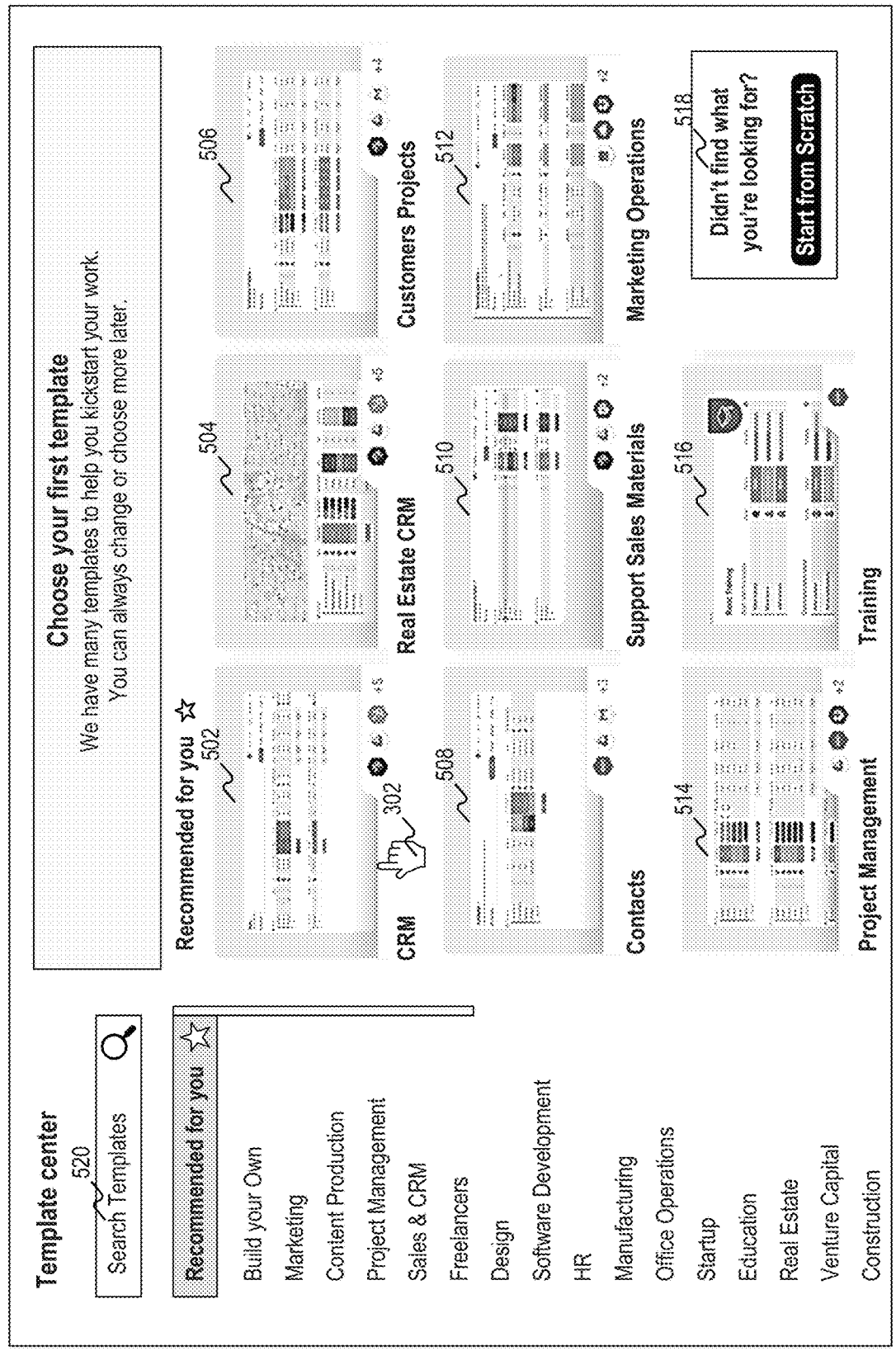
FIG. 5 illustrates an example of an interface of a customized workflow management account, consistent with some embodiments of the present disclosure.

FIG. 5 illustrates an example of an interface of a customized workflow management account with an altered solution picker, for example. Interface 500 of FIG. 5 provides multiple recommended templates to choose from based on touch points received by interacting with interface 300 of FIG. 3 and interface 400 of FIG. 4. The user may choose from CRM template 502, Real Estate CRM template 504, Customers Projects template 506, Contacts template 508, Support Sales Materials template 510, Marketing Operations template 512, Project Management template 514, and Training template 516. Additionally, if the user would like to build their own board from scratch, the user may select "Start from Scratch" button 518. Further, the user may search Templates Center 520 to find additional recommended templates in various industries such as education, start up, design, construction, and more. As shown in FIG. 5, the user may use pointer 302 to select CRM template 502 to generate a customized workflow environment with one or more boards related to CRM.

Some disclosed embodiments may include monitoring activity associated with the workflow management account. Monitoring activity may include tracking any changes or updates associated with an account or any action made by the user. By way of one example, the system may monitor which areas of the board the user is most frequently using, by clicking, typing, updating, or hovering, in order to determine which areas of the board are most useful to the user.

Some embodiments may include receiving, based on the monitoring, a second plurality of touch points associated with the user-ID. A second plurality of touch points may include any information provided to the system or identified by the system, as described previously above. By way of one example, the workflow management system may receive a second plurality of touch points when the user interacts with the account or the board. For example, each input from a user may be considered a touch point (e.g., which template the user chooses, which columns the user adds to board generated by the recommended template, which columns are removed, which integration is added, which area or the board the user is most frequently using, or any other information identified by the system or provided to the system). Each of the pieces of information derived from the user may be a second plurality of touch points that may be provided after the system received a first plurality of touch points. Additionally, any interaction with the system after the initial setup (e.g., field) to set up the team (e.g., marketing, R&D, sales, and so on) may be a second plurality of touch points.

In some embodiments, at least one of the first plurality of touch points and the second plurality of touch points are derived from responses to queries. Responses to queries may include answers to questions, both of which may be presented and received by the system. In some embodiments, the system may present an interface with a question/query to the user (e.g., which field, team, or solution would you like to manage with work OS?). Answers to the questions/queries can be presented in a variety of ways (e.g., checkbox, dropdown list, custom text input/look up). In some embodiments, the use may click a checkbox, select an option from a dropdown list, or type into a textbox in order to provide a response to a query. The responses to the queries may be provided for any touch point received by the system.

By way of one example, interface 300 of FIG. 3 illustrates that the user may use pointer 302 to select one of multiple checkboxes to provide a response to a query. Interface 300 provides the user with a question—"What would you like to manage with Work OS?" Interface 300 also provides ten check boxes for the user to select from, including, Project Management, Marketing, C R M and Sales, Creative and Design, Software Development, Task Management, Construction, H R and Recruitment, IT, and 200+ Solutions (e.g., other options to select from). Selecting any of these options may act as a first plurality of touch points or a second plurality of touch points. By responding to a query (clicking "CRM and Sales" by pointer 302), the workflow management system may receive a first plurality of touch points or second plurality of touch points associated with the user's user-ID.

In some embodiments, the queries may seek a field identification. A field identification may include indicating any category or vocational area associated with the account or that the user would like to manage. In some embodiments, the field the user would like to manage may include any field, such as legal, medical, corporate business, engineering, or any other field to provide a context to the system regarding the user's intended workflow.

For example, interface 300 of FIG. 3 illustrates that the user may use pointer 302 to select one of multiple checkboxes to provide a response to a query inquiring which field the user would like to manage within the Work OS.

In some embodiments, at least one of the first plurality of touch points and the second plurality of touch points may be derived from actions monitored in the workflow management account. Actions monitored may include any interactions or activities identified by the system. For example, the system may identify actions taken in a board or dashboard. By way of one example, the system may recognize that the user is inputting a lot of budget information and salary information, which may cue the system to recognize the user is likely on a sales or project management team. Such actions may be monitored and may influence the solutions presented to the user later, as opposed to touch points during the account set up phase. By way of another example, the system may identify that the user emails the project manager each time a new entry is added to the board. Upon monitoring actions on the board and identifying such a pattern, the system may suggest adding an automation to automatically send an email to the project manager each time a new entry is added to the board without having the user take any further action.

In some embodiments, the actions monitored may be associated with a plurality of entities and wherein actions of a first of the plurality of entities may cause customization differing from customization caused by actions of a second of the plurality of entities. A plurality of entities may include any one or more users or groups. Actions of a first of the plurality of entities may include any interaction a first entity may take with a board or account. Actions of a second of the plurality of entities may include any interaction a second entity, different from the first entity, may take with the board or account. In some embodiments, the system may monitor activities such as tracking any changes or updates associated with an account or any action made by multiple groups or users. Further, the system may provide different customization to the board based on which group provided the action. In some embodiments, there may be groups of users that are related to each other but may still get varying, customized experiences. By way of one example, a first entity may be from R&D (e.g., an engineer) and a second entity may be from Marketing (e.g., a marketing analyst) within the same company in the medical device field. For example, the engineer or others in R&D may be presented with a customization that presents tools and solutions commonly used for R&D needs (such as product development). Additionally, the marketing analyst or others in Marketing may be presented with a customization that presents differing tools and solutions that may be better suited for Marketing needs (such as market research). Even though both entities may have had the same first touch point to indicate they are from the same company (e.g., a medical device company) and that first touch point may affect their customizations, they may still experience different customizations because their later actions (after the first touch point) show that they require different customizations.

Some embodiments may include adjusting the customized workflow management account by subsequently altering, based on the second plurality of touch points at least one of the column option picker, the automation option picker, the third-party application integration picker, the display interface picker, or the solution picker. Adjusting the customized workflow management account may include the system adapting the already customized workflow management account and interface in response to one or more secondary touch points to re-render the updated customized workflow management account. Adjusting the customized workflow management account may include altering the previously described column option picker, automation picker, third-party application integration picker, display interface picker, and/or the solution picker to present updated options for selection. In some embodiments, adjusting the customized workflow management account may include readjusting the already adjusted/customized workflow management account and interface. For example, options for each of the features (column option picker, automation option picker, integration picker, display interface picker, and solution picker) may change to customize to workflows that are most relevant to the user. By way of one example, if the system determined the user is a customer caller by monitoring activity associated with the workflow management account, the system may adjust the customized workflow management account by altering the third-party application integration picker to present all of the communication integrations (Zoom, Teams, and Skype) towards the top and leave out integrations typical to R&D (e.g., Matlab and statistical analysis).

FIG. 6 illustrates an example of an interface with a customized workflow management account. After answering the questions presented in FIG. 3 and FIG. 4 and selecting a template in FIG. 5 (all considered touch points), the system may provide the user with a customized board shown in interface 600 related to specific types of project the user may be managing. Board 602 and Board 606 are boards customized based on the touch points collected from the user's interactions with the system and answers to various questions. The user may also add new rows to the boards using "Add" button 604 and "Add" button 608. The user may also use pointer 302 to interact with the boards further and provide further customization to the user experience and workflow management account.

Some disclosed embodiments may include permitting a plurality of entities to have access to the plurality of workflow management boards, wherein the second plurality of touch points may include at least one touch point received from a first entity of the plurality of entities and at least one touch point received from a second entity of the plurality of entities, and wherein the subsequent altering may result in a common visualization to both the first entity and the second entity. Permitting a plurality of entities to have access the plurality of workflow management boards may include allowing multiple users or groups to interact with or view one or more workflow management boards. In some embodiments, workflow management boards may be a common workspace, a common board, or a common dashboard where multiple people may user the same space. A common visualization may include a unified presentation of information contained in a workspace or account two which multiple entities may have access. No matter which entity impacted the altering of the board, workspace, or account, both the first and second entities may be able to access and view the common visualization as a result of touch points provided by both the first and second entities. In some embodiments, the common visualization may also include a presentation of solutions and workflows (columns, automation packages, etc.) that are offered in common to the first and second entities.

By way of one example, a plurality of entities (a team leader and multiple team members) may have access to a board for a project they are all working on. Both of the entities, the team leader and the multiple team members, interact with the board by hovering over certain columns, clicking certain cells, and deleting some rows. The interactions by the two entities may be the touch points received by the system. In response to these interactions, the system may alter certain features offered on the board (column option picker, automation option picker, integration picker, display interface picker, and solution picker). The board may be altered in such a way as to provide a single, common visualization to both the first entity (team leader) and the second entity (team members). Both entities may be able to view and access the same board with the same altered features no matter which entity impacted the altering of the board, workspace, or account.

Some embodiments may include permitting a plurality of entities to access the plurality of workflow management boards, wherein the second plurality of touch points may include at least one touch point received from a first entity of the plurality of entities and a touch point received from a second entity of the plurality of entities, and wherein subsequently altering may result in an altered customized visualization for the first entity different from an altered customized visualization for the second entity. An altered customized visualization may include re-rendering the customized visualization, as previously discussed, with alterations made to the customized visualization. In some embodiments, the altered customized visualizations may also include two presentations of solutions and workflows (columns, automation packages, etc.) that are varied and separately offered to the first and second entities based on their own touch points provided to the system. In such an embodiment, the system customizes the presentation of solutions to pick for each of the first and second users. For example, a plurality of entities (a team leader and multiple team members) may have access to a board for a project they are all working on. Both entities, the team leader and the multiple team members, may interact with the board by hovering over certain columns, clicking certain cells, and deleting some rows. The interactions by the two entities may be considered touch points received by the system. In response to these interactions, the system may alter certain features offered on the board (column option picker, automation option picker, integration picker, display interface picker, and solution picker) for one of the entities based on their interactions with the board and alter other features offered on the board (column option picker, automation option picker, integration picker, display interface picker, and solution picker) for the other entity based on their interactions with the board. The boards may be altered in such a way as to provide two different altered customized visualization to the first entity (team leader) and the second entity (team members) based on their interactions with the board. Each entity may be able to view and access different boards with different altered features that may be catered to them based on their touch points and past actions.

Some embodiments may include receiving an additional plurality of touch points and further customizing the workflow management account based on an additional plurality of touch points. In some embodiments, the system may continue to receive touch points and may continue to customize the workflow management account to generate a more customized experience for the user. In other words, the customized workflow management account may continue to learn from the user's touch points and activities to continuously provide relevant tools, solutions, and visualizations to adapt to the user's activities and updates. In one embodiment, additional touch points may be from a modification of the field, team, or solutions set up, or may be based on actions taken in a board. In another example, where a user is adding multiple solutions, the combination of solutions may lead the system to determine different solutions that are helpful in view of what the user has added (e.g., a constantly learning system that continues to customize the options presented to the user).

Some disclosed embodiments may include analyzing behavior associated with the workflow management account, and deriving the second touch points based on the analysis of the behavior. Analyzing behavior may include monitoring any interaction with a board, workflow, or account to determine a user interaction, multiple user interactions, or patterns of interactions, which may be used for further processing, such as for making updated recommendations of tools and solutions. By way of one example, the system may analyze behavior including any interaction the user had in setting up the board. Additionally, the system may track where the user may click in the workflow management account or workspace. For example, if a user is constantly clicking between the board and a dashboard to see summary information, the system may suggest a visualization in the board itself to help the user be more efficient.

Figure 7:
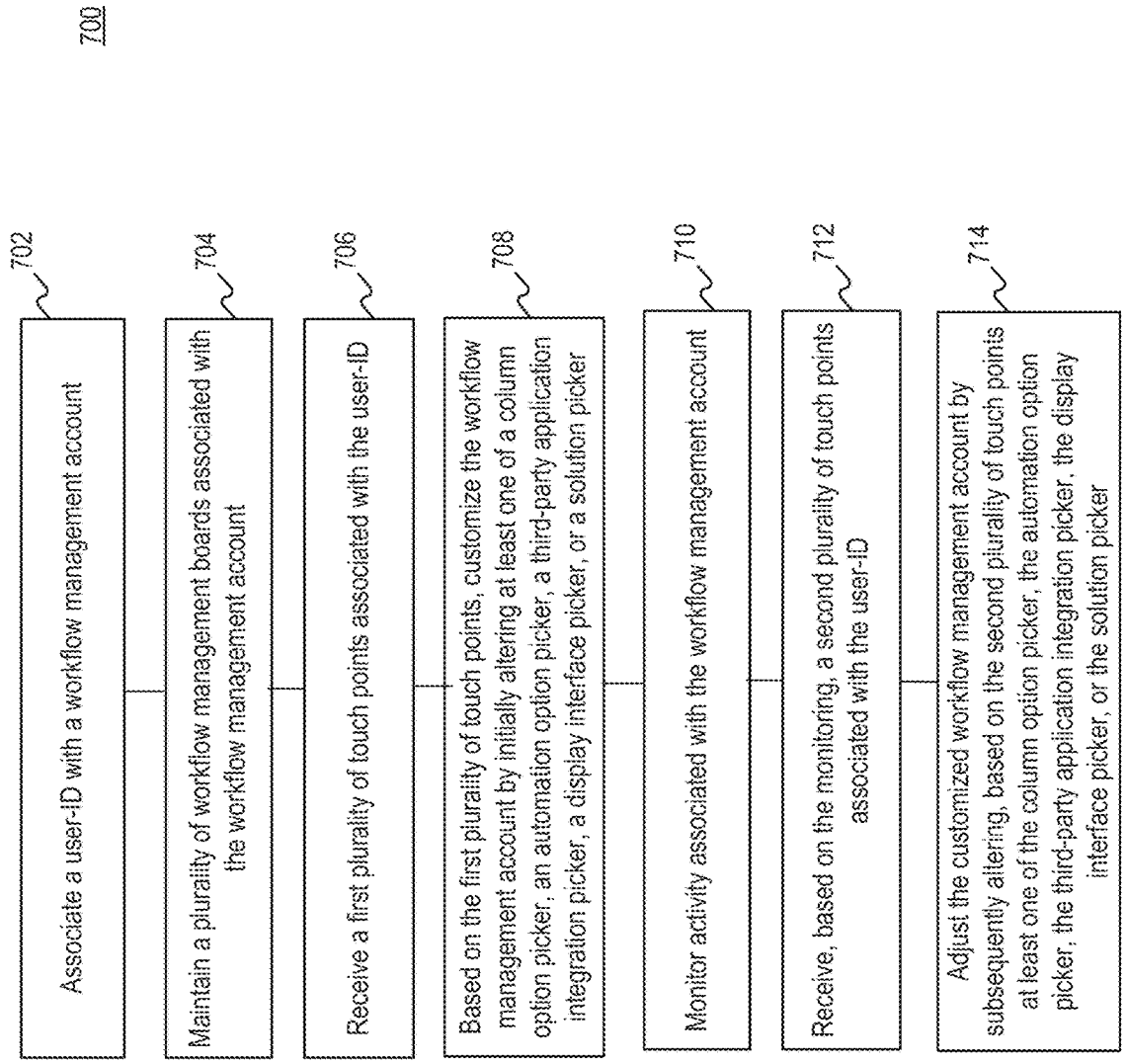
FIG. 7 illustrates a block diagram of method 700 performed by a processor of a computer readable medium containing instructions, consistent with some embodiments of the present disclosure.

FIG. 7 illustrates a block diagram of method 700 performed by a processor of a computer readable medium containing instructions, consistent with some disclosed embodiments. The block diagram includes an example and is not restrictive of the broader and alternative discussions previously presented. In some embodiments, the method may include the following steps:

Block 702: Associate a user-ID with a workflow management account. In some embodiments, a system may associate an identifier, e.g., name, number, ID, client device, client account, associated with an account for a workflow management provider, as previously described, for example.

Block 704: Maintain a plurality of workflow management boards associated with the workflow management account. In some embodiments, the system may have access to multiple tables associated with the account. Each of the tables may include rows, columns, and cells to manage data, as previously described, for example.

Block 706: Receive a first plurality of touch points associated with the user-ID. In some embodiments, the system may receive data, such as touch points or answers to various questions, that are associated with the identifier, as previously described, for example.

Block 708: Based on the first plurality of touch points, customize the workflow management account by initially altering at least one of a column option picker, an automation option picker, a third-party application integration picker, a display interface picker, or a solution picker. In some embodiments, the system may provide an updated and personalized workflow management account with various different options for customizing tables, as previously described, for example.

Block 710: Monitor activity associated with the workflow management account. In some embodiments, the system may continue to monitor any updates or changes the user may make in the personalized workflow management account, as previously described, for example.

Block 712: Receive, based on the monitoring, a second plurality of touch points associated with the user-ID. In some embodiments, the system may receive additional data, such as touch points or updates to the workflow management account, that are associated with the identifier, as previously described, for example.

Block 714: Adjust the customized workflow management account by subsequently altering, based on the second plurality of touch points at least one of the column option picker, the automation option picker, the third-party application integration picker, the display interface picker, or the solution picker. In some embodiments, in response to the additional data, the system may provide an updated and personalized workflow management account with various different options for customizing tables, as previously described, for example.

Aspects of this disclosure may provide a technical solution to challenges associated with collaborative work systems. Some disclosed embodiments include methods, systems, devices, and computer-readable media. For ease of discussion, an example system for data extraction and mapping system is described below with the understanding that aspects of the example system apply equally to methods, devices, and computer-readable media. For example, some aspects of such system may be implemented by a computing device or software running thereon. The computing device may include at least one processor (e.g., a CPU, GPU, DSP, FPGA, ASIC, or any circuitry for performing logical operations on input data) to perform the example systems, as described above. Other aspects of such systems may be implemented over a network (e.g., a wired network, a wireless network, or both). As another example, some aspects of such system may be implemented as operations or program codes in a non-transitory computer-readable medium. The operations or program codes may be executed by at least one processor. Non-transitory computer readable mediums, as described herein, may be implemented as any combination of hardware, firmware, software, or any medium capable of storing data that is readable by any computing device with a processor for performing methods or operations represented by the stored data. In a broadest sense, the example systems are not limited to particular physical or electronic instrumentalities, but rather may be accomplished using many differing instrumentalities.

Tools for data extraction and mapping system to map a sub-data source and a visualization template for co-presentation of a representation a particular board and the sub-data visualization are lacking. Accordingly, some embodiments may include data extraction and mapping system with a main data source containing a plurality of data objects where a plurality of linkages between at least some of the plurality of data objects may be constructed to map a sub-data source and a visualization template selection to generate a sub-data visualization. The system may also cause a co-presentation of a representation a particular board and the sub-data visualization. Some of these embodiments may create efficiencies in the data processing, reduce costs associated with memory, distributed memory, communication across multiple networks, and increase reliability needed in processors. Further, some embodiments may improve accuracy in the generation of sub-data visualizations.

Therefore, there is a need for unconventional methods, systems, devices, and computer-readable media for data extraction and mapping system. The system may include maintaining a data source containing a plurality of data objects represented by a plurality of boards where a plurality of linkages between at least some of the plurality of data objects may be constructed to map a sub-data source and a visualization template selection. Further, the system may generate a sub-data visualization causing a co-presentation of a representation a particular board and the sub-data visualization. By using the disclosed computerized method to ascertain data extraction and mapping system, the embodiments provide advantages over prior systems that merely provide data extraction and mapping.

Some disclosed embodiments may relate to a data extraction and mapping system having at least one processor (e.g., processor, processing circuit or other processing structure described herein) in collaborative work systems, including methods, devices, and computer-readable media. Data may refer to any type of information such as numbers, texts, characters, formats, characteristics, qualitative or quantitative variables, units, index, objects, metadata, constants, unstructured information (e.g., web pages, emails, documents, pdfs, scanned text, mainframe reports, spool files, or any other unstructured information), tables, or any combination thereof. Data extraction may refer to the process of obtaining or retrieving data from one or more systems, databases, platforms, or any combination thereof. A mapping system may refer to a system configured to process of transforming data from one database into another database (e.g., between systems, through a representation as GUI, or any combination thereof that may implement the use of artificial intelligence/machine learning). For example, a system may be capable of extracting data from different data structure or different data sets (e.g., data from different workflows or tables).

Some disclosed embodiments may involve maintaining a main data source containing a plurality of data objects. Maintaining a main data source may refer to all sources of information that may be stored in a data repository, a storage medium, or a database for one or more systems or platforms. Each data object of the plurality of data objects may refer to any object capable of containing data such as a cell, column, row, table, dashboard, widget, solution, or any combination thereof capable of dynamically or continuously storing, changing, adding, subtracting, modifying, transforming, rearranging, categorizing, or any combination thereof of data contained in the data objects. The aggregation of the data contained in each data objects may form the data in main data source.

Figure 8:
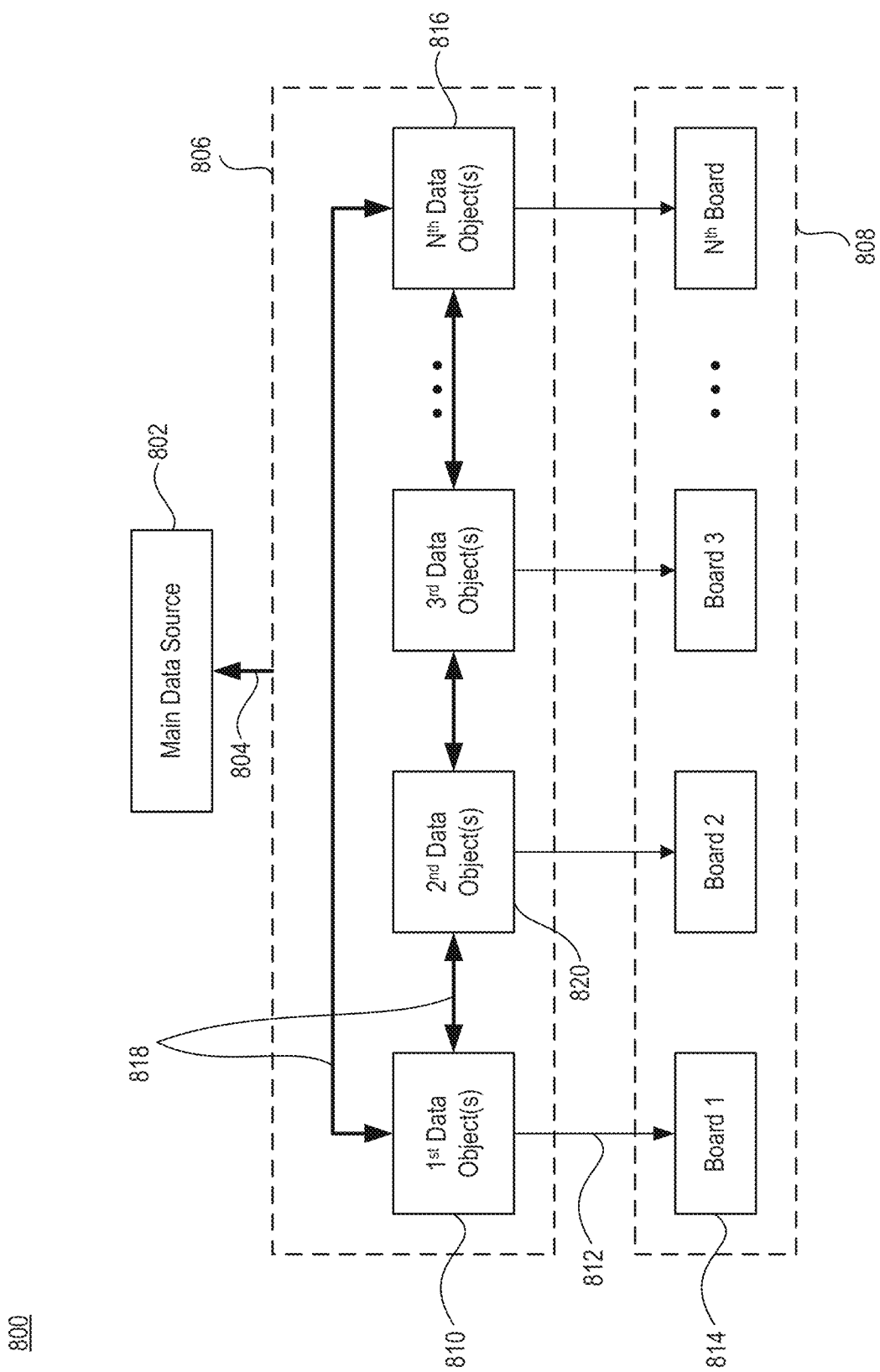
FIG. 8 illustrates an exemplary diagram of a main data source containing a plurality of data objects, consistent with some embodiments of the present disclosure.

By way of example, the at least one processor may store the plurality of data objects in memory 120 in FIG. 1, the storage 130 in FIG. 1, or both. FIG. 8 illustrates exemplary diagram of a main data source containing a plurality of data objects, consistent with some embodiments of the present disclosure. FIG. 8 illustrates a system 800 having a main data source 802 where data 804 from a plurality of data objects 806 may be stored in the main data source 802. Furthermore, the plurality of data objects 806 may contain one or more data objects (i.e., "data object(s) 1," "data object(s) 2," "data object(s) 3" to "$N^{th}$ data object(s)").

Some disclosed embodiments may involve maintaining a plurality of boards for presenting the plurality of data objects. Maintaining a plurality of boards may refer to one or more boards stored in a repository for access at a later time, as discussed above. A board may represent a single data object having one or more other data objects. A board may contain a listing of data such as, for example, one or more tables, Gantt charts, calendars, pie charts, line charts, bar charts, 3D charts, forms, maps, density maps, scatter plots, bubble charts, tree maps, rain flow charts, timelines, tabs, filters, or any combination thereof. The plurality of boards may include one or more identical or differing boards. The plurality of boards may contain data from the plurality of data objects. Presenting the plurality of data objects may refer to displaying data derived from the plurality of data objects on any device such as a monitor, touchscreen, projector, and so on.

By way of example, the at least one processor may store the plurality of boards in memory 120 in FIG. 1, the storage 130 in FIG. 1, or both. As illustrated in FIG. 8, the plurality of data objects 806 may be presented by the at least one processor into the plurality of boards 808 on any device. The plurality of data objects 806 may contain a first data object (s) 810 whose data set 812 may be represented as a first board 814 in the plurality of boards 808.

Some disclosed embodiments may involve maintaining a plurality of linkages between at least some of the plurality of data objects that may be associated with differing boards of the plurality of boards. A plurality of linkages may refer to one or more relationships or association between one or more data objects that may be established manually or automatically. Automatic linkages may be established based on any characteristics of the data objects such as the information contained in the data objects (e.g., common contact information, common entities), information associated with the data objects (e.g., column headings, author information of boards), or based on established dependencies between the data objects (e.g., mirrored columns that draw information from a first board to a second board or a rule or automation that may link data objects). The plurality of linkages may include data from one or more data objects. A linkage may include shared data between a first data object and a second data object or a first data object and a plurality of data objects via at least one link to access the shared data. For example, data from one data object may be sent to another data object or vice versa. In some exemplary embodiments, where a first data object is a first cell on a first table and a second data object, that is linked to the first data object, is a second cell in a second table, clicking on the first cell may initiate a transfer of data from the second cell to the first cell, or vice versa. At least some of the plurality of data objects may refer to a portion of or all of the plurality of data objects. Differing boards may refer to one or more boards being identical or distinct from each other.

Some disclosed embodiments may involve at least some of the plurality of data objects associated with differing boards to include multiple data objects from each of the differing boards. Multiple data objects may refer to at least one or more data objects, as previously described above. The multiple data objects for each of the differing boards may contain data that may be similar or different from each other. Data objects from a board may contain data associated with data objects from one or more other differing boards. For example, the at least some of the plurality of data objects may include a first group of multiple data objects from a first board and a second group of multiple data objects from a second board that differs from the first board.

By way of example, the system may store a plurality of linkages in memory 120 in FIG. 1, the storage 130 in FIG. 1, or both. As illustrated in FIG. 8, the plurality of data objects 806 may include a first data object(s) 810, a second data object(s) 820 and an $N^{th}$ data object(s) 816. The plurality of data objects 806 may also include a plurality of linkages 818 between the first data object(s) 810, the second data object(s) 820, the first data object(s) 810, and the $N^{th}$ data object(s) 816.

Some disclosed embodiments may involve the plurality of linkages being defined by at least one of a folder, an automatic rule, a manually defined rule, a column heading, a row designation, a data cell value, or an item. A folder may refer to a virtual cabinet, tab, or any combination thereof reserved for generating, defining, or storing information. A plurality of linkages associated with the at least some of the plurality of data objects may be based on the fact that some of the data objects contain information from the same folder that may have been established by a user or the system. An automatic rule may be referred to as an automation or logical sentence structure, which may be a logical rule with one or more logical connectors, and configured to act on table data to produce an outcome. An automatic rule may also be considered as a "recipe" having a logical organization of elements for implementing a conditional action. The automatic rule, for example, may be in the form of a recipe, a template, or a sentence including one or more triggering elements (also referred to herein as "triggers") and one or more action elements (also referred to herein as "actions"). An automatic rule may be configured to associate or link data contained in the at least some of the plurality of data objects. The at least one processor may independently generate the automatic rule in response to an input by the user that may not be associated with the establishment of the plurality of linkages. A manually defined rule may be similar to an automatic rule, as described above; however, a user may define the rule for associating or linking data contained in the at least some of the plurality of data objects. A row designation may refer to identifying or recognizing an index or value that may define a row of a table having a plurality of columns and rows such as a row heading for example. The row designation may be an index identifying the location of the row in the table or a title. A data cell value may refer to a value contained in one or more cells of a table. An item may refer to a data object (e.g., a row or a column) that may be represented by one or more texts, numbers, expressions, titles, formats, color, or any combination thereof in one or more rows, columns, or cells of a table. For example, the at least one processor may define the plurality of linkages between a plurality of boards based on a common row designation that may be found in each of the plurality of boards. In another example, an automatic rule may be configured to monitor conditions and/or act on data in a first and a second board. Because the automatic rule is associated with both the first and second boards, both boards may be considered linked via the automatic rule.

Figure 9A:
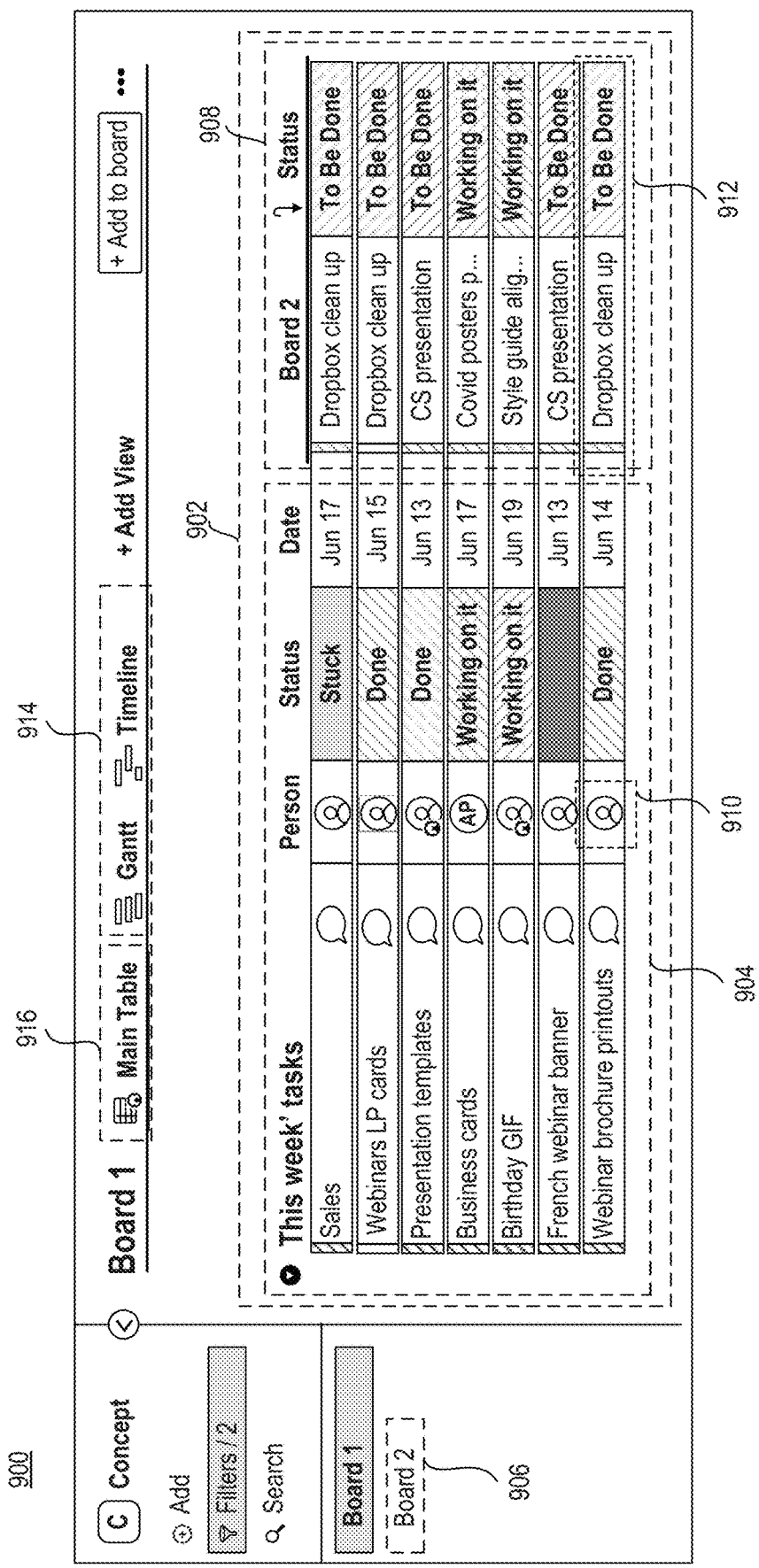
Figure 9B:
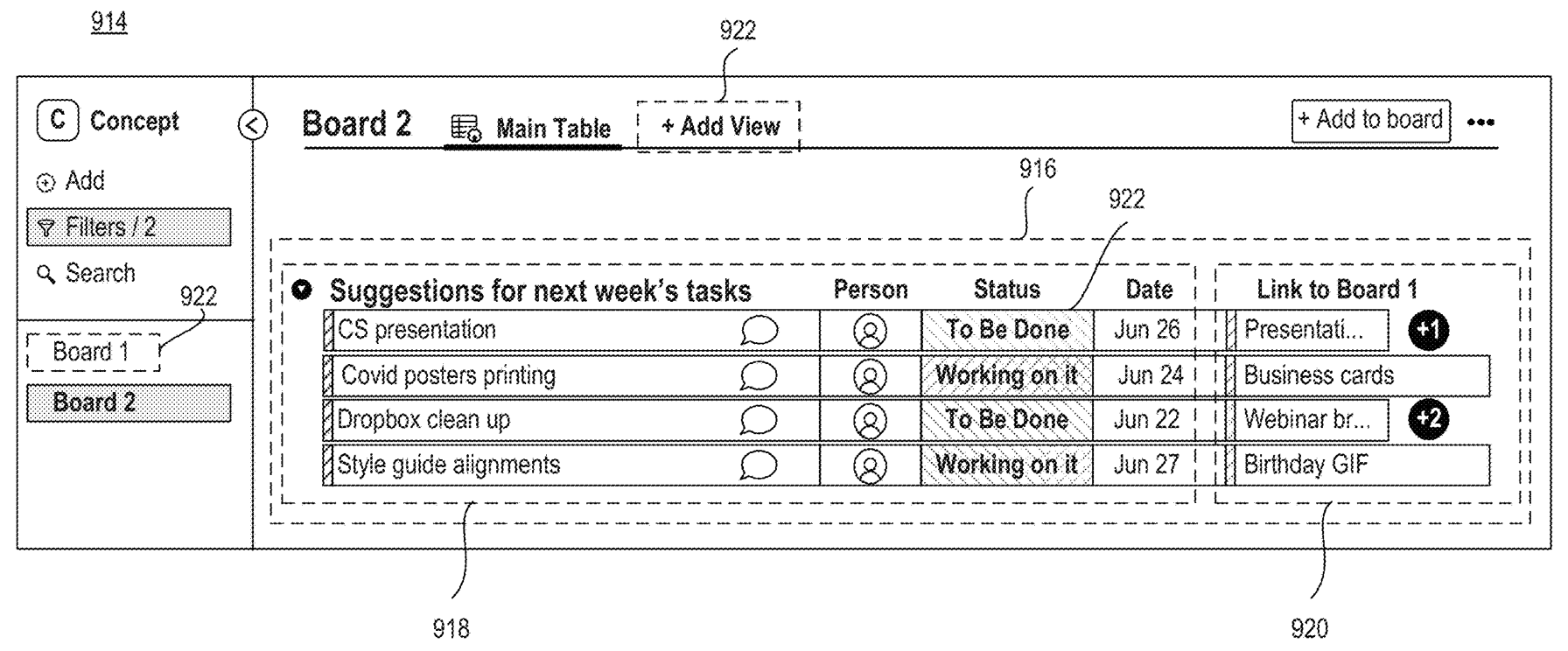

FIGS. 9A and 9B illustrate exemplary views of a plurality of linkages between at least some of the plurality of data objects associated with differing boards, consistent with some embodiments of the present disclosure. FIG. 9A illustrates a first board 900 which may be table 902 containing a first set of data objects 904 that includes a plurality of column headings, row designations, data cell values, and items. A user may manually define an automatic rule for a plurality of linkages between the first board 900 and a second board 906 through a second set of data objects 908 that may be mirrored from a second board 906, as shown in FIG. 9B as second board 914. Mirroring column 908 of FIG. 9A may include generating an identical copy of a column from another board (status column 922 of FIG. 9B) such that when a cell of the column 908 is altered, the same corresponding cell in column 922 will also be altered, and vice versa. Because mirrored columns may be considered to include linkages between boards, an automatic rule may act conditionally on data based on these linkages, such as a Date column of board 902 and the mirrored column 908. FIG. 9B illustrates second board 914 which may be a table 916. The second board 914 may contain the second data objects 918 in FIG. 9B that are mirrored (e.g., linked such that data in the mirrored column is automatically updated in any location the mirrored column exists) into the second set of data objects 908 of the first board 902 of FIG. 9A.

Some disclosed embodiments may involve receiving a selection of a particular data object associated with a particular board. Receiving a selection of a particular data object may include receiving an input from an interface (e.g., a mouse, keyboard, touchscreen), which in some embodiments, may indicate an intent to manipulate information in a specific data object or a specific board. For example, the at least one processor may receive a selection from a user selecting one or more data objects such as cells, columns, rows, column headings, items, row designations, data cell values, or any combination thereof that may be associated with a particular data object in a particular board.

Some disclosed embodiments may involve identifying via a particular linkage of the plurality of linkages at least one additional data object on another board linked to the particular data object on the particular board. Identifying an additional data object on another board via a particular linkage may include the system making a determination that an additional data object on another board is associated with a selected data object. This determination may be based on any of the previously described links such as through a characteristic of data contained. For example, a user may select a particular data object in a particular board, and the at least one processor may identify a particular linkage between the particular data object and one or more additional data objects associated with another board of the user or to a different user. For example, in an exemplary embodiment, a user may select a cell on one table and the processor may detect a link, or identify a linkage, between that cell and another cell in a different (or same table).

Some disclosed embodiments may involve defining a sub-data source where the sub-data source may aggregate the at least one additional data object and the particular data object. A sub-data source may include a subset of the main data source based on a certain criterion such data objects that are associated with a selected data object. The associated data objects may be based on a particular link or based on a plurality of linkages in order to form a sub-data source. The sub-data source may be an aggregate of a particular data object and its associated additional data objects that may be from other boards, such that the sub-data source may be stored in a repository for later access and reduce the need for re-generating the sub-data source. Depending on the context, the activity, or the operation related to one or more boards having at least some of the plurality of data objects and plurality of linkages, the at least one processor may dynamically or simultaneously store data from the main data source into a sub-data source. For example, the at least one processor may define a sub-data source based on a user's generation of one or more boards. The one or more boards may have a plurality of data objects that may or may not have a plurality of linkages, which the at least one processor may aggregate into the sub-data source that may be accessed later.

Figure 10:
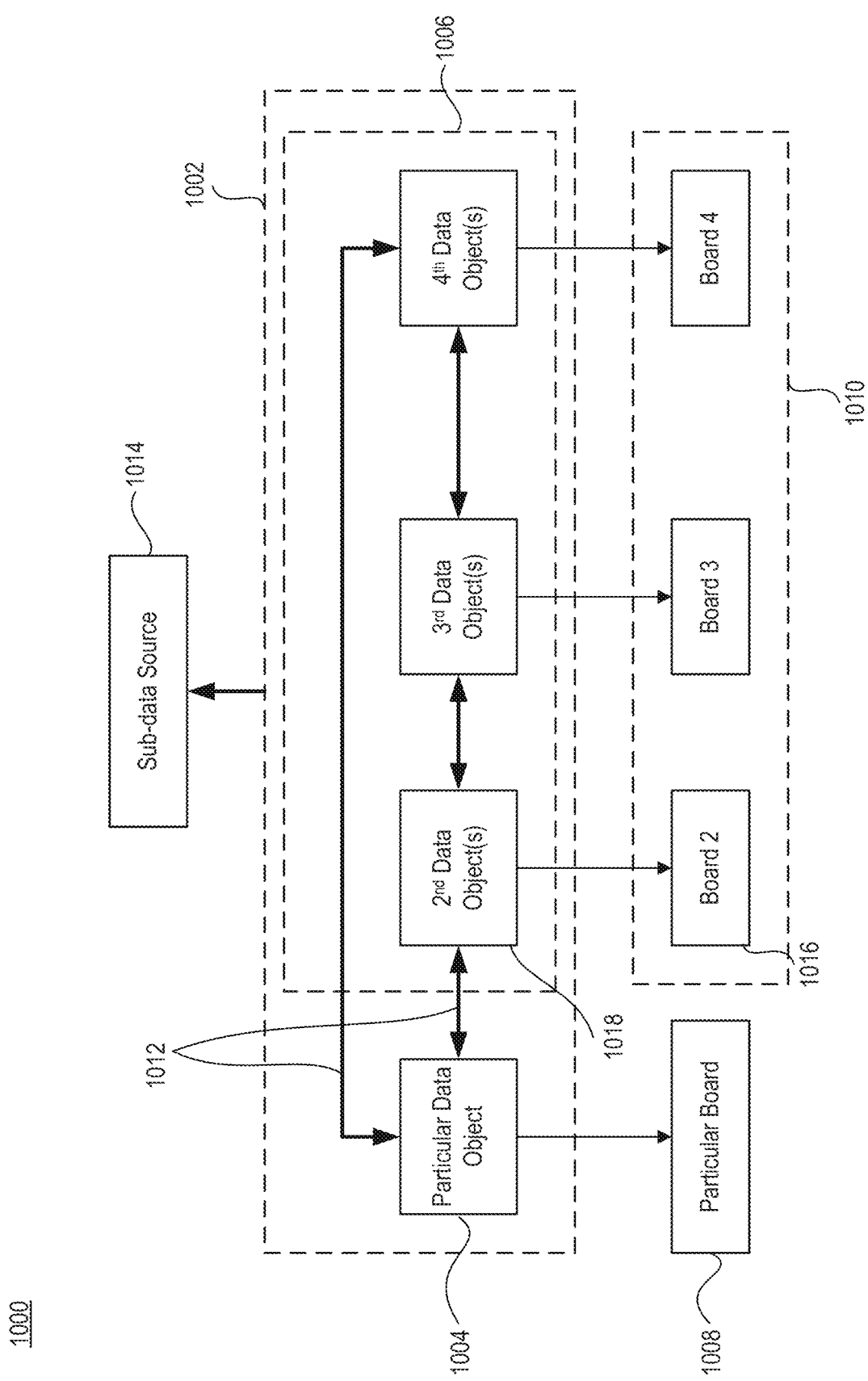
FIG. 10 illustrates an exemplary diagram of a sub-data source aggregating at least one additional data object and a particular data object, consistent with some embodiments of the present disclosure.

By way of example, the system may store a sub-data source in memory 120 in FIG. 1, the storage 130 in FIG. 1, or both. FIG. 10 illustrates an exemplary diagram of a sub-data source aggregating at least one additional data object and a particular data object, consistent with some embodiments of the present disclosure. FIG. 10 illustrates a block diagram 1000 having a plurality of data objects 1002. The plurality of data objects 1002 may contain a particular data object 1004 and three additional data objects 1006. The particular data object 1004 may be associated with a particular board 1008, and the three additional data objects 1006 may be associated with their respective additional boards 1010. The particular data object 1004 and the three additional data objects 1006 may share a plurality of linkages 1012. The particular data object 1004, the three additional data objects 1006, and the plurality of linkages 1012 may be stored in sub-data source 1014. In other instances, a particular linkage may result in a different subset of additional data objects that are aggregated with the particular data object to form the sub-data source. If for example, a selected data object is a cell containing information about a particular individual and the particular individual is only found in one additional data object of "Board 2" 1016 of the additional boards 1010, then the sub-data source may be an aggregate of just the particular data object 1004 of the particular board 1008 and the second data object 1018 of "Board 2" 1016 through the particular linkage involving the information pertaining to that particular individual.

Some disclosed embodiments may involve receiving a visualization template selection. Receiving a visualization template selection may refer to receiving an input through any interface (e.g., mouse, keyboard, touchscreen) via a GUI window indicating an intent to select a visual template for representing data. The visualization template may be selected from a predefined list of varying visualization templates or may be customized that may involve multiple visualizations. The visualization template selection may be indicated by the user by clicking a tab or a button on a board. The visualization template selection may be a separate and distinct GUI from the boards. The visualization template selection may be integrated inside the boards. The visualization template selection may allow the user to select a plurality of widgets to add and place in specific locations inside the GUI window. A widget may be an example of a visual representation of data such as one or more progress bars, graphical batteries, level indicator, tables, Gantt charts, calendars, pie charts, line charts, bar charts, 3D charts, forms, maps, density maps, scatter plots, bubble charts, tree maps, rain flow charts, timelines, to do lists, numbers, time trackers, workload displays, dynamic object displays, countdown displays, or any combination thereof. The visualization template selection may allow a user to place one or more widgets or other visualizations in the GUI window according to the user's preference. The visualization template selection may be stored in memory by the at least one processor for later use for any sub-data sources that are aggregated.

Figure 11A:
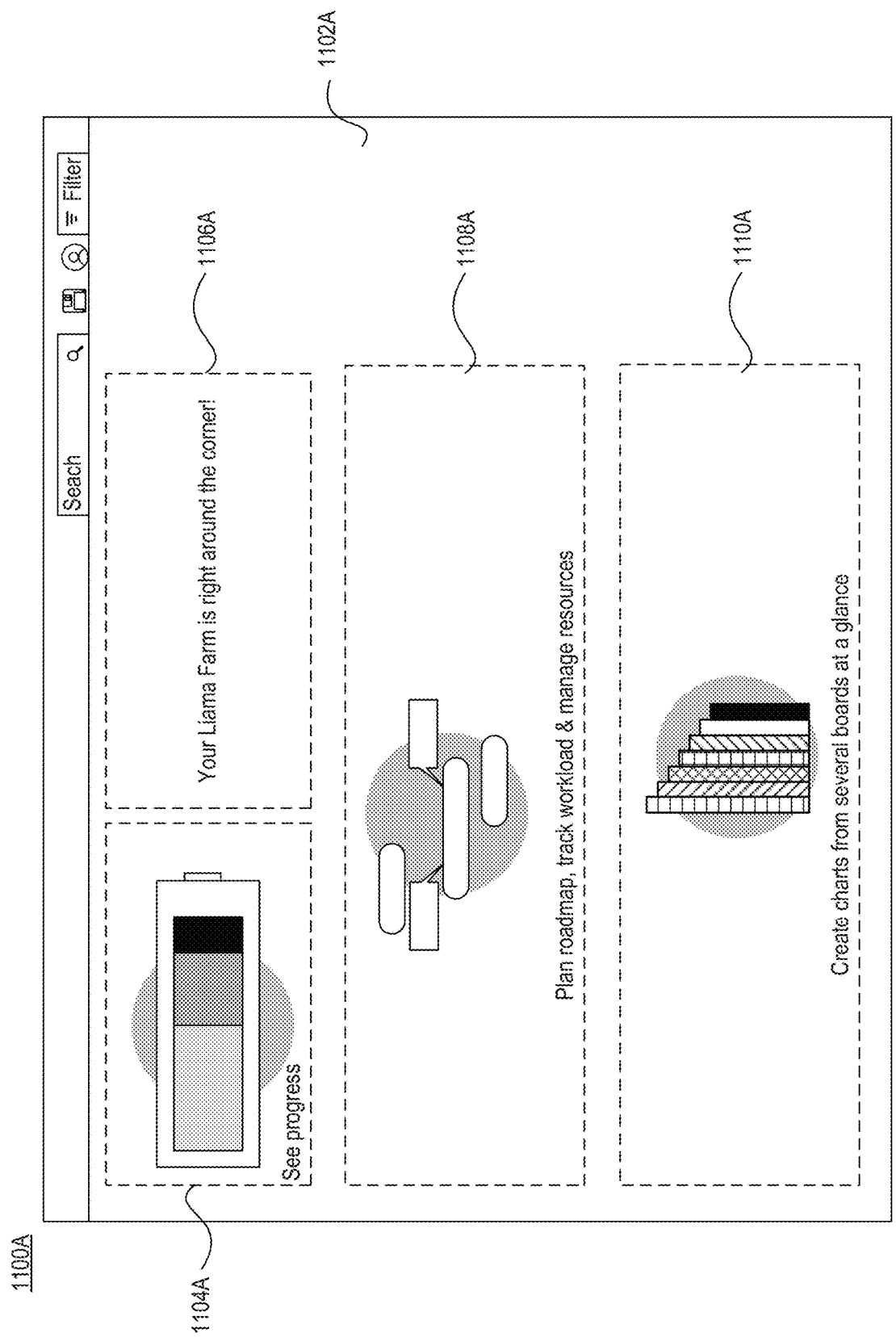
FIGS. 11A & 11B illustrate an exemplary visualization template selection and a sub-data visualization, consistent with some embodiments of the present disclosure.

By way of example, the at least one processor may store the visualization template selection in memory 120 in FIG. 1, the storage 130 in FIG. 1, or both. FIG. 11A illustrates exemplary visualization template selection, consistent with some embodiments of the present disclosure. FIG. 11A illustrates a GUI 1100A for visualization template selections having a GUI window 1102A. A user may activate the GUI 1100A for a visualization template selection by clicking on, for example, an "Add View" tab 922 in FIG. 9B. In FIG. 11A, the user may select a battery status widget 1104A to be placed at the top left, a llama farm status widget 1106A to be placed at the top right, a Gantt chart widget 1108A to be placed under both the batter status widget 1104A and the llama farm status widget 1106A, and a bar chart widget 1110A to be placed under the Gant chart widget 1108A in the GUI window 1102A. The placements of any of the widgets or visualizations may be arranged in any matter according to a preset (default) arrangement, a random arrangement, or an arrangement according to user preference. Further, the particular widgets and visualizations implemented may be selected by a user and may also be removed according to user preference.

Some disclosed embodiments may involve mapping the sub-data source to the visualization template selection to generate a sub-data visualization. A sub-data visualization may refer to a presentation or visualization of information contained in the sub-data source as discussed previously above. The sub-data visualization may involve mapping the sub-data source to the selected visualization templates as discussed above either manually (e.g., through settings to match data objects to aspects of visualizations) or automatically (e.g., through machine learning or through auto-recognition). The at least one processor may map the data contained in the sub-data source for transformation into a visual representation that may include one or more visualizations to provide summary or detail information of the data contained in the sub-data source.

Figure 11B:
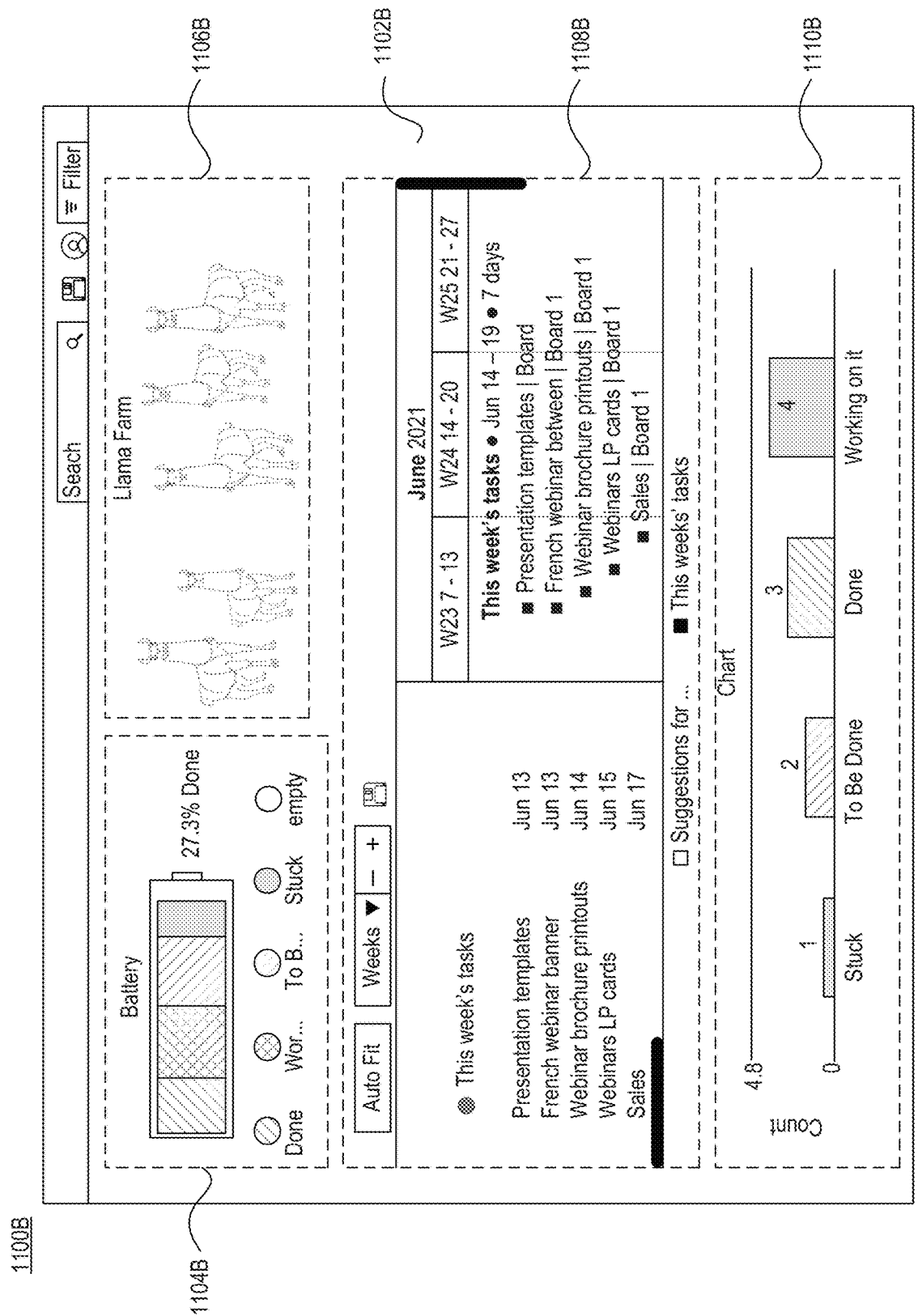

By way of example, the at least one processor may store the data-source visualization in memory 120 in FIG. 1, the storage 130 in FIG. 1, or both. FIG. 11B illustrates an exemplary sub-data visualization, consistent with some embodiments of the present disclosure. FIG. 11B illustrates a sub-data visualization 1100B having a GUI window 1102B. A user may map a sub-data source to the selected visualization templates shown in GUI 1100A in FIG. 11A to generate the sub-data visualization 1100B in FIG. 11B.

Some disclosed embodiments may involve the sub-data visualization being presented within a container, and where the at least one processor may be configured to associate a computing application to the sub-data source to thereby alter the sub-data visualization. A container may refer to a dynamic window or canvas containing one or more widgets capable of being presented or viewed alongside one or more tables within a board when the user may select an item in the table of the board. The container may disappear, minimize, or may be prevented from being presented or viewed alongside the one or more tables within the board when the user unselects the item in the table. The container may present the sub-data visualization, as discussed above. A computer application may refer to any application such as a customized application generated within the system or any external applications such as the suit of Microsoft™ applications, Google™ webpages and applications, Facebook™, Twitter™, or any other computer related applications. For example, a user may add a widget associated with Microsoft™ Word and Excel to an existing sub-data visualization for the at least one processor to append data contained in the widget associated with Microsoft™ Word and Excel to the sub-data source. The at least one processor may further alter the sub-data visualization to reflect the appended data contained in the widget associated with Microsoft™ Word and Excel.

Some disclosed embodiments may involve causing a co-presentation of a representation of the particular board and the sub-data visualization. A co-presentation of a representation of the particular board and the sub-data visualization may refer to the at least one processor simultaneously presenting a particular board and a sub-data visualization associated with the particular board on a GUI. The at least one processor may also simultaneously display the particular board and the sub-data visualization of another board linked (referring to the plurality of linkages) or not linked to the particular board. For example, a particular board may include a table containing one or more particular data objects. The at least one processor may cause a co-presentation of the table in the board and a timeline chart in a sub-data visualization for the board. In another example, the at least one processor may cause a co-presentation of the table in the board linked to another board and a Gantt chart of the other board in the sub-data visualization. In yet another example, the at least one processor may cause a co-presentation of a first sub-data visualization, a second sub-data visualization, and a table in a particular board.

Figure 12:
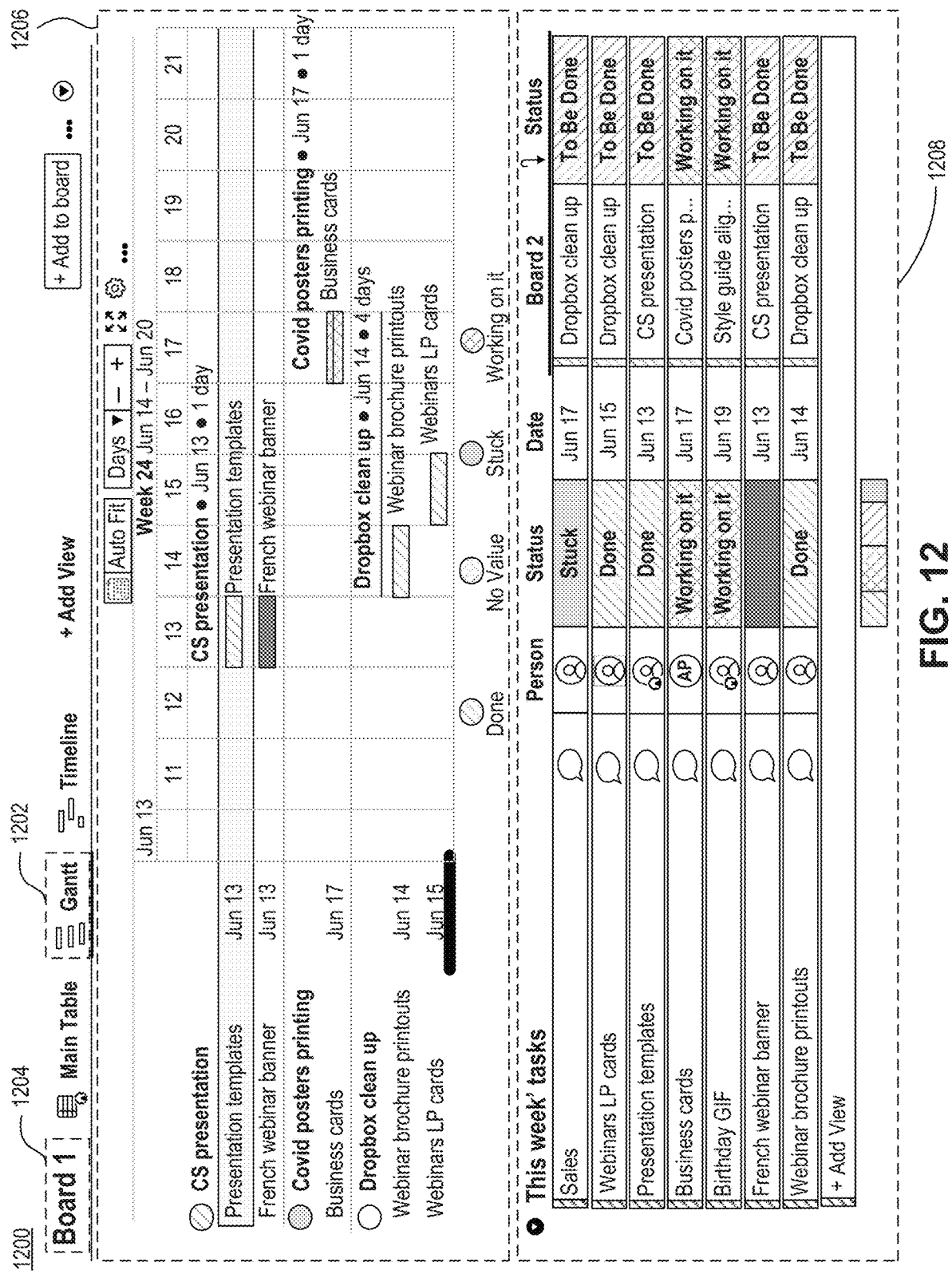
FIG. 12 illustrates an exemplary view of co-presentation of a representation of the particular board and the sub-data visualization, consistent with some embodiments of the present disclosure.

By way of example, FIG. 12 illustrates exemplary view of co-presentation of a representation of the particular board and the sub-data visualization, consistent with some embodiments of the present disclosure. As illustrated in FIG. 12, the at least one processor may cause a co-presentation 1200 of a particular board 1208 having a table and a sub-data visualization 1206 having a Gantt chart. The co-presentation 1200 may be accessed or minimized by a user clicking tab 1202. The particular board 1208 having the table may be associated with "Board 1" 1204. It is to be understood this is one non-limiting example at that the sub-data visualization 1206 may present any sub-data visualization such as those illustrated in FIG. 11A (in an unconfigured state) or in FIG. 11B (in a configured state) in a co-presentation 1200 as shown in FIG. 12.

Some disclosed embodiments may further involve presenting an index of a plurality of visualization templates, and where the received visualization template selection may be based on a selection from the index. The plurality of visualization templates may all be displayed by the at least one processor to a user on a GUI window for a particular board in the form of an index. An index of a plurality of visualization templates may refer to any listing of visualization templates, such as through a marketplace, a list (e.g., a full list or a drop-down), or through a look up in a search bar, or any combination thereof. The index of the plurality of visualization templates may be a preset list from the system, or the index may also be dynamic in that it may include new visualization templates added to the system (e.g., customized visualizations generated by users or by the administrator). For example, the at least one processor may have stored a user's prior established plurality of visualization templates to apply to one or more particular boards. The combination of the visualization templates used may be stored as a newly added visualization template for the index, which may be accessed by other users, or just to the user who generated the newly added visualization template.

Figure 13:
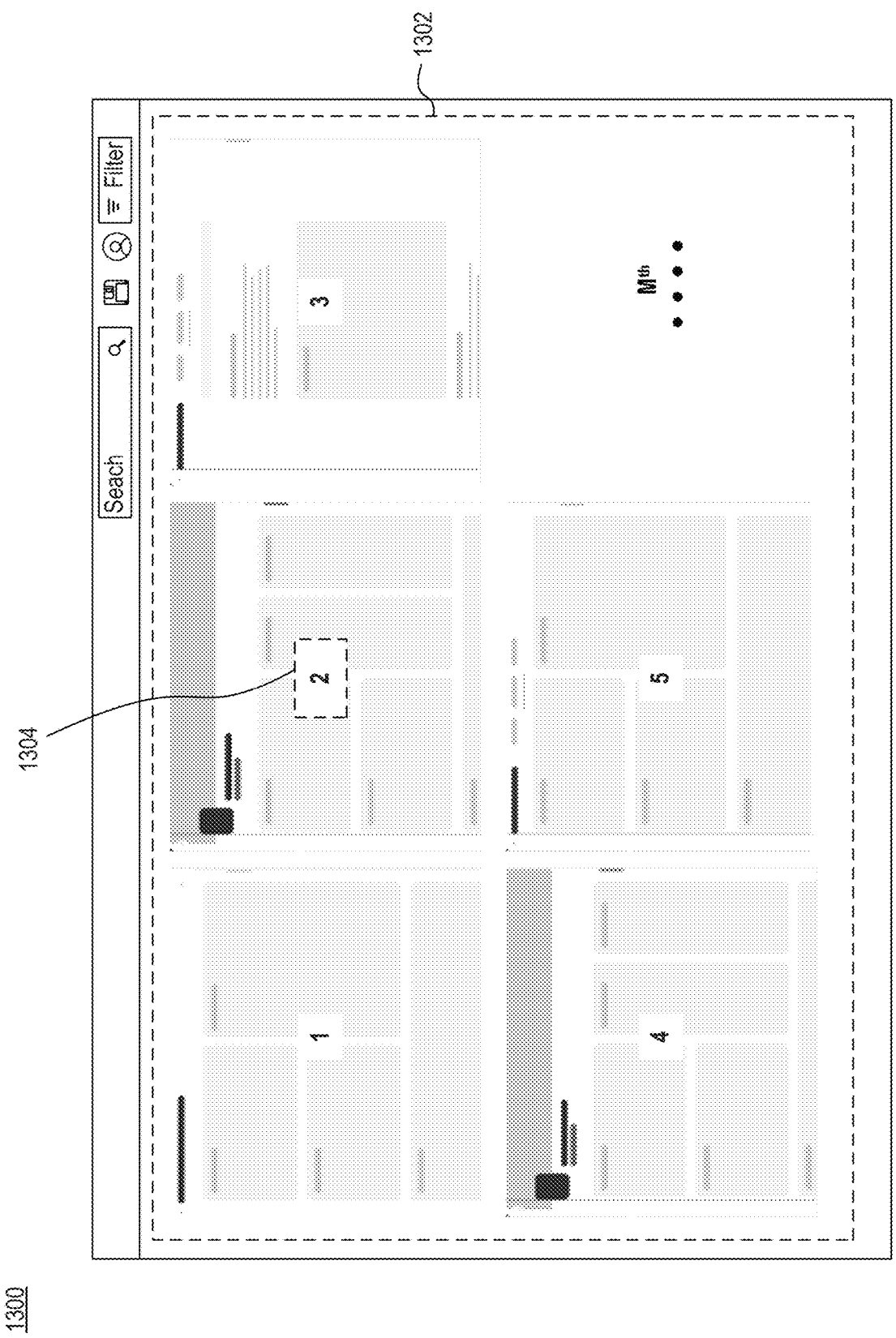
FIG. 13 illustrates an exemplary view of an index of a plurality of visualization templates where the received visualization template selection may be based on a selection from the index, consistent with some embodiments of the present disclosure.

By way of example, the at least one processor may store the index of a plurality of visualization templates in memory 120 in FIG. 1, the storage 130 in FIG. 1, or both. FIG. 13 illustrates exemplary view of an index of a plurality of visualization templates where the received visualization template selection may be based on a selection from the index, consistent with some embodiments of the present disclosure. As illustrated in FIG. 13, GUI window 1300 may display an index of a plurality of visualization templates 1302 as a matrix with elements 1 thru M. A user may make a visualization template selection 1304 from the index of a plurality of visualization templates 1302 for mapping to a sub-data source's plurality of data objects.

Some disclosed embodiments may involve the at least one processor to further be configured to migrate the sub-data visualization for co-presentation with a representation other than the representation of the particular board. Migrating a sub-data visualization may refer to moving or transferring a sub-data visualization with a co-presentation from one representation of information to another. A representation other than the representation of the particular board may include a representation associated with a particular board, aside from the presentation of the particular board itself. For example, while a particular board may be presented in a table form, the particular board may be represented in another form such as a Gantt chart, dashboard, or any other different view that is not in a table form. As such, the sub-data visualization of the sub-data source may be presented in a co-presentation with not merely just the representation of the particular board in a table form, but other representations of the information contained in the particular board.

Figure 14:
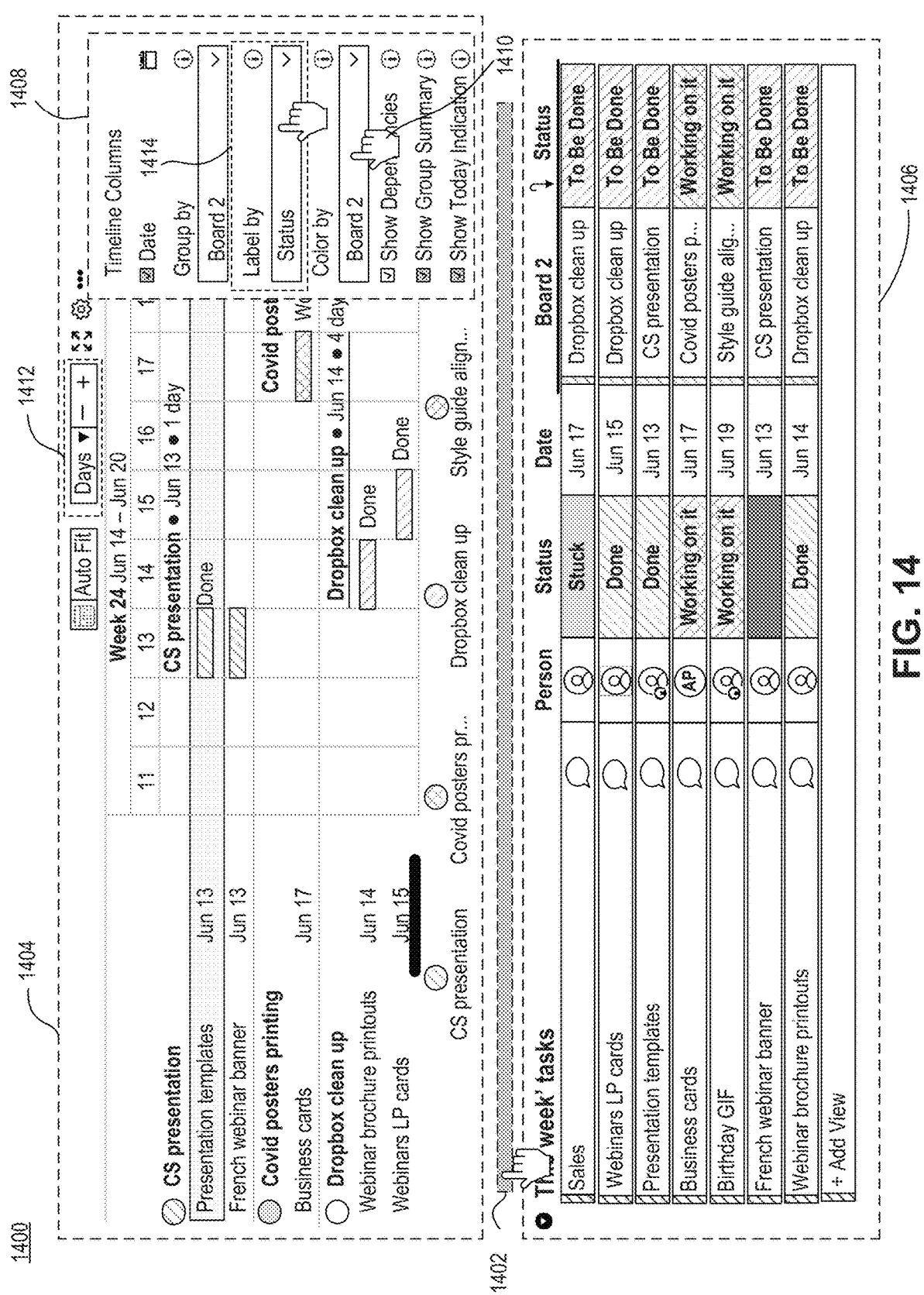
FIG. 14 illustrates an exemplary view of a co-presentation to reflect an unfiltered representation of a particular board and a filtered representation of a sub-data visualization upon receipt of a filter selection, consistent with some embodiments of the present disclosure.

As illustrated in FIG. 14, a co-presentation 1400 may be displayed by the at least one processor with a horizontal split 1402. In some instances, the co-presentation may include both a representation of a particular board 1406 in table form, and another representation other than the representation of the particular board as shown by Gantt view 1404. A sub-data visualization (e.g., 1100B of FIG. 11B) may be in a co-presentation with a particular board 1406, or the sub-data visualization may be migrated to be in co-presentation with a representation other than a representation of the particular board, such as Gantt view 1404.

Some disclosed embodiments may involve the at least one processor further configured to, upon receipt of a filter selection, cause the co-presentation to reflect an unfiltered representation of the particular board and a filtered representation of the sub-data visualization. A filter selection may refer to a selection received from any interface to indicate an intent to filter any information. A filter may refer to any higher-order function or method that may process an original data object (e.g., items in a list, items in a column, items a row, items in table, items in a chart, items in a map, items in a display, or any combination thereof) in some order to produce a new data object containing a subset of the elements of the original data object in another form, order, or display to present information related to the filter. The filter may be displayed as a GUI window containing a plurality of drop-down menus, drop-down lists, list boxes, radio buttons or any combination thereof for a user to select from and filter the data in the data structure. An unfiltered representation of the particular board may refer to the presentation of a specific table without an applied a filter selection which may be the specific board in its original or unaltered format. A filtered representation of the sub-data visualization may refer to a re-rendered presentation of the sub-data visualization based on the filter selection, as discussed above. For example, the at least one processor may cause the display of a co-presentation via a horizontal split or a vertical spit of an unfiltered representation of a particular board in a first split and a filtered representation of the sub-data visualization in a second split of the co-presentation. Some disclosed embodiments may involve the filtered representation being limited by a time period. A time period may refer any metric of time such as a period by minutes, hours, days, weeks, months, years, or any combination thereof. For example, the at least one processor may limit the data displayed in the filtered representation of the sub-data visualization by weeks such that a timeline may display tasks by weeks in a given one or more months. The filter by time period may work in conjunction with other filter selections a user may make.

By way of example, FIG. 14 illustrates exemplary view of a co-presentation to reflect an unfiltered representation of a particular board and a filtered representation of a sub-data visualization upon receipt of a filter selection, consistent with some embodiments of the present disclosure. As illustrated in FIG. 14, co-presentation 1400 may be displayed by the at least one processor with a horizontal split 1402, a filtered representation of a sub-data visualization 1404 located above the horizontal split 1402, and an unfiltered representation of a particular board 1406 located below the horizontal split 1402. The unfiltered representation of the particular board 1406 may be a table that may contain data associated with another board. The filtered representation of the sub-data visualization 1404 may be filtered by making selections in the filter 1408 containing a plurality of drop-down menus or any other selection methods. The system may receive a filter selection 1410 from a user to re-render the visualization to present information relevant to any combinations of filter selections. The at least one processor may also display or re-render the filtered representation of the sub-data visualization 1404 based on a selection 1412 to the limit the display of time on the timeline by "Days."

Some disclosed embodiments may involve the at least one processor further configured to limit the filtered representation that may be limited by a specific aspect of the particular data object. A specific aspect of a data object may refer to any characteristics associated with any data object, such as the information contained in the data object, metadata associated with the data object (e.g., a timestamp of the establishment of the data object and/or the author of the data object), the position of the data object, a heading associated with the data object, or any other characteristics that may be associated. For example, the at least one processor may limit the filtered representation of the sub-data visualization by the data having a specific column heading (e.g., "Status" or "Person"), a specific status contained in a cell (e.g., Stuck, Working on it, Done), having a specific author associated with the data, or any other aspects of characteristics that may be discerned from a particular data object.

By way of example, FIG. 14 illustrates the co-presentation 1400 having the filtered representation of the sub-data visualization 1404 and the unfiltered representation of the particular board 1406. The at least one processor may limit the filtered representation of the sub-data visualization 1404 according to an aspect of a particular data object 1414 where the timelines may be limited to only show label associated with the status "Done," "Working on it," and "Stuck."

Some embodiments may involve the at least one processor further configured to enable a selection that may cause a change in a relative make-up of a display surface area allotted to the representation of the particular board and the sub-data visualization. A selection may refer to a user activating or clicking a slide bar, a bar, an area, a button, a filter selection, a drop-down menu, or any combination thereof to shape, adjust, arrange, or any combination thereof a display on a GUI. The selection may be dynamic where the display may simultaneously change as the user makes a selection or drags the selection in any direction, or any combination thereof. A change in a relative make-up of a display may refer to assigning a plurality of percentages to relative portions of a display such that the summation of the plurality of percentages may equal one hundred percent. The plurality of percentages to relative portions of the display may be associated with a surface area or a volume of the display. For example, the at least one processor may receive a selection by a user to allot or allocate fifty percent of the display surface area to the representation of the particular board and fifty percent of the display surface area to the representation of the sub-data visualization. This allocation may be changed through any interaction such as a click and drag gesture, an entry of allotted space for each representation, and so on.

By way of example, FIG. 14 illustrates the co-presentation 1400 having a sub-data visualization 1404 and a representation of a particular board 1406 with a horizontal split 1402. The co-presentation view 1400 may be rearranged by dragging the horizontal split 1402 in the vertical direction by a user to cause the at least one processor to change the percentage surface area for the sub-data visualization 1404 to be greater or smaller than the representation of the particular board 1406. The total percentage of the surface area of the display or co-presentation 1400 constituting the representation of the sub-data visualization 1404 and the representation of the particular board 1406 may be equal to 100%.

Figure 15:
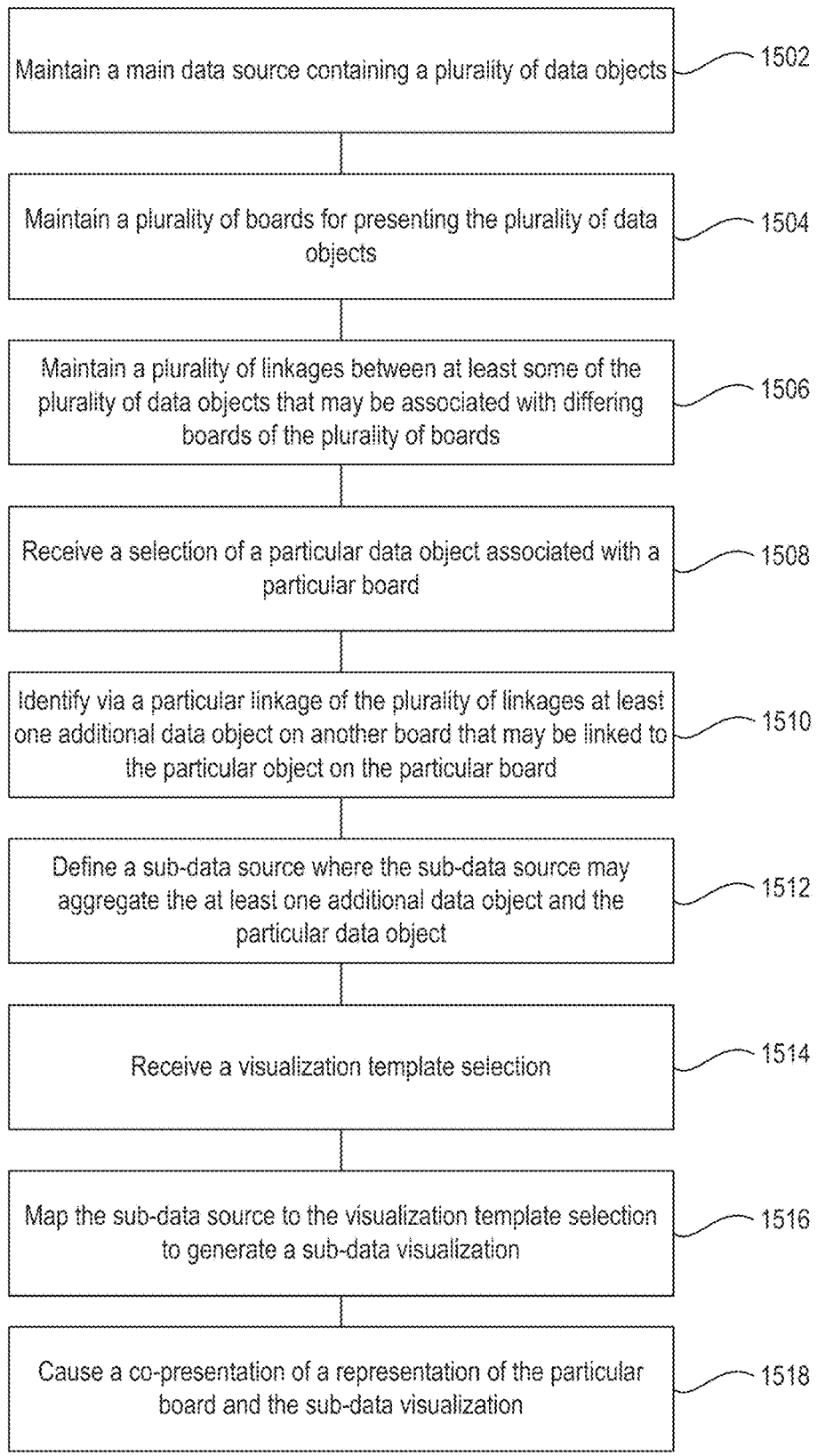
FIG. 15 illustrates an exemplary block diagram for an exemplary method for a data extraction and mapping system, consistent with some embodiments of the present disclosure.

FIG. 15 illustrates exemplary block diagram for an exemplary method for a data extraction and mapping system, consistent with some embodiments of the present disclosure. Method 1500, as shown in FIG. 15, with block 1502 may maintain a main data source containing a plurality of data objects, as previously discussed. At block 1504, method 1500 may maintain a plurality of boards for presenting the plurality of data objects, as previously discussed. At block 1506, method 1500 may maintain a plurality of linkages between at least some of the plurality of data objects that may be associated with differing boards of the plurality of boards, as previously discussed. At block 1508, method 1500 may receive a selection of a particular data object associated with a particular board, as previously discussed. At block 1510, method 1500 may identify via a particular linkage of the plurality of linkages at least one additional data object on another board that may be linked to the particular object on the particular board, as previously discussed. At block 1512, method 1500 may define a sub-data source where the sub-data source may aggregate the at least one additional data object and the particular data object, as previously discussed. At block 1514, method 1500 may receive a visualization template selection, as previously discussed. At block 1516, method 1500 may map the sub-data source to the visualization template selection to generate a sub-data visualization, as previously discussed. At block 1518, method 1500 may cause a co-presentation of a representation of the particular board and the sub-data visualization, consistent with the disclosure discussed above.

Aspects of this disclosure may provide a technical solution to challenges associated with collaborative work systems. Some disclosed embodiments include methods, systems, devices, and computer-readable media. For ease of discussion, example system for extrapolating information display visualization is described below with the understanding that aspects of the example system apply equally to methods, devices, and computer-readable media. For example, some aspects of such system may be implemented by a computing device or software running thereon. The computing device may include at least one processor (e.g., a CPU, GPU, DSP, FPGA, ASIC, or any circuitry for performing logical operations on input data) to perform the example systems, as described above. Other aspects of such systems may be implemented over a network (e.g., a wired network, a wireless network, or both).

Tools for extrapolating information display visualizations through an item interface extrapolator are lacking. This may present inefficiencies with processing information and storage of information when a system regenerates and re-maps information for visualizations each time items are selected for presentation. Accordingly, a system for extrapolating information display visualization through an item interface extrapolator presents efficiencies in data processing, reduces costs associated with memory, distributed memory, communication across multiple networks, and reliability needed in processors, and improves accuracy in the generation of an item interface extrapolator with a plurality of activatable elements associated with differing visualization of data and the activatable elements having a first extrapolated display of data in a first manner and a second extrapolated display of data in a second manner.

Therefore, there is a need for unconventional methods, systems, devices, and computer-readable media for a system for extrapolating information display visualizations through an item interface extrapolator that may, upon receipt of a first selection, include a plurality of activatable elements where each of the activatable elements may be associated with differing visualization, that may, upon receipt of a second selection of one of the activatable elements, include a first extrapolated display of data associated with a particular item to appear in a first manner, that may upon receipt of a third selection of another of the activatable elements, cause a second extrapolated display of data associated with the particular item to appear in a second manner. By using the disclosed computerized method to ascertain extrapolating information display visualization through an item interface extrapolator, the embodiments provide advantages over prior systems that merely provide extrapolating information.

As another example, some aspects of such a system may be implemented as operations or program codes in a non-transitory computer-readable medium. The operations or program codes may be executed by at least one processor. Non-transitory computer readable mediums, as described herein, may be implemented as any combination of hardware, firmware, software, or any medium capable of storing data that is readable by any computing device with a processor for performing methods or operations represented by the stored data. In a broadest sense, the example systems are not limited to particular physical or electronic instrumentalities, but rather may be accomplished using many differing instrumentalities.

Some disclosed embodiments may relate to a system for extrapolating information display visualization having at least one processor (e.g., processor, processing circuit or other processing structure described herein) in collaborative work systems, including methods, devices, and computer-readable media. Extrapolating information may refer to the at least one processor estimating, projecting, extending, expanding, mapping, or any combination thereof from an original set of information to arrive at a new set of information or visualization. Extrapolating information may also be transforming, rearranging, changing, interpolating, or any combination thereof from one visual medium into another visual medium via a display to create a new set of information based on the original set of information. A display visualization may refer to the at least one processor providing a graphical user interface (GUI) to visually present information. For example, a display visualization may include charts, interactive graphics, dynamic or animated displays of information, or any combination thereof that may include alphanumerics, graphics, or a combination of both.

Some disclosed embodiments may involve maintaining a board with a plurality of items, each item defined by a row of cells, and wherein each cell may be configured to contain data and may be associated with a column heading. Maintaining a board may include storing information associated with or contained in a board in a repository for storage and access. A board may be a structure that may contain data in any format, such as in rows and columns, as described previously above. An item may include any information pertaining to any task, entity, or object, in a data object such as a row or column having a plurality of cells in a board or table. For example, a plurality of items may refer to each row in a table. Containing data may include the storage of any type of information in any data object (e.g., cells) such as numbers, texts, characters, formats, characteristics, qualitative or quantitative variables, units, index, objects, metadata, constants, unstructured information (e.g., web pages, emails, documents, pdfs, scanned text, mainframe reports, spool files, or any other unstructured information), or any combination thereof. A column heading may refer to a value representative of information in an associated column. Although not a requirement, in some embodiments, a column heading may be descriptive of, or indicative of, data in the associated column. For example, the at least one processor may have a board with a plurality of rows and columns with cells at intersections of the rows and columns. Each column may be associated with a column heading to identify the information contained in each of the columns. Each column heading may be input manually by a user through any interface (e.g., a keyboard), automatically as a default, or automatically through machine learning to determine the data type contained in the cells of a column to predict a suitable column heading.

Figure 16:
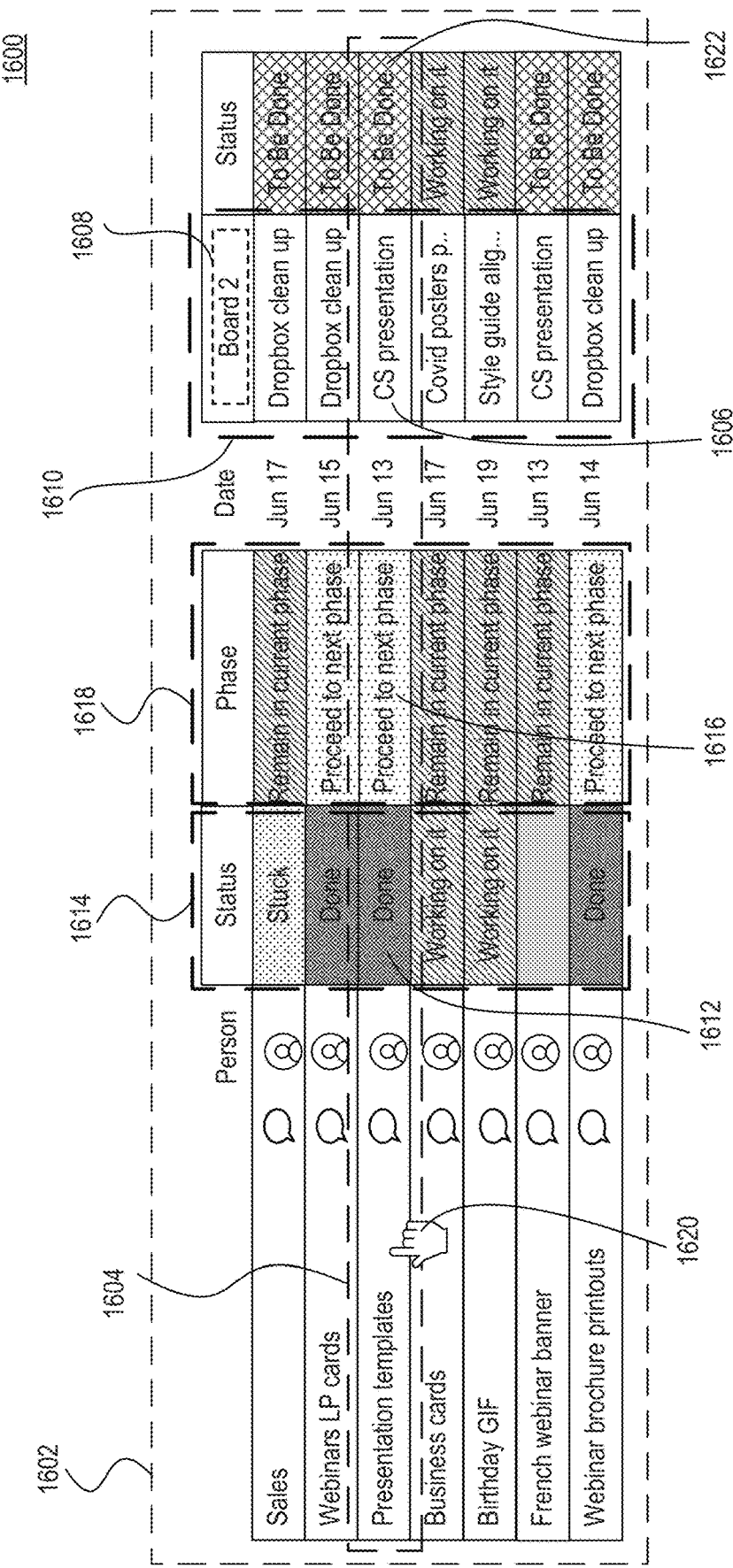
FIG. 16 illustrates an exemplary board with a plurality of items, each item defined by a row of cells, and wherein each cell is configured to contain data and is associated with a column heading, consistent with some embodiments of the present disclosure.

By way of example, the at least one processor may store a board in memory 120 in FIG. 1, the storage 130 in FIG. 1, or both. FIG. 16 illustrates an exemplary board with a plurality of items, each item defined by a row of cells, and wherein each cell is configured to contain data and is associated with a column heading, consistent with some embodiments of the present disclosure. As illustrated in FIG. 16, the at least one processor may maintain a board 1600 which may be a table 1602. The table 1602 may contain a plurality of rows and columns. An item 1604 may be a row of cells in the table 1602. Cell 1606 of item 1604 may be associated with a column heading 1608, which may be part of column 1610.

Some disclosed embodiments may involve linking at least a first column to at least a second column so that a change in data in a cell of the at least first column may cause a change in data of a cell in the at least second column. Reference to first and second columns may refer to consecutive or non-consecutive columns to identify at least two different columns. Linking at least a first column to at least a second column may refer to one or more relationships or associations between one or more cells in the at least first column and the at least second column. The at least one processor may cause a change in a cell in the at least second column based on a change in a cell in the at least first column, or vice versa because of established links or relationships between the cells of the at least first column and the at least second column. The cell in the at least first column may not be in the same row as the cell in the at least second column. Causing a change in data may refer to at least one processor altering (e.g., adding, deleting, rearranging), updating, structuring, restructuring, transforming, or any combination thereof the display or value of data in any data object such as a cell of a table. For example, a board may have two columns indicating status information that are linked together such that when a cell in the first column is marked with "done," the associated cell in the second column will automatically be marked with "complete,"

By way of example, FIG. 16 illustrates the at least one processor changing cell 1612 to "Done" in the first column 1614, which may cause a change in cell 1616 to "Proceed to Next Phase" in the second column 1618. This change may be automatic as a result of the link between the first column 1614 and the second column 1618. This link may be defined, for example, by a logical rule.

Some disclosed embodiments may involve receiving a first selection of a particular item from the board, wherein the particular item may include a plurality of cells with data in each cell, and wherein data in a first cell of the plurality of cells may be linked to data in a second cell of the plurality of cells. Receiving a selection of a particular item on a board may include receiving an input from any interface (e.g., a mouse, keyboard, touchscreen, and so on) to indicate an intent to select a specific item on a board. This received input may cause an activation of the specific item for further processing. A particular item may refer to a subset of or a specific one or more cells or a plurality of cells within an item, as defined above. The cells and the data contained in them that are associated with a particular item may be considered linked to each other, as described above. For example, the at least one processor may receive a user's selection of a row of cells of a table where at least two of those cells associated with the row may be linked together.

By way of example, FIG. 16 illustrates the item 1604 that is selected by a user with a cursor interface 1620. The item 1604 may include first cell 1612, second cell 1616, third cell 1606, and fourth cell 1622 whose data may be linked to each other.

Some disclosed embodiments may involve, upon receipt of the first selection, causing a display of an item interface extrapolator, wherein the item interface extrapolator may include a plurality of activatable elements, each of the activatable elements being associated with a differing visualization of at least some of the data contained in cells associated with the particular item. A display of an item interface extrapolator may refer to a GUI window that may display interpolated and/or extrapolated data (manually, automatically, or with machine learning) drawn from an item or any other data object. The display of the item interface extrapolator may include any visualizations of data that may be in the form of one or more tables, progress bars as batteries, Gantt charts, calendars, pie charts, line charts, bar charts, 3D charts, forms, maps, density maps, scatter plots, bubble charts, tree maps, rain flow charts, timelines, to do lists, numbers, time trackers, workload displays, llama farm status displays, count-down displays, tabs, filters, sub-GUI windows, objects, or any combination thereof. The at least one processor may display the item interface extrapolator by appearing in a board's view as a GUI window fully or partially covering the virtual space containing the data associated with the board, items, or any other data object. An activatable element may refer to one or more objects, charts, icons, tabs, folders, figures, sub-GUI windows, buttons, or any combination thereof on the item interface extrapolator that may be selected or clicked by a user to activate a further processing of information or displays. Differing visualizations may refer to separate visualizations that may include presentations of information in similar or differing formats.

Some disclosed embodiments may involve receiving a second selection of one of the activatable elements. A second selection of an activatable element may refer to an activation of an activatable element inside the item interface selector, as defined above. Upon receipt of the second selection, the system may cause a first extrapolated display of data associated with the particular item to appear in a first manner. A first extrapolated display of data in a first manner may refer to a first visualization in the item interface extrapolator drawn from data associated with a particular item. For example, the at least one processor may receive a user's first selection of a particular item and cause the display of a first GUI window for an item interface extrapolator that may be co-presented with a display of a board. The item interface extrapolator may include activatable elements that would cause different visualizations in different manners to appear in the item interface extrapolator. The first visualization may be any manner of visualization such as one or more tables, progress bars as batteries, Gantt charts, calendars, pie charts, line charts, bar charts, 3D charts, forms, maps, density maps, scatter plots, bubble charts, tree maps, rain flow charts, timelines, to do lists, numbers, time trackers, workload displays, llama farm status displays, count-down displays, tabs, filters, sub-GUI windows, objects, or any combination thereof.

Figure 17:
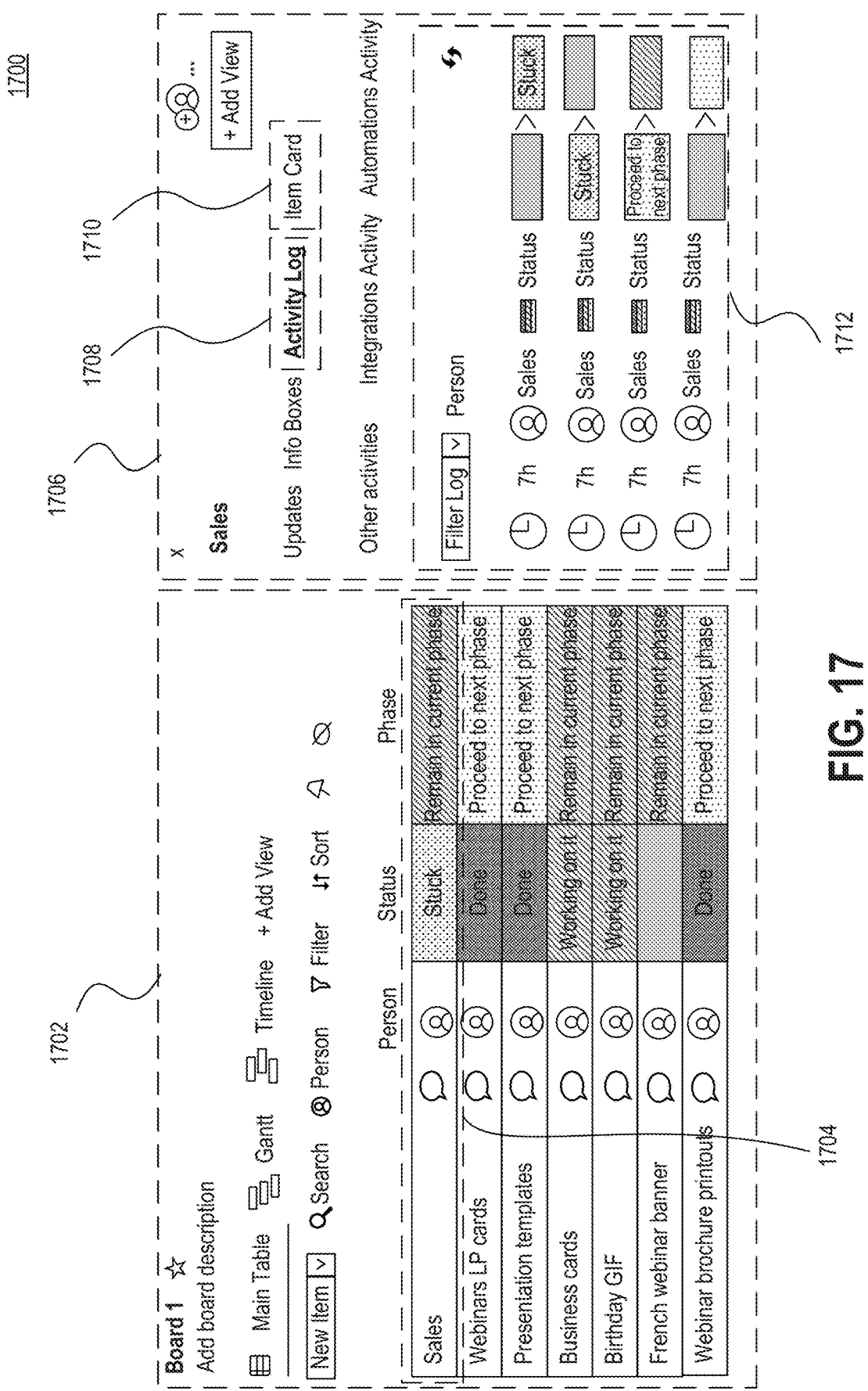
FIG. 17 illustrates an exemplary view of causing a display of an item interface extrapolator, wherein the item interface extrapolator may include a plurality of activatable elements, consistent with some embodiments of the present disclosure.

FIG. 17 illustrates an exemplary view of causing a display of an item interface extrapolator, wherein the item interface extrapolator may include a plurality of activatable elements, consistent with some embodiments of the present disclosure. As illustrated in FIG. 17, view 1700 may display a board view 1702 with a selection of a particular item 1704. In response to the selection of the particular item 1704, the at least one processor may cause the display of an item interface extrapolator 1706 (that may be in a co-presentation with board view 1702) including a first tab (activity log activatable element) 1708, a second tab (item card activatable element) 1710, and an activity log 1712 all associated with data in the cells of the particular item 1704. The visualization of the activity log 1712 may appear in response to the selection of the activity log activatable element 1708 (e.g., the second selection).

Figure 18:
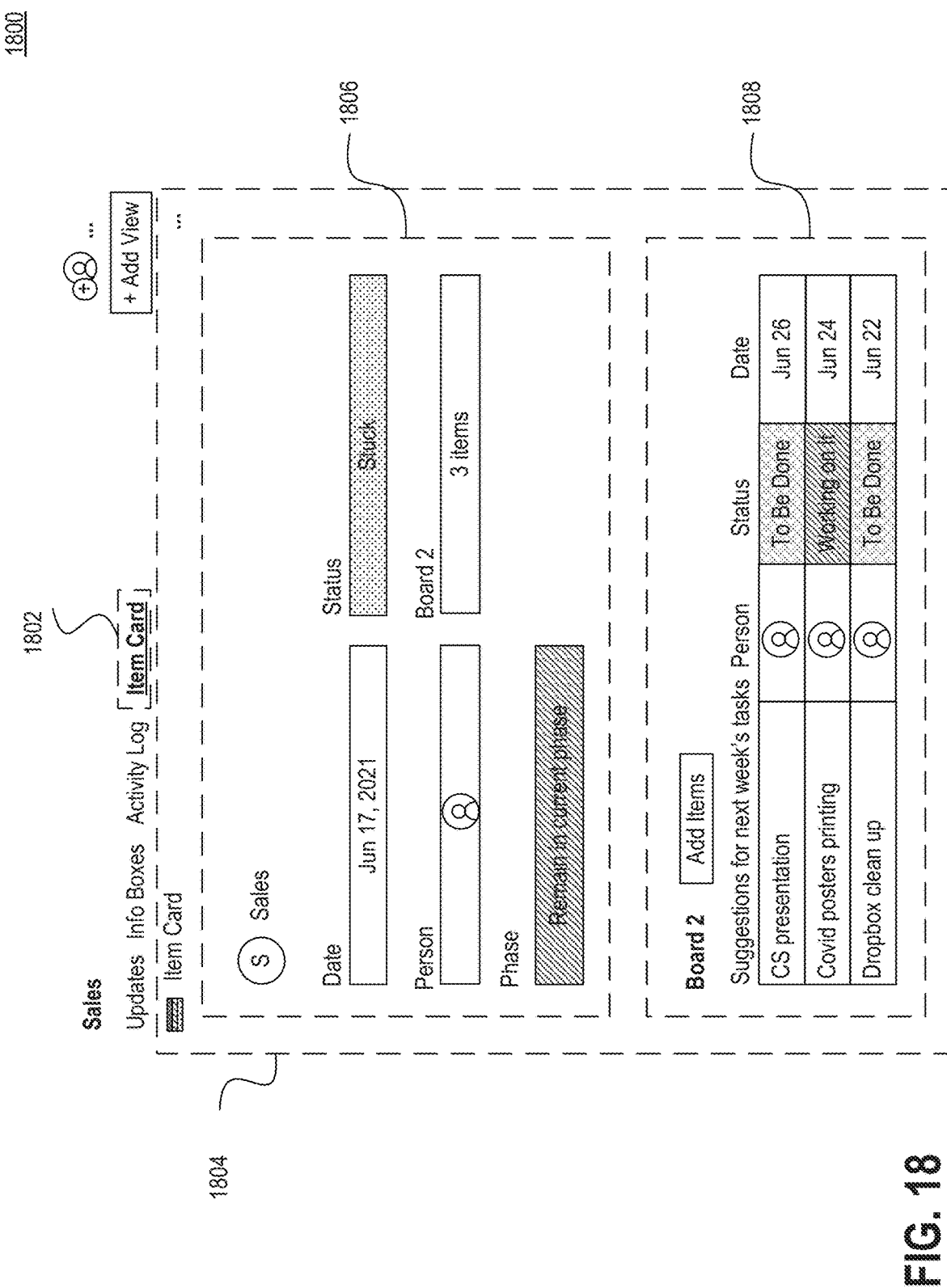
FIG. 18 illustrates an exemplary view of, upon receipt of the second selection, causing a first extrapolated display of data associated with the particular item to appear in a first manner, consistent with some embodiments of the present disclosure.

By way of example, the at least one processor may receive a second selection by storing it in memory 120 in FIG. 1, the storage 130 in FIG. 1, or both. FIG. 18 illustrates another exemplary view of causing a first extrapolated display of data associated with the particular item to appear in a first manner in response to receipt of a second selection, consistent with some embodiments of the present disclosure. As illustrated in FIG. 18, in item interface extrapolator 1800, a user may select the item card activatable element 1802. In response to the selection of the item card activatable element 1802, the at least one processor may cause the display of extrapolated data from the particular item in an item card visualization 1806. The first extrapolated display of data 1804 may appear in a first manner where an item card visualization 1806 of data of a particular item may be positioned above a table 1808 in a co-presentation containing a plurality of cells associated with the data of the particular item inside the item interface extrapolator 1800.

Some disclosed embodiments may involve receiving a third selection of another of the activatable elements, and upon receipt of the third selection, causing a second extrapolated display of data associated with the particular item to appear in a second manner. For example, the at least one processor may receive a third selection by a user where the user may click on a Gantt chart (the first manner described above) to cause the at least one processor to further display a calendar. In another example, the third selection may be made on a second activatable element in the item interface extrapolator. Similarly to the first extrapolated display of data, a second extrapolated display of data may refer to one or more nested GUI windows within the item interface extrapolator or the first extrapolated display of data, one or more GUI windows independent from the item interface extrapolator or the first extrapolated display of data, or any combination thereof that may display interpolated and/or extrapolated data with machine learning in a particular item as one or more activatable elements. Similar to the first manner, a second manner may refer to a second visualization in the item interface extrapolator drawn from data associated with a particular item that may be similar or different from the first manner. For example, the at least one processor may cause the display of a second extrapolated display of data in a second manner such as a 3D chart that is in a different manner from a Gantt chart display, in the item interface extrapolator.

Figure 19:
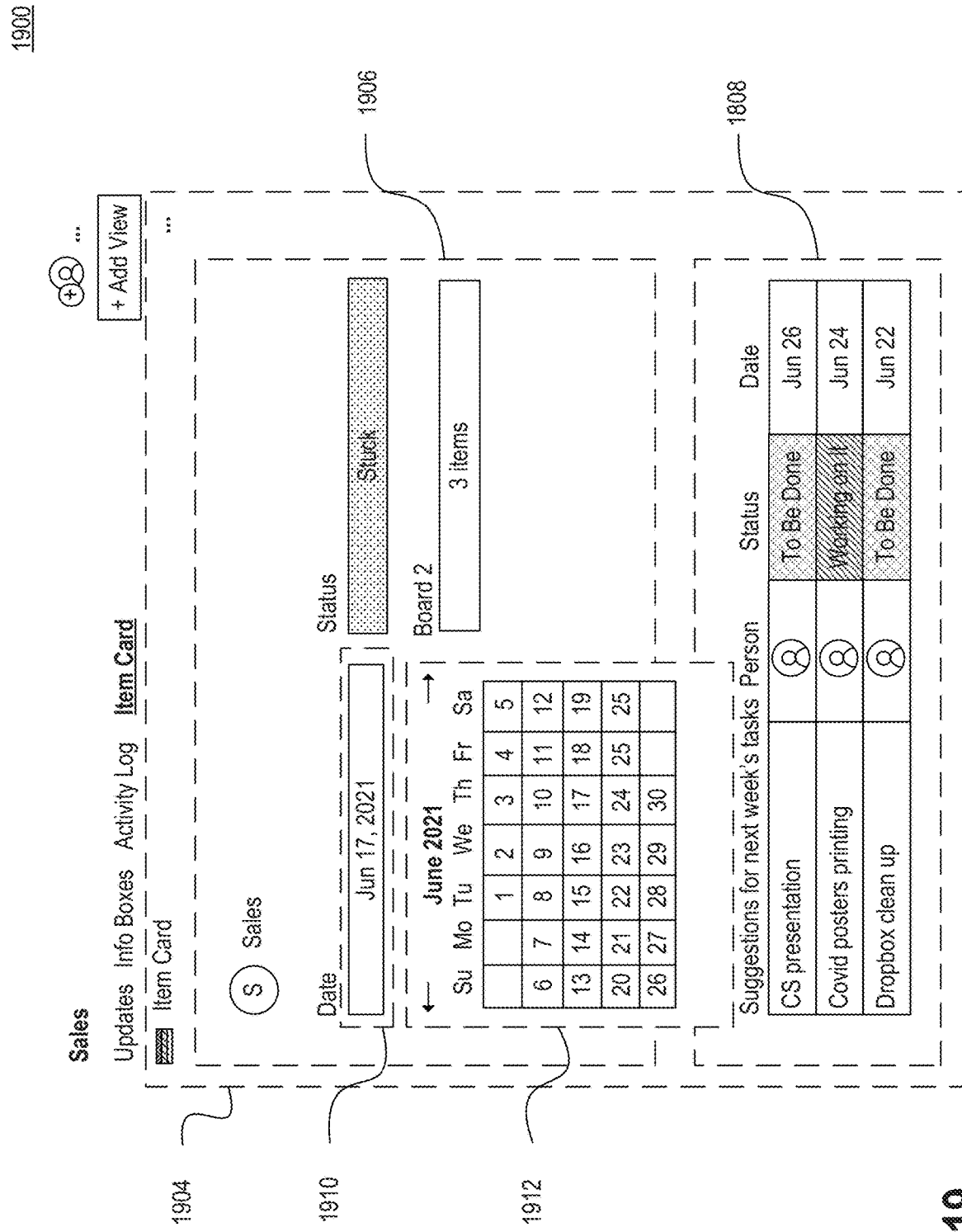
FIG. 19 illustrates an exemplary view of, upon receipt of a third selection, causing a second extrapolated display of data associated with the particular item to appear in a second manner, consistent with some embodiments of the present disclosure.

By way of example, the at least one processor may receive a third selection by storing it in memory 120 in FIG. 1, the storage 130 in FIG. 1, or both. FIG. 19 illustrates exemplary view of, upon receipt of a third selection, cause a second extrapolated display of data associated with the particular item to appear in a second manner, consistent with some embodiments of the present disclosure. As illustrated in FIG. 19, in item interface extrapolator 1900 may include the display of a first extrapolated display data 1904. The first extrapolated display data 1904 may include item card view 1906 of data of a particular item positioned above a table 1908 in a co-presentation. A user may make a third selection 1910, which may cause the at least one processor to display a second extrapolated display of data 1912 in a second manner where the second extrapolated display of data 1912 may be a calendar placed above a portion of the item card view 1906 and the table 1908 in the first extrapolated display of data 1904, which may also be contained in the item interface extrapolator 1900. In another example in FIG. 17, a selection of a first activatable element such as activity log activatable element 1708 to cause a visualization of an activity log 1712 as the first manner in the item interface extrapolator. The system may then receive a selection of a second activatable element such as item card activatable element 1710 to cause an item card visualization 1806 to be presented as a second manner, as shown in FIG. 18.

Some disclosed embodiments may involve the at least one processor further configured to receive a fourth selection of a further activatable element, wherein the further activatable element may be configured to enable customization of the item interface extrapolator; and upon receipt of the fourth selection, enabling customization of the item interface extrapolator via a network access device, wherein the customization may enable data associated with the particular item to appear in a third customized manner. Similar to the second selection and the third selection as described above, a fourth selection may refer to activating one or more activatable elements other than the activatable elements in the third selection inside the item interface extrapolator, inside the first extrapolated display of data, inside the second extrapolated data, or any combination thereof. A further activatable element may refer to one or more activatable elements other than the third selection. A customization of the item interface extrapolator may refer to a customized modification to an item interface extrapolator caused by a user to rearrange, reorient, reposition, change, reformat, resize, move, or any combination thereof the activated elements and/or visualizations associated with the item interface extrapolator. A network access device may refer to a computer, a mobile device, a tablet, a laptop, or any other related devices associated with a user that may be capable of accessing the network that the system is maintained. A third customized manner may refer to the rearrangement, repositioning, relocation, resizing, reorienting, changing, reformatting, moving, or any combination thereof of the activatable elements or visualizations in the customization of the item interface extrapolator. In other instances, the third customized manner may be a third visualization that appears in the item interface extrapolator that is a customized visualization generated by a user. For example, the at least one processor may receive a fourth selection via a user on a desktop by selecting one or more activated elements that may enable the user to customize the selection of a timeline, a table, a calendar, and a status bar for display according to specific locations—a third customized manner—in the item interface extrapolator. In another example, the fourth selection may be of a link to activate a customized visualization builder to generate a new, customized visualization that may be presented in the item interface extrapolator.

Figure 20:
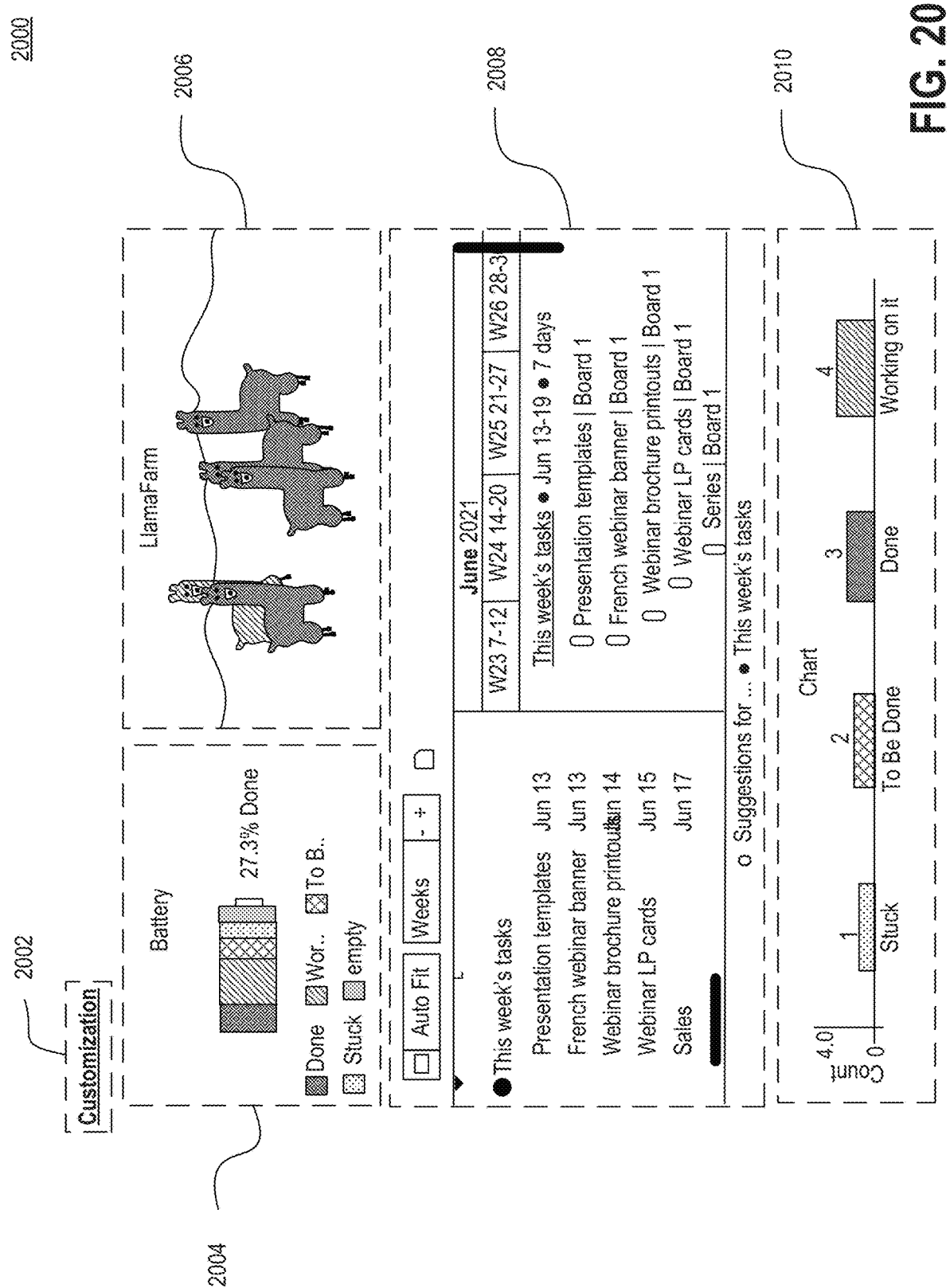
FIG. 20 illustrates an exemplary view of, upon receipt of a fourth selection, enabling customization of the interface extrapolator, wherein the customization enables data associated with the particular item to appear in a third customized manner, consistent with some embodiments of the present disclosure.

By way of example, the at least one processor may receive a fourth selection by storing it in memory 120 in FIG. 1, the storage 130 in FIG. 1, or both. FIG. 20 illustrates exemplary view of, upon receipt of a fourth selection, enable customization of the item interface extrapolator, wherein the customization enables data associated with the particular item to appear in a third customized manner, consistent with some embodiments of the present disclosure. FIG. 20 illustrates a customization of the item interface extrapolator 2000 where a user may make a fourth selection of a customization button 2002 to enable the user to customize a battery status widget 2004, a llama farm status widget 2006, a Gantt chart widget 2008, and a bar chart widget 2010. The selection of the customization button 2002 may also cause a custom visualization builder to appear to enable a user to generate a new, custom visualization to be presented in the item interface extrapolator 2000. The user may position the battery status widget 2004 at the top left, the llama farm status widget 2006 may be placed at the top right, the Gantt chart widget 2008 may be placed under both the battery status widget 2004 and the llama farm status widget 2006, and the bar chat widget may be placed below the Gantt chart widget 2008 in a third customized manner. In addition to customization of position, other instances of customization may involve the configuration of the visualizations in the item interface extrapolator 2000 such as a light or dark mode, or any other customization of the visualizations contained therein.

Some disclosed embodiments may involve the at least one processor to further be configured to store the third customized manner as a template, and to present the third customized manner as a display option when items other than the particular item may be selected for analysis and display within the item interface extrapolator. A template may refer to a GUI window for specifically allowing a user to construct or establish a visual template for a pre-formatted example of the third customized manner having one or more activatable elements without the data associated with the particular item. A template of the third customized manner may be a skeleton representation of unpopulated data associated with the particular item in the one or more activatable elements. Storing the third customized manner as a template may involve storing one or more visualizations in memory, or may involve storing a custom generated visualization not previously stored in the system for later use. Presenting a third customized manner as a display option may refer to presenting an indication or activatable element to access the third customized manner. The display option may be indexed by numbers, alphabet letters, alpha-numerical values, or any combination thereof of one or more lists, vertical array of elements, horizontal array of elements, matrix containing elements, drop-down menus, or any combination thereof displaying one or more templates. For example, a user may generate a custom visualization involving a network map that was previously unavailable to the system. The user may save this custom visualization as a template, which may then appear as a new activatable element in the item interface extrapolator to access the custom visualization. The at least one processor may have stored pre-defined templates and customized templates in memory. The at least one processor may receive a selection from a user pressing or clicking a button named "template options" on the item interface extrapolator to provide a GUI window of display options of templates. The at least one processor may display a plurality of templates of different visualizations and templates of visualizations, that may be presented as display options in the form of activatable element or as numbered elements contained in, for example, a horizontal array that the user may scroll from left to right or vice versa to select from an index. The at least one processor may receive a template from the user selecting one of the display options of templates to be utilized in the item interface extrapolator. In another example, the template may be a third customized manner that may be displayed in the item interface interpolator, the board, or any combination thereof.

Figure 21:
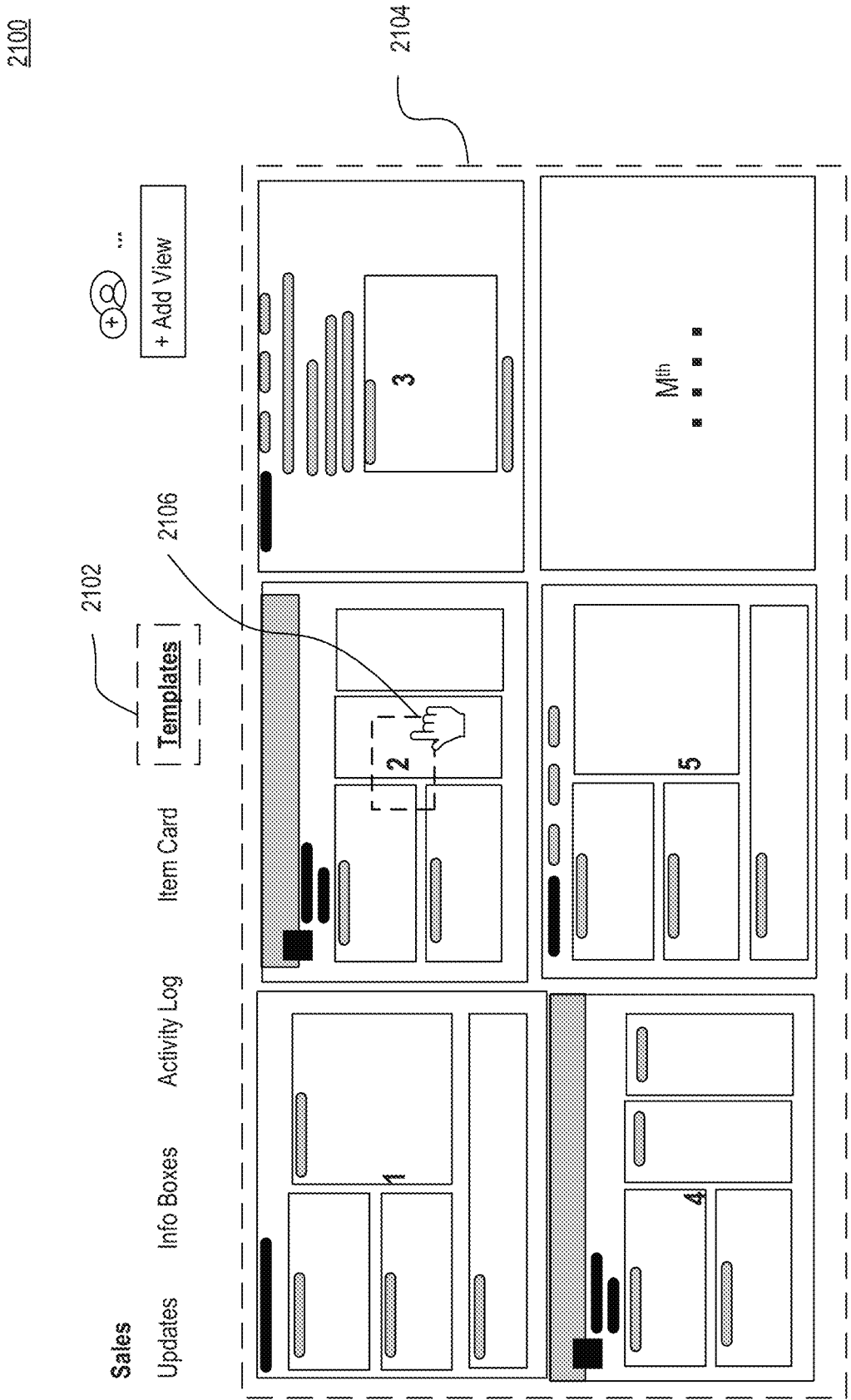
FIG. 21 illustrates an exemplary view of storing one or more templates of one or more of the third customized manners shown as a display option when items other than the particular item are selected for analysis and display within the interface extrapolator, consistent with some embodiments of the present disclosure.

By way of example, the at least one processor may store one or more templates in memory 120 in FIG. 1, the storage 130 in FIG. 1, or both. FIG. 21 illustrates an exemplary view of one or more stored templates of one or more of the third customized manners shown as a display option when items other than the particular item are selected for analysis and display within the item interface extrapolator, consistent with some embodiments of the present disclosure. As illustrated in FIG. 21, item interface extrapolator 2100 may include an activatable element 2102 to access template visualizations such as a custom visualization 2104 that may have been generated by a user, or may have been provided as a preset. A user may select a template 2106 from the index of the plurality of templates for display as the third customized manner in the item interface extrapolator 2100.

Some disclosed embodiments may involve the at least one processor to further be configured to cause a simultaneous display of the item interface extrapolator and at least a portion of the particular item. At least a portion of the particular item may refer to the display of the particular item of a board being completely or partially covered or uncovered by the item interface extrapolator. For example, the at least one processor may cover 50% of the particular item with the item interface extrapolator where the item extrapolator may be automatically resized by the at least one processor to occupy the remaining 50% of the particular item covered in addition to the item interface extrapolator's original size. In another example, the at least one processor may cover 75% of the particular item with the item interface extrapolator where the item extrapolator may be automatically resized by the at least one processor to occupy the remaining 75% of the particular item covered in addition to the item interface extrapolator's original size. In yet another example, the at least one processor may cover all of the particular item selected by the user causing a single window of the item interface extrapolator.

By way of example, FIG. 17 illustrates the particular item 1704 being partially covered by the item interface extrapolator 1706.

Some disclosed embodiments may involve the at least one processor to further be configured to migrate the item interface extrapolator for co-presentation with a representation other than the board. Migrate the item interface extrapolator may refer to the at least one processor moving or relocating the item interface extrapolator from one platform (i.e., a first board) to another distinct or associated platform (i.e., a second board). A co-presentation may refer to the at least one processor simultaneously displaying information such as from a particular board and an item interface extrapolator containing extrapolated displays of data. The at least one processor may also simultaneously display the item interface extrapolator having data associated with a particular item of a first board with the extrapolated display of data from a particular item from a second board. For example, the at least one processor may cause a co-presentation of a table in an item interface extrapolator, a timeline chart and Gantt chart in a first extrapolated display, and a battery status chart in a second extrapolated display of data from a second table. In another example, the at least one processor may cause a co-presentation of a table, a llama farm status, and a battery status in the item interface extrapolator. A representation other than the board may include a representation associated with a particular board (e.g., in a table representation), aside from the presentation of the particular board itself (e.g., not in a table representation or in the original table representation).

Figure 22:
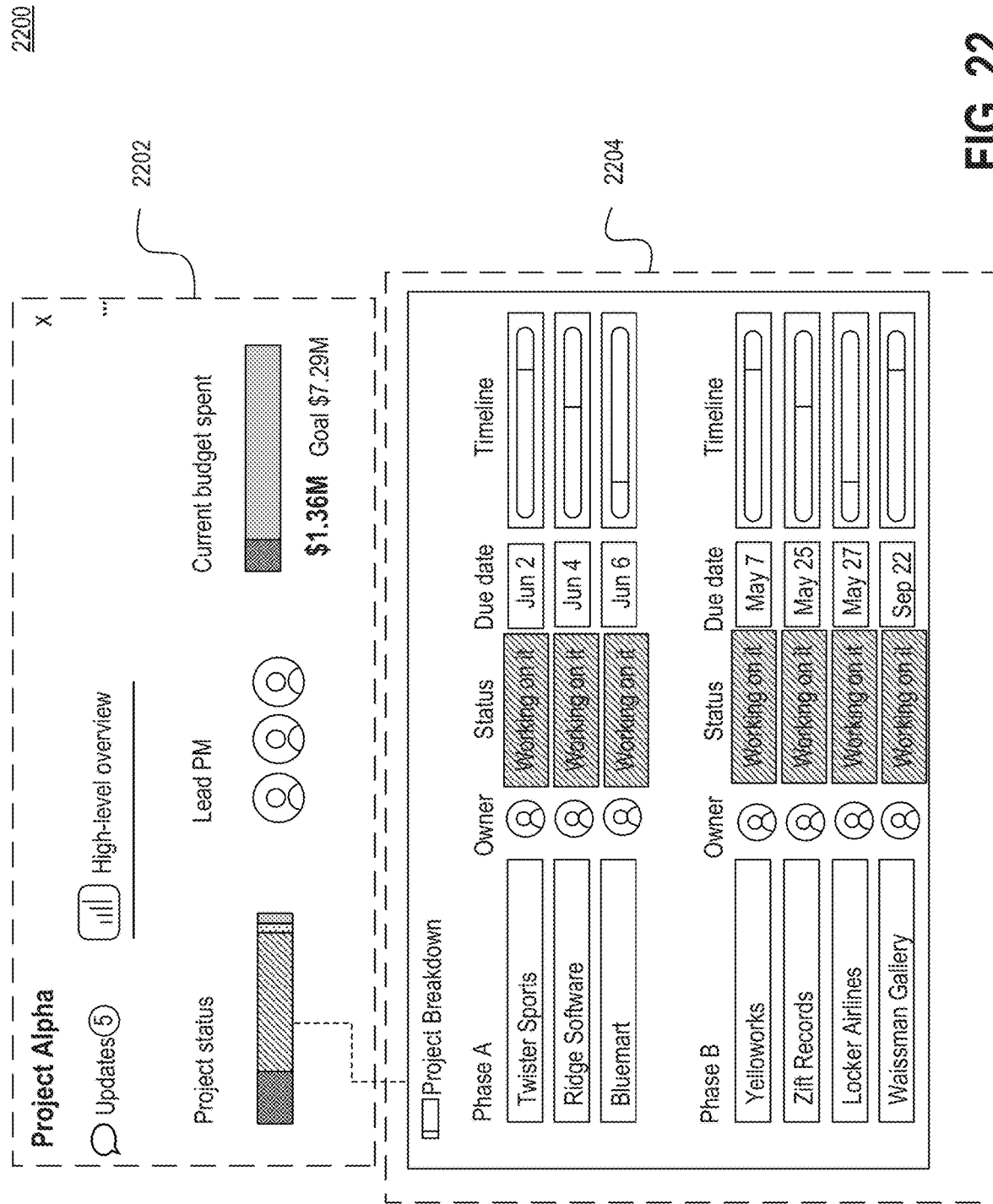
FIG. 22 illustrates an exemplary migrating the item interface extrapolator for co-presentation with a representation other than the board, consistent with some embodiments of the present disclosure.

By way of example, FIG. 22 illustrates an exemplary migration of an item interface extrapolator for co-presentation with a representation other than the board, consistent with some embodiments of the present disclosure. As illustrated in FIG. 22, the at least one processor may have migrated item interface extrapolator 2200 from a first board where activatable elements 2202 associated with the item interface extrapolator 2200 may display data associated with a particular item in the first board. The at least one processor may cause a co-presentation of the item interface extrapolator 2200 with a representation other than the board such as, for example, an aggregate of data from two boards 2204.

Some disclosed embodiments may involve the at least one processor to further be configured to, upon receipt of a filter selection, cause a co-presentation to reflect an unfiltered representation of the board and a filtered representation of the item interface extrapolator. A filter selection may refer to a selection received from any interface to indicate an intent to filter any information. A filter may refer to any higher-order function or method that may process an original data object (e.g., items in a list, items in a column, items a row, items in table, items in a chart, items in a map, items in a display, or any combination thereof) in some order to produce a new data object containing a subset of the elements of the original data object in another form, order, or display to present information related to the filter. The filter may be displayed as a GUI window containing a plurality of drop-down menus, drop-down lists, list boxes, radio buttons or any combination thereof for a user to select from and filter the data in the one or more items, one or more particular items, or any combination thereof. An unfiltered representation of the board may refer to the presentation of a table without an applicated filter selection (e.g., the original representation of the table). A filtered representation of the item interface extrapolator may refer to the presentation of the item interface extrapolator related to data in a particular item where the user may have applied a filter selection, as discussed above, to the item interface extrapolator presentation. For example, the at least one processor may cause the display of a co-presentation via a horizontal split, a vertical spit, or another suitable split in the display. The at least one processor may place an unfiltered representation of a board in one of the splits in the display and place the filtered representation of the item interface extrapolator in the other split of the display. The unfiltered representation of the board may be a table with a plurality of items containing data related to one or more particular items. The filtered representation of the item interface extrapolator may be a timeline of data related the particular items where a filter selection may have been executed by a user.

Figure 23:
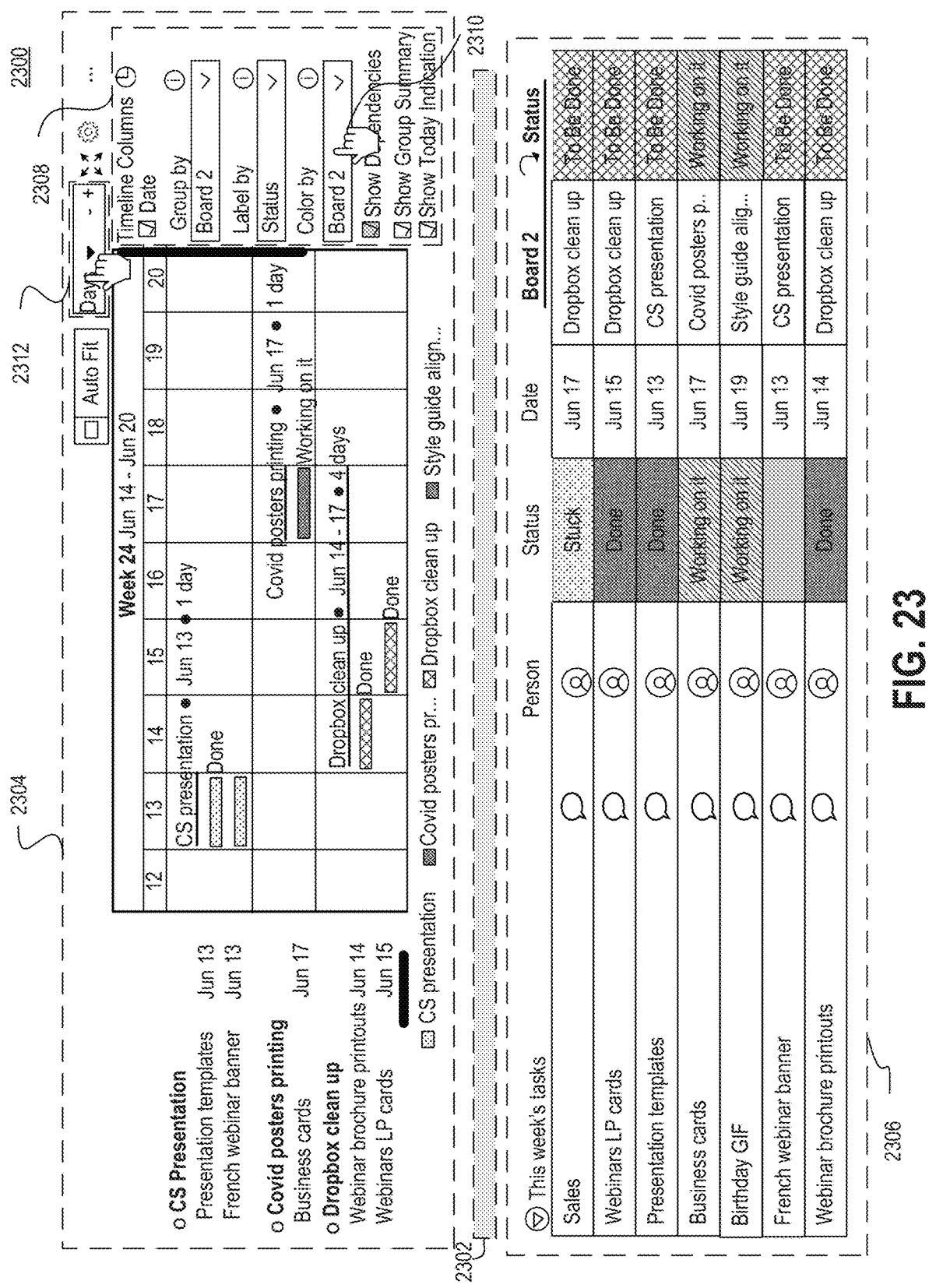
FIG. 23 illustrates an exemplary view of a co-presentation to reflect an unfiltered representation of a board and a filtered representation of an item interface extrapolator upon receipt of a filter selection, consistent with some embodiments of the present disclosure.

FIG. 23 illustrates an exemplary view of a co-presentation to reflect an unfiltered representation of a board and a filtered representation of an item interface extrapolator upon receipt of a filter selection, consistent with some embodiments of the present disclosure. As illustrated in FIG. 23, a co-presentation 2300 may be displayed by the at least one processor with a split 2302, a filtered representation of an item interface extrapolator 2304 located above the split 2302, and an unfiltered representation of a board 2306 located below the split 2302. The unfiltered representation of the particular board 2306 may be a table containing data associated with two boards (a particular board—"Board 1"—and another board—"Board 2"). The filtered representation of the item interface extrapolator 2304 may be, for example, a Gantt chart showing the due dates from the data in the particular item associated with "Board 1" and "Board 2" in the table of the unfiltered representation of the board 2306. The filtered representation of the item interface extrapolator 2304 may contain a filter 2308 containing a plurality of drop-down menus. A filter selection 2310 made by a user may be received by the at least one processor to display timelines in the Gantt chart according to color codes associated with data associated with the particular item including "Board 2."

Some disclosed embodiments may involve the filtered representation being limited by a time period. A time period may refer any metric of time such as a period by minutes, hours, days, weeks, months, years, or any combination thereof. For example, the at least one processor may limit the data displayed in the filtered representation of the item interface extrapolator by weeks such that the timeline may display tasks by weeks in a given month.

By way of example, FIG. 23 illustrates the co-presentation 2300 having the filtered representation of the item interface extrapolator 2304. The at least one processor may display the filtered representation of the item interface extrapolator 2304 based on a selection 2312 to limit the display of time on the timeline by "Days."

Figure 24:
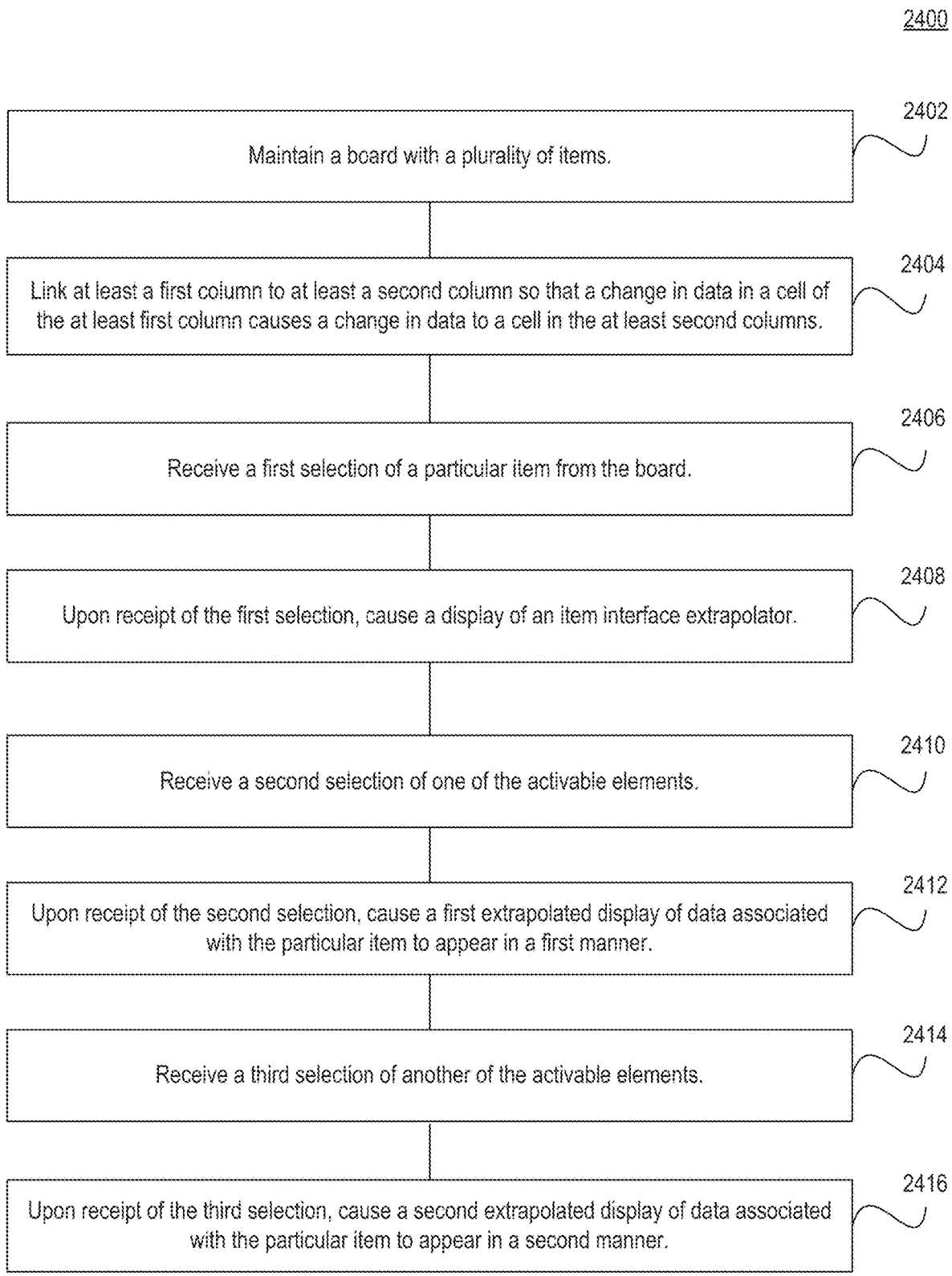
FIG. 24 illustrates an exemplary block diagram for an exemplary method for a data extraction and mapping system, consistent with some embodiments of the present disclosure.

FIG. 24 illustrates exemplary block diagram for an exemplary method for a data extraction and mapping system, consistent with some embodiments of the present disclosure. Method 2400, as shown in FIG. 24, with block 2402 may maintain a board with a plurality of items, each item defined by a row of cells, and wherein each cell may be configured to contain data and is associated with a column heading, as previously discussed. At block 2404, method 2400 may link at least a first column to at least a second column so that a change in data in a cell of the at least first column may cause a change in data of a cell in the at least second column, as described previously above. At block 2406, method 2400 may receive a first selection of a particular item from the board, wherein the particular item may include a plurality of cells with data in each cell, and wherein data in a first cell of the plurality of cells may be linked to data in a second cell of the plurality of cells, as previously discussed. At block 2408, method 2400 may, upon receipt of the first selection, cause a display of an item interface extrapolator, wherein the item interface extrapolator may include a plurality of activatable elements, each of the activatable elements being associated with a differing visualization of at least some of the data contained in cells associated with the particular item, as previously discussed. At block 2410, method 2400 may receive a second selection of one of the activatable elements, as discussed previously. At block 2412, method 2400 may, upon receipt of the second selection, cause a first extrapolated display of data associated with the particular item to appear in a first manner, as previously discussed. At block 2414, method 2400 may receive a third selection of another of the activatable elements, as previously discussed. At block 2416, method 2400 may, upon receipt of the third selection, cause a second extrapolated display of data associated with the particular item to appear in a second manner, consistent with the disclosure discussed above.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

associating a user-ID with a workflow management account;

maintaining a plurality of workflow management boards associated with the workflow management account;

receiving a first plurality of touch points associated with the user-ID;

based on the first plurality of touch points, customizing the workflow management account by initially altering at least one of a column option picker, an automation option picker, a third-party application integration picker, a display interface picker, or a solution picker;

monitoring activity associated with the workflow management account;

receiving, based on the monitoring, a second plurality of touch points associated with the user-ID;

adjusting the customized workflow management account by subsequently altering, based on the second plurality of touch points at least one of the column option picker, the automation option picker, the third-party application integration picker, the display interface picker, or the solution picker;
permitting a plurality of entities to have access to the plurality of workflow management boards;
wherein the second plurality of touch points includes at least one touch point received from a first entity of the plurality of entities and at least one touch point received from a second entity of the plurality of entities;
wherein the subsequent altering results in a common visualization to both the first entity and the second entity;
permitting a plurality of entities to access the plurality of workflow management boards;
wherein the second plurality of touch points includes at least one touch point received from a first entity of the plurality of entities and a touch point received from a second entity of the plurality of entities;
wherein subsequently altering results in an altered customized visualization for the first entity different from an altered customized visualization for the second entity;
wherein at least one of the first plurality of touch points and the second plurality of touch points are derived from responses to queries;
wherein the queries seek a field identification;
wherein at least one of the first plurality of touch points and the second plurality of touch points are derived from actions monitored in the workflow management account;
wherein the actions monitored are associated with a plurality of entities;
wherein actions of a first of the plurality of entities cause customization differing from customization caused by actions of a second of the plurality of entities;
wherein the first plurality of touch points includes a primary touch point identifying a field, a secondary touch point identifying an endeavor, and a tertiary touch point identifying a tool;
receiving an additional plurality of touch points and to further customize the workflow management account based on the additional plurality of touch points;
analyzing behavior associated with the workflow management account, and to derive the second touch points based on the analysis of the behavior;
maintaining a main data source containing a plurality of data objects;
maintaining a plurality of boards for presenting the plurality of data objects;
maintaining a plurality of linkages between at least some of the plurality of data objects associated with differing boards of the plurality of boards;
receiving a selection of a particular data object associated with a particular board;
identifying via a particular linkage of the plurality of linkages at least one additional data object on another board linked to the particular data object on the particular board;
defining a sub-data source, the sub-data source aggregating the at least one additional data object and the particular data object;
receiving a visualization template selection;
mapping the sub-data source to the visualization template selection to generate a sub-data visualization;
causing a co-presentation of a representation of the particular board and the sub-data visualization;
wherein the plurality of linkages is defined by at least one of a folder, an automatic rule, a manually defined rule, a column heading, a row designation, a data cell value, or an item;
wherein the at least some of the plurality of data objects associated with differing boards include multiple data objects from each of the differing boards;
presenting an index of a plurality of visualization templates;
wherein the received visualization template selection is based on a selection from the index;
migrating the sub-data visualization for co-presentation with a representation other than the representation of the particular board;
upon receipt of a filter selection, cause the co-presentation to reflect an unfiltered representation of the particular board and a filtered representation of the sub-data visualization;
wherein the filtered representation is limited by a time period;
wherein the filtered representation is limited by a specific aspect of the particular data object;
enabling a selection causing a change in a relative make-up of a display surface area allotted to the representation of the particular board and the sub-data visualization;
wherein the sub-data visualization is presented within a container;
associating a computing application to the sub-data source to thereby alter the sub-data visualization;
maintaining a board with a plurality of items, each item defined by a row of cells;
wherein each cell is configured to contain data and is associated with a column heading;
linking at least a first column to at least a second column so that a change in data in a cell of the at least first column causes a change in data of a cell in the at least second column;
receiving a first selection of a particular item from the board, wherein the particular item includes a plurality of cells with data in each cell;
wherein data in a first cell of the plurality of cells is linked to data in a second cell of the plurality of cells;
upon receipt of the first selection, causing a display of an item interface extrapolator;
wherein the item interface extrapolator includes a plurality of activatable elements, each of the activatable elements being associated with a differing visualization of at least some of the data contained in cells associated with the particular item;
receiving a second selection of one of the activatable elements;
upon receipt of the second selection, causing a first extrapolated display of data associated with the particular item to appear in a first manner;
receiving a third selection of another of the activatable elements;
upon receipt of the third selection, causing a second extrapolated display of data associated with the particular item to appear in a second manner;
receiving a fourth selection of a further activatable element;
wherein the further activatable element is configured to enable customization of the item interface extrapolator;
upon receipt of the fourth selection, enabling customization of the item interface extrapolator via a network access device;

wherein the customization enables data associated with the particular item to appear in a third customized manner;

storing the third customized manner as a template, and to present the third customized manner as a display option when items other than the particular item are selected for analysis and display within the item interface extrapolator;

causing a simultaneous display of the item interface extrapolator and at least a portion of the particular item;

migrating the item interface extrapolator for co-presentation with a representation other than the board;

upon receipt of a filter selection, causing a co-presentation to reflect an unfiltered representation of the board and a filtered representation of the item interface extrapolator; and wherein the filtered representation is limited by a time period.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for extrapolating information display visualizations, the system comprising:

at least one processor configured to:

maintain a board with a plurality of items, each item defined by a row of cells, and wherein each cell is configured to contain data and is associated with a column heading;

link at least a first column to at least a second column so that a change in data in a cell of the at least first column causes a change in data of a cell in the at least second column;

receive a first selection of a particular item from the board, wherein the particular item includes a plurality of cells with data in each cell, and wherein data in a first cell of the plurality of cells is linked to data in a second cell of the plurality of cells;

upon receipt of the first selection, cause a first display of an item interface extrapolator, wherein the item interface extrapolator includes a plurality of activatable elements, each of the activatable elements being associated with a differing visualization of at least some of the data contained in cells associated with the particular item;

receive a second selection of a first activatable element in the item interface extrapolator;

upon receipt of the second selection, cause a first extrapolated display of data associated with the particular item to appear in a first manner;

receive a third selection of a second activatable element in the item interface extrapolator;

upon receipt of the third selection, cause a second extrapolated display of data associated with the particular item to appear in a second manner, wherein the first extrapolated display and the second extrapolated display are configured to be presented concurrently;

upon receipt of the second selection, enable customization of the item interface extrapolator to thereby cause a first customized visualization different from the first manner of appearance; and upon receipt of the third selection, enable customization of the item interface extrapolator to thereby cause a second customized visualization different from the second manner of appearance.

2. The system of claim 1, wherein the at least one processor is further configured to store the first customized visualization as a template, and to present the first customized visualization as a display option when items other than the particular item are selected for analysis and display within the item interface extrapolator.

3. The system of claim 1, wherein the at least one processor is further configured to cause a simultaneous display of the item interface extrapolator and at least a portion of the particular item.

4. The system of claim 1, wherein the at least one processor is configured to migrate the item interface extrapolator for co-presentation with a representation other than the board.

5. The system of claim 1, wherein the at least one processor is configured to, upon receipt of a filter selection, cause a co-presentation to reflect an unfiltered representation of the board and a filtered representation of the item interface extrapolator.

6. The system of claim 5, wherein the filtered representation is limited by a time period.

7. The system of claim 1, wherein the at least one processor is configured to receive the third selection using the first activatable element.

8. The system of claim 1, wherein the customization of the item interface extrapolator includes one or more of rearranging, reorienting, repositioning, changing, reformatting, resizing, or moving an extrapolated display.

9. A non-transitory computer readable medium containing instructions that when executed by at least one processor, cause the at least one processor to perform operations for extrapolating information display visualizations, the operations comprising:

maintaining a board with a plurality of items, each item defined by a row of cells, and wherein each cell is configured to contain data and is associated with a column heading;

linking at least a first column to at least a second column so that a change in data in a cell of the at least first column causes a change in data of a cell in the at least second column;

receiving a first selection of a particular item from the board, wherein the particular item includes a plurality of cells with data in each cell, and wherein data in a first cell of the plurality of cells is linked to data in a second cell of the plurality of cells;

upon receipt of the first selection, causing a first display of an item interface extrapolator, wherein the item interface extrapolator includes a plurality of activatable elements, each of the activatable elements being associated with a differing visualization of at least some of the data contained in cells associated with the particular item;

receiving a second selection of a first activatable element in the item interface extrapolator;

upon receipt of the second selection, causing a first extrapolated display of data associated with the particular item to appear in a first manner;

receiving a third selection of a second activatable element in the item interface extrapolator;

upon receipt of the third selection, causing a second extrapolated display of data associated with the particular item to appear in a second manner, wherein the first extrapolated display and the second extrapolated display are configured to be presented concurrently;

upon receipt of the second selection, enabling customization of the item interface extrapolator to thereby cause a first customized visualization different from the first manner of appearance; and upon receipt of the third selection, enabling customization of the item interface extrapolator to thereby cause a second customized visualization different from the second manner of appearance.

10. The non-transitory computer readable medium of claim 9, wherein the operations further comprise storing the first customized visualization as a template, and to present the first customized visualization as a display option when items other than the particular item are selected for analysis and display within the item interface extrapolator.

11. The non-transitory computer readable medium of claim 9, wherein the operations further comprise causing a simultaneous display of the item interface extrapolator and at least a portion of the particular item.

12. The non-transitory computer readable medium of claim 9, wherein the operations further comprise migrating the item interface extrapolator for co-presentation with a representation other than the board.

13. The non-transitory computer readable medium of claim 9, wherein the operations further comprise, upon receipt of a filter selection, causing a co-presentation to reflect an unfiltered representation of the board and a filtered representation of the item interface extrapolator.

14. The non-transitory computer readable medium of claim 9, wherein the filtered representation is limited by a time period.

15. A method for extrapolating information display visualizations, the method comprising:

maintaining a board with a plurality of items, each item defined by a row of cells, and wherein each cell is configured to contain data and is associated with a column heading;

linking at least a first column to at least a second column so that a change in data in a cell of the at least first column causes a change in data of a cell in the at least second column;

receiving a first selection of a particular item from the board, wherein the particular item includes a plurality of cells with data in each cell, and wherein data in a first cell of the plurality of cells is linked to data in a second cell of the plurality of cells;

upon receipt of the first selection, causing a first display of an item interface extrapolator, wherein the item interface extrapolator includes a plurality of activatable elements, each of the activatable elements being associated with a differing visualization of at least some of the data contained in cells associated with the particular item;

receiving a second selection of a first activatable element in the item interface extrapolator;

upon receipt of the second selection, causing a first extrapolated display of data associated with the particular item to appear in a first manner;

receiving a third selection of a second activatable element in the item interface extrapolator;

upon receipt of the third selection, causing a second extrapolated display of data associated with the particular item to appear in a second manner, wherein the first extrapolated display and the second extrapolated display are configured to be presented concurrently;

upon receipt of the second selection, enabling customization of the item interface extrapolator to thereby cause a first customized visualization different from the first manner of appearance; and upon receipt of the third selection, enabling customization of the item interface extrapolator to thereby cause a second customized visualization different from the second manner of appearance.

16. The method of claim 15, further comprising storing the first customized visualization as a template, and to present the first customized visualization as a display option when items other than the particular item are selected for analysis and display within the item interface extrapolator.

17. The method of claim 15, further comprising causing a simultaneous display of the item interface extrapolator and at least a portion of the particular item.

18. The method of claim 15, further comprising migrating the item interface extrapolator for co-presentation with a representation other than the board.

19. The method of claim 15, further comprising, upon receipt of a filter selection, causing a co-presentation to reflect an unfiltered representation of the board and a filtered representation of the item interface extrapolator.

* * * * *